US012345520B2

(12) United States Patent
Smith, II et al.

(10) Patent No.: US 12,345,520 B2
(45) Date of Patent: Jul. 1, 2025

(54) LASER AND SYNTHETIC PROFILOMETRY OF A POSITIVE DISPLACEMENT MOTOR (PDM) AND ML METHODS, SYSTEMS, AND COMPUTER MEDIUM STORING INSTRUCTIONS FOR PREDICTING PDM ATTRIBUTES

(71) Applicant: Turnco LLC, Spring, TX (US)

(72) Inventors: Lonnie L. Smith, II, Cleburne, TX (US); Orson M. Terrill, Houston, TX (US); William D. Murray, Tomball, TX (US)

(73) Assignee: Turnco LLC, Spring, TX (US)

( * ) Notice: Subject to any disclaimer, the term of this patent is extended or adjusted under 35 U.S.C. 154(b) by 0 days.

(21) Appl. No.: 18/919,392

(22) Filed: Oct. 17, 2024

(65) Prior Publication Data

US 2025/0123098 A1    Apr. 17, 2025

Related U.S. Application Data

(60) Provisional application No. 63/569,148, filed on Mar. 24, 2024, provisional application No. 63/590,784, filed on Oct. 17, 2023.

(51) Int. Cl.
*G01B 11/24*     (2006.01)
*G06N 3/0455*    (2023.01)
*H02P 21/14*     (2016.01)

(52) U.S. Cl.
CPC ....... *G01B 11/2441* (2013.01); *G06N 3/0455* (2023.01); *H02P 21/14* (2013.01)

(58) Field of Classification Search
CPC .... G01B 11/2441; G06N 3/0455; H02P 21/14
See application file for complete search history.

(56) References Cited

U.S. PATENT DOCUMENTS 8,311,788  B2   11/2012   Hurley et al.
10,921,789 B2   2/2021    Kadokura
(Continued)

OTHER PUBLICATIONS

Ba, Samba, et al. "Positive displacement motor modeling: skyrocketing the way we design, select, and operate mud motors." Abu Dhabi International Petroleum Exhibition and Conference. SPE, 2016. (Year: 2016).*

(Continued)

*Primary Examiner* — Chuen-Meei Gan
(74) *Attorney, Agent, or Firm* — Daniel N. Lundeen; Lundeen & Lundeen PLLC

(57) ABSTRACT

Laser and synthetic profilometry of positive displacement motors (PDM) and ML methods, systems, and computer medium storing instructions for predicting PDM attribute(s). Laser profilometric scans (LPS) and mechanical stator minor ID (SMID) measurements from a plurality of locations in the stator are used for training a stator profilometric ML (SPML) model to learn stator profiles. The SPML model is deployed on input SMID measurements to generate synthetic stator dimension data (SSDD). LPS are preprocessed for feature alignment and statistical profilometric data are extracted for use in training the SPML model, and/or for training a PDM motor performance ML (MPML) model to learn PDM performance. The MPML training dataset may also include the learned stator profiles from the SPML model. The MPML model is deployed, on either input LPS or SSDD generated by the SPML model from input SMID measurements, to generate PDM performance data.

30 Claims, 31 Drawing Sheets

(56) References Cited

U.S. PATENT DOCUMENTS

| | | | |
|---|---|---|---|
| 11,508,169 | B2 | 11/2022 | Bala et al. |
| 11,593,660 | B2 | 2/2023 | Aliper et al. |
| 2020/0160176 | A1 | 5/2020 | Mehrasa et al. |
| 2020/0372369 | A1 | 11/2020 | Gong et al. |
| 2022/0172050 | A1 | 6/2022 | Dalli et al. |
| 2023/0377037 | A1 | 11/2023 | Kamkar et al. |

OTHER PUBLICATIONS

Ba, Samba, et al. "Combined Data Analytics and Physics-Based Simulation for Optimum Bit, Motor, BHA Combination." Offshore Technology Conference Brasil. OTC, 2019. (Year: 2019).*

Dunn, Lonnie, et al. "Novel Progressing Cavity Pump Configurations Address Operational Challenges." SPE Artificial Lift Conference and Exhibition-Americas. OnePetro, 2020. (Year: 2020).*

Nguyen, T.C., et al., "Theoretical modeling of Positive Displacement Motors performance," Journal of Petroleum Science and Engineering, Mar. 12, 2018, vol. 166 (2018), pp. 188-197.

Biletskyi, V., et al., "Modeling of the Power Section of Downhole Screw Motors," Mining of Mineral Deposits, vol. 11 (2017), issue 3, pp. 15-22.

Smith, Lonnie, "Data Unlocks More Useful Inspections," The American Oil & Gas Reporter, vol. 66, No. 04, Apr. 2023, National Publishers Group Inc. pp. 66-71.

Lapa, Paulo, et al., "A Hybrid End-to-End Approach to Integrating Conditional Random Fields into C N Ns for Prostate Cancer Detection on MRI " *Applied Sciences Journal* vol. 10 No. 338, Jan. 2, 2020, MDPI, Basel, Switzerland.

Smith, Lonnie, "Case Study: Laser measurements, machine learning boost motor performance in the Permian," Drilling Contractor, vol. 79, No. 2. Mar./Apr. 2023. IADC. p. 72.

Smith, Lonnie, "Guest Editorial: What Exactly Is 'Non-Production Data' and Why Should It Matter to Operators?" Journal of Petroleum Technology Mar. 1, 2023 Society of Petroleum Engineers, (accessed Nov. 11, 2024), <https://jpt.spe.org/what-exactly-is-non-production-data-and-why-should-it-matter-to-operators>.

Zheng, Lei, et al., "Analytical Model for the Flow in Progressing Cavity Pump with the Megtallic Stator and Rotor in Clearance Fit," Mathematical Problems in Engineering. vol. 2018, Article ID 3696930, Jul. 24, 2018, <https://onlinelibrary.wiley.com/doi/10.1155/2018/3696930>, Hindawi, 14 pages.

Biletskyi, V., et al., "Modeling of the Power Section of Downhole Screw Motors," Mining of Mineral Deposits, vol. 11 (2017), No. 3, Sep. 30, 2017 National Mining University, Dnipro, Ukraine, pp. 15-22.

* cited by examiner

1900

Statistical Data Extraction

1902 — Preprocessed Laser Scans, $j = 1$ to $n$ → $\begin{Bmatrix} X_i, Y_i \\ x_i, y_i, N_i \end{Bmatrix}$ $i=1$ to $N$ 1904 — Classify Regions → $\begin{Bmatrix} peak_i \\ valley_i \\ flank_i \end{Bmatrix}$ $i=1$ to $N$ 1906 — Extract Scan Vectors → $\begin{Bmatrix} max\_peak\_n \\ mad\_peak\_n \\ min\_val\_n \\ mad\_val\_n \\ mad\_flank\_n \end{Bmatrix}$ $n=1$ to $6$ 1908 — Extract Collective Values → $\begin{Bmatrix} max\_peak & mean\_val \\ mean\_peak & mad\_val \\ mad\_peak & mean\_flank \\ min\_val & \end{Bmatrix}$ 1910 — Extract Wobbles/Wanders → $\begin{Bmatrix} wobble\_peak\_n & mad\_wobble, \\ wobble\_val\_n & mad\_wobble\_peak, \\ wander\_peak & mad\_wobble\_valley \\ wander\_val & \end{Bmatrix}$ $n=1$ to $6$ 1912 — Extract SID_n/SID_Mean 1914 — Extracted Statistical Laser Data

FIG. 19

LASER AND SYNTHETIC PROFILOMETRY OF A POSITIVE DISPLACEMENT MOTOR (PDM) AND ML METHODS, SYSTEMS, AND COMPUTER MEDIUM STORING INSTRUCTIONS FOR PREDICTING PDM ATTRIBUTES

CROSS-REFERENCE TO RELATED APPLICATION(S)

This application is a non-provisional application of and claims the benefit of priority to U.S. Ser. No. 63/590,784, filed Oct. 17, 2023, and U.S. Ser. No. 63/569,148, filed Mar. 24, 2024, both incorporated herein by reference.

BACKGROUND OF THE INVENTION

A positive displacement motor (PDM), also called a progressive cavity pump (PCP), progressive cavity positive displacement pump (PCPD), or simply mud motor, is used in the oil and gas drilling industry to facilitate the drilling of wells by converting hydraulic power from a drilling fluid or mud into torque which rotates the drill bit with respect to the drill string.

As seen in FIGS. 1 and 2, a power section 1 in PDM 2 has a stator 3 and a rotor 4 that turns inside the stator 3, both of which have hypocycloid surfaces formed by lobes 3a and 4a, respectively. Operation of the PDM 2 is based on the Moineau principle that a rotor 4 that can turn inside a stator 3, where the stator has one more helical lobe 3 than the lobes 4a of the rotor, will convert the hydraulic power of the drilling fluid, passed through the PDM 2 between the stator and rotor, into rotation of the rotor, which can then be transferred through a universal joint assembly 5 into the drill bit (not shown).

As seen in FIGS. 2 and 3, the inner surface of the stator 3 has a number s of stator lobes 3a with peaks 3b, valleys 3c, and a number 2s of flanks 3d helically configured and arranged in a number K of one or more stages, e.g., K~1.5 in FIG. 1. The stator valleys 3c have a minimum distance magnitude lying generally along a stator minor inside diameter (ID or SMID) 6, the stator peaks 3b a maximum distance magnitude lying generally along a stator major ID 7, and the stator flanks 3d are between the peaks 3b and valleys 3c. The number s is an integer ranging from 2 to 10 or more.

Similarly, as seen in FIGS. 2 and 4, the outer surface of the rotor 4 has a number r of rotor lobes 4a with peaks 4b having a maximum distance magnitude lying generally along a rotor major outside diameter (OD) 8, valleys 4c having a minimum distance magnitude lying generally along a rotor minor OD 9, and a number 2r of lobe flanks 4c between the peaks 4b and valleys 4c. The number r of rotor lobes 4a is an integer that is one less than the number s of stator lobes 3d, viz., mathematically, s=r+1. For example, the PDM 2 shown in FIGS. 1-2 has five rotor lobes 4a (r=5) and six stator lobes 3a (s=6), while FIGS. 3-4 show a PDM 2 with s=7 and r=6, respectively.

The rotor 4 is usually made of metal such as stainless steel and may also have a hard, corrosion/erosion resistant coating such as chrome or carbide. The stator 3 usually has a typically metal housing 3e and a rubber or elastomer insert 3f. An inner surface 3g of the housing 3e can be cylindrical as shown in FIGS. 1-2, or it can have an equidistant design (not shown) where the inner surface 3g has a contour matching that of the lobes 3a and the elastomer insert 3f has a generally uniform thickness. Additionally, some PDM 2 manufacturers may vary the SMID 6 and/or stator major OD 7 along the length of the motor.

PDM performance is often presented diagrammatically as a PDM performance curve 60 as seen in FIG. 6A with a linear relationship between torque and differential pressure (DP) plotted as line 62 up to a maximum recommended full load DP (FLDP) 64, operation above which may decrease stator life. Rotational speed (RPM) is also typically shown as a series of curves 66A-C plotted for constant flow rates as a function of DP. These OEM performance curves are generally provided for water at ambient temperature and the torque and DP will be higher with a drilling fluid having a higher density or viscosity. The performance can also be adjusted for the higher temperatures seen downhole, as well as for any mud-elastomer chemical interactions that can sometimes occur.

PDM prediction models are widely used. The models typically use PDM characteristic data or metadata readily available such as motor size, number of lobes, number of stages, elastomer type, and so on. The models also use PDM dimensional data or "fit" data about how tightly the rotor fits inside the stator, conventionally indicated as "Fit*". The stator 3 and rotor 4 are selected to balance performance and stator life, i.e., enough compression to limit slip and a loss of rotational speed (RPM) during operation, but not so much compression that there is excessive stress in the elastomer. If the fit is too tight, the rotation of the rotor 4 creates friction between the rotor and the stator insert 3f, which can lead to motor failure, e.g., "chunking" in which pieces of the insert 3f break off. If the fit is too loose, the drilling fluid can pass through the seal lines in the power section 1 without powering the rotor 4, causing a loss in RPM and hence a loss in drilling rate of penetration (ROP).

The Fit* parameter is generally calculated as a rotor characteristic or clearance diameter $OD_{rc}$ minus the stator minor ID (SMID), i.e., Fit*=$OD_{rc}$-$ID_{sm}$, where, in the case of a rotor with an odd number of rotor lobes 4d, $OD_{rc}$ is the distance from a lobe valley 4b on one side of the rotor 4 to the lobe peak 4a on the opposite side of the rotor 4; and in the case of an even number of rotor lobes 4d, $OD_{rc}$ is taken as the rotor major OD ($OD_{rM}$). A negative Fit* parameter indicates a loose fit with stator-rotor clearance whereas a positive Fit* indicates a tight or compressed fit between the stator 3 and rotor 4.

OEM fit data can be obtained from PDM manufacturers and, for improved accuracy, is also often obtained by mechanically measuring the minor ID 6 of the stator (SMID), typically with a special caliper for measuring ID known as a "vector gauge" 20, shown schematically in FIG. 5. The vector gauge 20 is inserted axially into the stator 3 on the end of rod 22 and the ID is measured mechanically by the amount of extension of radially extending shoes 24, which are calibrated to ID standards. Because the geometries can change along the length, the technician often acquires several measurements of the SMID 6, e.g., at the ends L1, L6 and at first locations L2, L4 and/or second locations L3, L4 spaced in from each of the ends, as shown generally for a power section element 1 in FIG. 5. The fit data often included the mean of the stator minor ID 6, i.e., the average of the several mechanical measurements L1 to L6, which was then used with the rotor dimensions to calculate Fit*. The dimensions of rotor 4 are not normally measured for performance prediction, and $OD_{rc}$ can be taken from the motor manufacturer's data.

With the vector gauge SMID measurement, often with adjustments to the stator dimensions due to thermal growth and/or chemical interactions with the drilling fluid at the expected downhole conditions, the models provided predicted estimates of PDM performance; however, the result using the Fit* parameter has often been a crude, qualitative approximation that was not always helpful in operating the motor in actual drilling conditions. For example, with the exact same power section fit, one PDM might not produce the power expected, and another may fail prematurely due to power section chunking.

In a typical scatter plot shown in FIG. 6B of measured versus predicted peak power outputs obtained from a machine learning (ML) model trained on a dataset with the Fit* parameter based on vector gauge SMID measurements, there is a large scattering of data in only a limited extent of peak power ranges, as seen in the error range box 70 above and below the equal peak power plot line 72. The error rate is unsuitably large and the predicted peak power output from the mechanical measurements is minimally quantitative, barely useful for making operating decisions for PDM operation. Thus, PDM operators have often tested mud motors using a dynamometer to obtain more reliable PDM performance information.

More recently, stator fit data have been obtained with a profilometer 25 illustrated schematically in FIG. 5. One commercially available profilometer 25 for stators 3 is the LOTIS qc-40 laser gauge, which can be inserted with a rod 26 into one end of the stator 3 and self-centering shoes 27 used to position the head 28 in a measuring location to take a scan of the stator profile at each measuring location. The LOTIS model provides an SMID measured along the lobe valleys 3b, which is used by most operators.

The profilometer 25 can also provide profilometric data, e.g., an array of coordinates from the stator 3 interior surface providing profilometric coordinates for the entire profile at a particular axial location, including the full valley, flank, and peak regions, in each scan, e.g., for each 0.1 degree of rotation or 3600 total datapoints. As far as applicant is aware, the complete laser profilometric scan data from various spaced axial locations has not been used in either stator profile or PDM performance modeling. While the SMID provided by the laser profilometer 25 gives better accuracy in the Fit* parameter calculation than the vector gauge 20, the PDM performance prediction is only marginally improved. PDM operators thus have little incentive to invest in profilometers such as laser gauges where dynamometer testing would be employed in any event. As a result, industry adoption of profilometers for stator measurements has been quite slow.

At the other extreme, complete imaging of the entire lengths of the stator and rotor have been used in fluid structural interaction (FSI) analysis, which couples finite elemental analysis (FEA) and computational fluid dynamics (CFD) to obtain PDM performance curves. For example, Samba et al., "Positive Displacement Motor Modeling: Skyrocketing the Way We Design, Select, and Operate Mud Motors", SPE-183298-MS (2016), reported placing a laser sensor inside a stator and pulling it along the length to extract detailed stator geometry, and using a coordinate-measuring machine (CMM) or 3D optical image mapping for detailed rotor geometry. This reference appears to confirm at 19 that a limited sampling of measurements from the stator is inadequate to inform a PDM model using the Fit* parameter for accurate performance predictions; the FSI analysis showed a stator diameter deviation band of approximately 0.4 mm (0.016 in.) by 3D laser scanning, which would result in a 30% lower power estimate compared to an estimate assuming the stator ID to be uniform.

However, the computing power and time needed for FSI analysis is not practical for drilling operators to take advantage of the 3D laser scanning capabilities. Scanning the entire length of the stator and rotor, to extract the detailed stator and rotor geometries needed for FSI, can itself be challenging and time consuming. Additionally, in the reference at 12, even using a simplified leakage algorithm instead of the full 3D interaction still took more or less than an hour for the computations.

What is needed are techniques and tools for PDM measurement and characterization that can overcome one or more drawbacks or disadvantages noted above; that can communicate peculiarities about a specific stator and/or rotor as a whole with a limited number of measurements or scans; that can formulate a feature vector for an ML performance model from a limited number of profilometer scans; that can expand the amount of information from a limited sampling of profilometer scans that can be used in performance modeling, but is simple enough to avoid overwhelming the model with excessive input data and does not require excessive amounts of time for profilometry and/or modeling; that can improve the knowledge database to such an extent that mechanical measurement alone is sufficient to improve the accuracy of mechanically measured dimensions and/or sufficient to predict synthetic dimension characteristics that would otherwise require profilometers and complete lengthwise scanning or profilometry; that can use the synthetic data from the mechanical measurements in a PDM performance model with the same or nearly the same precision as the profilometric data; that can generate predicted PDM performance characteristics nearly exactly as those derived from a dynamometer test; that can provide PDM operators with useful information to improve the efficiency and performance of PDMs in actual use conditions; that can quickly provide PDM performance modeling in a short period of time relative to FSI analysis, e.g., in real time or near real time; and/or that can achieve one or more of the foregoing without requiring technicians to materially change existing sampling and inspection procedures and/or to obtain new tools or imaging devices.

SUMMARY OF THE INVENTION

This summary is provided to introduce a selection of concepts that are further described below in the detailed description. This summary is not intended to identify key or essential features of the claimed subject matter, nor is it intended to be used as an aid in limiting the scope of the claimed subject matter.

In the present disclosure, the voluminous array of data that is possible with measurement of the stator with a profilometer, e.g., a laser gauge, is reduced to a handful of scans at spaced axial measurement locations. The scans are parsed, processed, and inserted in a feature vector for input to a positive displacement motor (PDM) prediction model to vastly improve the prediction capabilities over previous models supplied only with mechanical or laser stator minor inside diameter (SMID) measurement data. In one embodiment, we developed a standardized method for preprocessing imaging data obtained by taking profilometer scans at a plurality of n axial measurement locations in the stator, e.g., the six locations typically used in the prior art for mechanically measuring SMID. The suitably preprocessed imaging data were then used in machine learning (ML) to train a PDM performance model.

The solution was a feature vector comprised of stator profilometric data and other traditional PDM characteristic or classification data, i.e., metadata, often provided by the original equipment manufacturer (OEM) such as manufacturer, motor size, number of lobes and stages, type of rubber or elastomer, and design operating characteristics (OEM) such as no load and full load rotations per gallon (RPG), rotations per minute (RPM), differential pressure (DP), and torque, and/or torque curve or slope, and so on.

When this novel feature vector was input in a training dataset to our PDM performance model, appropriately adapted for the larger but selectively limited number of input feature vector attributes from the profilometric data, the result was much more accurate performance data over a broader extent of ranges, as seen in the scatterplot of predicted peak power based on an ML model trained with the stator profilometric data versus dynamometer-measured peak power in FIG. 7 and the associated error box 102 against the residual plot line 100. The error rate was much smaller than with the mechanical vector gauge data of FIG. 6B and the predicted peak power output was more useful for operation of the PDM. Thus, the profilometric model could provide reliable, quantitative information relevant to actual use conditions, without the need for further dynamometer evaluation.

While learning from small sample sizes, such as a handful of measurements from the entire length of the stator and/or rotor, is an area where ML and artificial intelligence (AI) have typically lagged, we were surprisingly able to generate stator profilometric data from a limited, conventional sampling of just a handful of laser profilometer scans of the stator, that could quantitatively describe the geometry of the entire length of the stator for the purpose of PDM performance modeling, nearly effectively as scanning the entire length of the stator with profilometric devices as in the prior art FSI analysis. Moreover, deployment of the model we developed for the PDM performance estimates, trained with feature vectors including our stator profilometric data, was practically instantaneous and thus very fast even compared to the simplified FSI modeling reported in the prior art discussed in the background. Operators are now able to upload a handful of stator profilometer scans and PDM metadata to a model trained with a dataset of profilometric scans and instantaneously obtain accurate PDM performance curves.

While developing the laser profilometer dataset, SMID measurements were also taken mechanically with a vector gauge 20 at or near the same locations as the laser profilometer scans and inserted in our training database. When both laser profilometric data and mechanical data (SMID) were used to train AI to model stator geometry, it was found, quite surprisingly, that the model could generate stator profilometric pseudo-data, with an accuracy similar to the laser profilometer, using measurement inputs only from the less precise vector gauge measurements. The pseudo-data included stator profilometric data for geometric features of the stators not actually measured with the vector gauges. These simulated profilometric measurements and other imaging-type or laser-type data obtained from vector gauge or other mechanical measurements are referred to herein as "synthetic profilometric" or "synthetic imaging" or "synthetic laser" data.

Even more surprising, the ML we used to extract stator profilometric data from vector gauge measurements, could also provide the laser or synthetic laser stator profilometric data in a form more suitable for use in the PDM performance ML model. It was discovered, for example, that the use of a variational autoencoder (VAE) produced a compressed latent space describing the stator geometry that surprisingly facilitated the motor performance modeling. This compressed latent space data generated by the VAE could be used as a more accurate representation of the stator profile and geometry and with a manageable size of the stator profilometric data in the training dataset, and even further improved the accuracy of the PDM performance predictions.

Broadly, in one aspect, embodiments of the present disclosure are directed to a computer-implemented method for generating synthetic stator profilometric data for a positive displacement motor (PDM). The method comprises providing a database of historical PDMs comprising respective stators and rotors, the database comprising PDM metadata comprising stator metadata, e.g., OEM data. The database also comprises stator dimension data based on mechanical stator minor inside diameter (SMID) measurements, e.g., using a vector gauge, and radial profilometric (RP) scans, e.g., using a laser gauge, taken at or near a plurality of spaced axial measurement locations. A first machine learning (ML) model is trained with a stator training dataset comprising the stator dimension data, to learn stator profiles from the stator dimension data. Next, input data are received for a subject PDM under investigation. The input data comprise input stator data comprising or consisting essentially of mechanical SMID measurements taken, e.g., with a vector gauge, at or near the plurality of spaced axial measurement locations for the subject PDM. Then, the first ML model is deployed on the input stator data to generate synthetic stator profilometric data.

In another aspect, embodiments of the present disclosure are directed to a computer-implemented method of predicting PDM performance. The method comprises providing a database of historical PDMs comprising respective stators and rotors. The database comprises stator dimension data, PDM operating data, and PDM metadata comprising stator metadata, the stator dimension data based on mechanical stator minor inside diameter (SMID) measurements and RP scans taken at or near a plurality of spaced axial measurement locations. A first machine learning (ML) model is then trained with a stator training dataset comprising the stator dimension data to learn stator profiles from the stator dimension data. Then, a second ML model is trained based on the learned stator profiles of the first ML model and a PDM training dataset comprising the PDM operating data and the PDM metadata from the database to learn PDM performance characteristics in relation to the stator profiles. Next, input data are received for a subject PDM. The input data comprise input stator data, e.g., vector gauge SMID measurements or radial profilometric (RP) scans taken at or near the plurality of spaced axial measurement locations, and PDM metadata. The second ML model is then deployed to predict PDM performance data for the subject PDM based on the input data.

In another aspect, the present disclosure is directed to a computer-implemented system for generating synthetic stator profilometric data for a PDM. The system includes a processor operating in conjunction with computer memory. The system comprises a database of historical PDMs comprising respective stators and rotors. The database comprises PDM metadata comprising stator metadata, and stator dimension data based on mechanical SMID measurements and RP scans taken at or near a plurality of spaced axial measurement locations. The system comprises a data receiver for receiving input data for a subject PDM. The input data comprise input stator data comprising mechanical SMID measurements taken at or near the plurality of spaced axial measurement locations for the subject PDM. The processor is configured for providing an ML framework for (1) training a first ML model with the stator training dataset to learn stator profiles from the stator dimension data; and (2) deploying the first ML model on the input stator data to generate synthetic stator profile data.

In another aspect, the present disclosure is directed to a computer-implemented system for predicting PDM performance. The system includes a processor operating in conjunction with computer memory. The system comprises a database of historical PDMs comprising respective stators and rotors. The database comprises stator dimension data, PDM operating data, and PDM metadata comprising stator metadata. The stator dimension data are based on mechanical SMID measurements and stator RP scans taken at or near a plurality of spaced axial measurement locations. The system comprises a data receiver for receiving input data for a subject PDM comprising PDM metadata and input stator data, e.g., vector gauge SMID measurements or profilometric scans taken at or near the plurality of spaced axial measurement locations for the subject PDM. The processor is configured for providing an ML framework for (1) training a first ML model with a stator training dataset comprising the stator dimension data from the database to learn stator profiles; (2) training a second ML model to learn PDM performance characteristics based on the learned stator profiles of the first ML model and the PDM training dataset; and (3) deploying the second ML model to predict PDM performance data for the subject PDM based on the input data.

In a further aspect, the present disclosure is directed to a non-transitory computer-readable medium storing machine-interpretable instructions, which when executed cause a processor to perform a computer-implemented method of generating synthetic stator profilometric data for a PDM. The method comprises training a first ML model with a stator training dataset from a database of historical PDMs comprising respective stators and rotors to learn stator profiles. The stator training dataset comprises stator dimension data based on SMID measurements and stator RP scans taken at or near a plurality of spaced axial measurement locations, and stator metadata. Next, input data are received for a subject PDM. The input data comprise input stator data comprising mechanical SMID measurements taken at or near the plurality of spaced axial measurement locations for the subject PDM. Then, the first ML model is deployed on the input stator data to generate synthetic stator profile data.

In a still further aspect, the present disclosure is directed to a non-transitory computer-readable medium storing machine-interpretable instructions, which when executed cause a processor to perform a computer-implemented method of predicting PDM performance. The method comprises training a first ML model with a stator training dataset from a database of historical PDMs comprising respective stators and rotors to learn stator profiles. The stator training dataset comprises stator dimension data based on mechanical SMID measurements and stator RP scans taken at or near a plurality of spaced axial measurement locations, and stator metadata. Next, a second ML model is trained to learn PDM performance characteristics based on the learned stator profiles of the first ML model and a PDM training dataset comprising PDM operating data and PDM metadata from the database. Next, input data are received for a subject PDM. The input data comprise input stator data, e.g., mechanical SMID measurements or stator RP scans, taken at or near the plurality of spaced axial measurement locations for the subject PDM. Then the second ML model is deployed to predict PDM performance data for the subject PDM based on the input data and the stator profile data generated from the first ML model.

In any embodiment, the database of stators of historical PDMs can be built by: (1) taking the mechanical SMID measurements and the stator RP scans for the historical PDMs at or near the plurality of spaced axial measurement locations; (2) obtaining the stator metadata for the historical PDMs; and (3) populating the database with the mechanical SMID measurements, the stator RP scans, and the stator metadata for the historical PDMs.

In any embodiment, the database of historical PDMs can be built by: (1) taking the mechanical SMID measurements and the stator RP scans for the historical PDMs at or near the plurality of spaced axial measurement locations; (2) taking rotor outside diameter (OD) measurements for the historical PDMs at or near the plurality of spaced axial measurement locations; (3) operating the historical PDMs to obtain the PDM operating data; (4) obtaining the PDM metadata for the historical PDMs; and (5) populating the database with the mechanical SMID measurements, the stator RP scans, the rotor OD measurements, the PDM operating data, and the PDM metadata for the historical PDMs.

Stator metadata or classification data here may include such data as, for example, elastomer type, number of lobes, and number of stages, motor size, and so on, or a combination thereof. PDM metadata or classification data may further include such data as, for example, elastomer type, number of lobes, and number of stages, motor size and/or size range, OEM full load RPG, OEM no load RPG, OEM no load RPM, OEM torque slope, OEM full load torque, OEM full load differential pressure, and so on, or a combination thereof. The motor size range is a parameter regime concept we implemented to assist modeling where the same size or range of drill bits may be used with several different motor sizes.

In any embodiment, the RP scans may be obtained as a set for each one of the stators comprising an RP scan for each one of the axial measurement locations, e.g., in the database of historical PDMs or when present in the input data for a subject PDM. The RP scan sets are preferably preprocessed for feature alignment. In any embodiment, the preprocessing of the laser scans can comprise (1) applying a digital filter to smooth granular noise in the laser scans; (2) identifying extrema features, e.g., peaks or valleys, in the laser scans based on magnitudes of distance from an axis of the stator to datapoints in the respective extrema features; (3) identifying extrema points, e.g., corresponding to the maximum peaks or the minimum valleys, in each of the laser scans in the set based on respective intersections of bidirectional moving averages; and (4) indexing the laser scans to assign the respective identified extrema points in each of the scans to a common alignment angle. Thus, the scans in each set are aligned with aligned extrema points and have aligned peaks, valleys, and flanks.

In any embodiment, profilometric statistical data are preferably extracted from the RP scan sets or can be generated synthetically by the first ML module. The profilometric statistical data can comprise (A) one or more of local maximum, minimum, mean and/or deviation magnitude values for each of the plurality of the spaced axial stator measurement locations separately, (B) one or more of overall maximum, minimum, mean and/or deviation magnitude values for the plurality of the spaced axial stator measurement locations collectively, and/or (C) one or more wobble values, one or more wander values, or a combination thereof.

In any embodiment, the first ML model is preferably trained in a variational autoencoder (VAE) learning framework wherein the training comprises (1) processing the stator dimension data using one or more encoders of the VAE learning framework in a two-layer encoding architecture to generate a latent space of proposal data vectors embedding the stator dimensional data; and (2) generating estimated data from the proposal data using one or more decoders of the VAE learning framework in a two-layer decoding architecture. More preferably, the first ML model training comprises: (3) convoluting static stator metadata variables into a neural network layer to create one or more VAE support layers, e.g., with a transformer or long short-term memory (LSTM) learning framework.

Preferably, the second ML model comprises a tree model, e.g., a stacked or blended ensemble. The second ML model uses the stator profiles generated by the first model to predict PDM performance, e.g., the latent space of proposal data vectors embedding the stator profile data. The second ML model can use stator input data comprising a set of either RP scans or SMID measurements for the subject PDM, e.g., taken at the plurality of axial measurement locations. Where only SMID measurements (and no profilometric data) are available for the subject PDM, the first ML model can be deployed to generate a synthetic stator profile for use by the second ML model, e.g., the latent space of proposal data vectors embedding the synthetic stator profilometric data.

BRIEF DESCRIPTION OF THE DRAWINGS

FIG. 19 is a flow chart for an example of extracting statistical profilometric data according to an embodiment of this disclosure;

DETAILED DESCRIPTION OF THE PREFERRED EMBODIMENTS

Definitions

Figure 1:
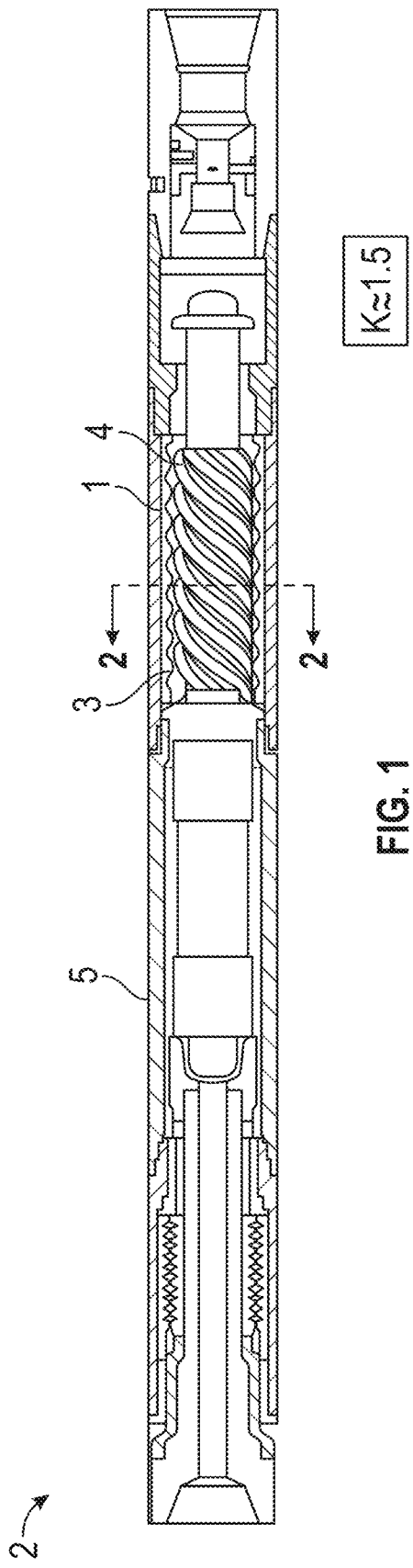
FIG. 1 is a generalized, schematic side sectional view of a positive displacement motor (PDM)
Figure 2:
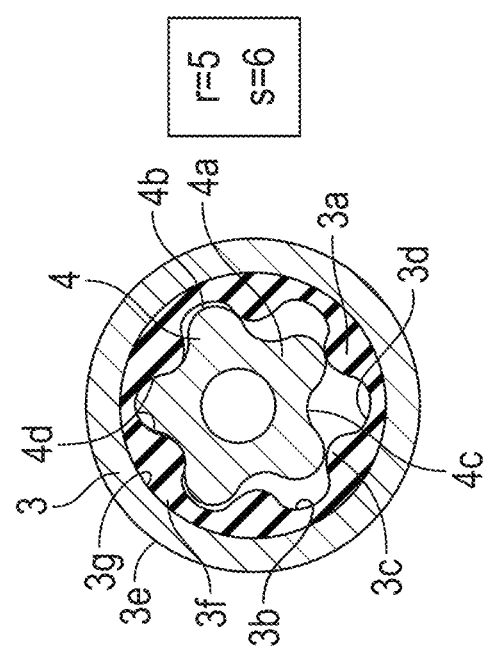
FIG. 2 is a cross-sectional view of the power section of the PDM of FIG. 1 having six stator lobes and five rotor lobes as seen along the lines 2-2.
Figure 3:
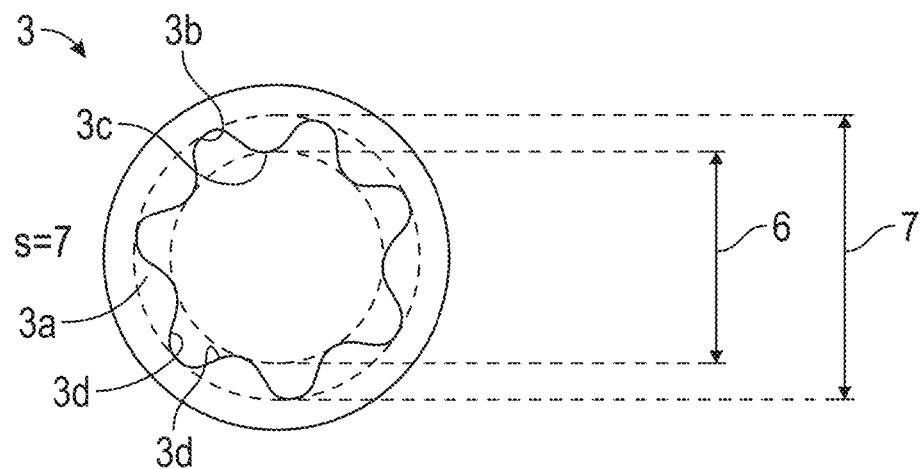
FIG. 3 is a cross-sectional view of a PDM stator.
Figure 4:
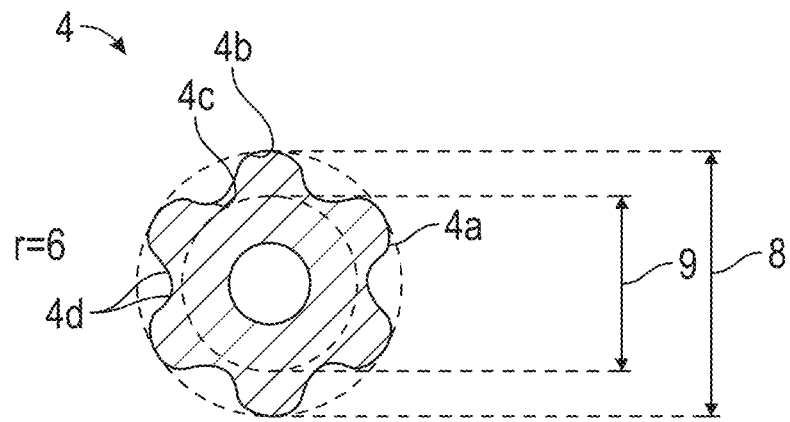
FIG. 4 is a cross-sectional view of a PDM rotor.

Throughout the entire specification, including the claims, the following terms shall have the indicated meanings.

The term "and/or" refers to both the inclusive "and" case and the exclusive "or" case, and such term is used herein for brevity. For example, a composition comprising "A and/or B" may comprise A alone, B alone, or both A and B.

The term "and or" refers to the inclusive "and" case but not the exclusive "or" case, and such term is used herein for brevity. For example, a composition comprising "A and or B" may comprise A alone, or both A and B.

As used herein, the "axis" or "center point" of a collection of datapoints refers to their geometric center. For example, for a given radial scan from a stator axis having a collection of N datapoints with x and y coordinates, the center can be designated as:

$$x_{region\_n} = \frac{1}{N}\sum_{i=1}^{N} x_i, \quad y_{region\_n} = \frac{1}{N}\sum_{i=1}^{N} y_i \quad \text{(Equation 1)}$$

where region_n designates the regional data type (center, flank, peak, valley, etc.), n designates the scan number in the set, and N designates the number of datapoints in the regional data type in the scan.

As used herein, "bootstrap sampling" or "bootstrapping" refers to any test or metric based on a resampling method that uses random sampling with replacement to mimic the sampling process.

As used herein, the term "contour" refers to a curve or line connecting points along which a function has the same value.

As used herein, the term "extrema" refers to the highest high and the lowest low value, point, or region.

As used herein, a feature vector is a way of representing an object or phenomenon using numerical or symbolic characteristics, called features, in a list or array of labels that can be used as input to a machine learning algorithm.

As used herein, the term "flank" refers to the surface, area, or structure of a stator or rotor between an adjacent peak and valley.

"Flank deviation" refers to the mean absolute difference between the flank distance magnitudes for all flank datapoints in a scan and an average flank distance magnitude for all the flanks in the scan (mad_flank_n); or to the average absolute difference between the average flank distance magnitude for all the flanks in a set of scans and the average flank distance magnitude for all flanks in each scan (mad_flank).

As used herein, the term "loss function" refers to a machine learning function that compares the target and predicted output values to measure how well a neural network models the training data. When training a neural network, the loss function is generally minimized.

As used herein, the prefixes m-, L- and s- generally refer to data or values obtained or derived from mechanical measurements (e.g., using a vector gauge), optical profilometer scans (e.g., using a laser gauge), and synthetically (e.g., using an ML model), respectively.

As used herein, "machine learning" or "ML" refers to the solving of problems by machines that develop algorithms on their own where the development of the algorithms by human programmers would be cost-prohibitive. A machine learning algorithm is a computational model that allows a computer to learn from data and make predictions or decisions.

The abbreviation "mad" used herein, including in variable names, generally refers to the "mean absolute deviation" between a set of values and the average value of the set. For example, "mean absolute valley deviation" refers to the mean absolute difference between the distance magnitudes of all valleys or valley datapoints in a particular individual scan and the average valley distance magnitude in the scan (mad_valley_n), or the mean absolute difference between the distance magnitudes of all valleys or valley datapoints in a series or set of scans collectively and the average valley distance magnitude in the series or set of scans collectively (mad_valley); and "mean absolute peak deviation" refers to the mean absolute difference between the distance magnitudes of all peaks or peak datapoints in a particular individual scan and the average peak distance magnitude in the scan (mad_peak_n), or the mean absolute difference between the distance magnitudes of all peaks or peak datapoints in a series or set of scans collectively and the average peak distance magnitude in the series or set of scans collectively (mad_peak).

As used herein, the terms "major" and "minor" refer to the largest and smallest diameters of a profiled circle or cylinder, e.g., an inside diameter (ID) stator surface measured along the valleys is the stator minor ID (SMID), and a rotor major outside diameter (OD) is measured along the peaks of the rotor.

"Maximum peak" refers to the height of the highest one of r or s peaks or peak datapoints at a particular axial measurement location for a stator or rotor, e.g., max_peak_n where n refers to the scan or measurement location, respectively, or to the height of the highest one of r or s peaks or peak datapoints in a set of n scans taken at or near a plurality of n axial measurement locations collectively, e.g., max_peak.

As used herein, the term "mechanical measurement" refers to a measurement technique in which the measurement is determined by a distance metric between two or more physical points in the measurement device that physically contact the object being measured, e.g., the amount of spread of calibrated shoes or calipers contacting an object used to obtain measurement data. "Mechanical gauges" may be, for example, inside calipers, outside calipers, divider calipers, oddleg calipers, vernier calipers, dial calipers, digital calipers, micrometers (screw calipers), telescope gauges, bore gauges, vector gauges, etc. for inside diameter surfaces, or As used herein, the term "measurement data" refers to data indicative of a dimension that are obtained by direct measurement at a single location, e.g., using a ruler, tape measure, micrometer, vector gauge, profilometer, and so on.

As used herein, the term "metadata" refers to classification data, e.g., OEM (original equipment manufacturer) data for the PDM, stator or rotor data.

"Minimum valley" refers to the height of the lowest one of r or s valleys or valley datapoints at a particular axial measurement location for a stator or rotor, e.g., min_valley_n where n refers to the scan or measurement number or location, or to the height of the lowest one of r or s valleys or valley datapoints in a set of n scans taken at or near a plurality of n axial measurement locations collectively, i.e., min_valley.

As used herein, the term "minor ID" refers to the smallest inside diameter of a hollow cylinder, and the term "SMID" to the stator minor ID determined at the lobe valleys.

As used herein, the term "minor OD" refers to the smallest outside diameter of a cylindrical object, e.g., the rotor measured along the lobe valleys.

As used herein, the terms "motor", "mud motor", "positive displacement motor" and "PDM" are used interchangeably to refer to positive displacement motors with hypocycloid surfaces arranged helically about an axis where a central rotor usually has one less number of lobes than an outer stator.

The characters n and N generally refer to the number of axial measurement or scan sampling locations, and the number of datapoints in a scan (or region), respectively, unless context indicates otherwise, and the character "n" used at the end of a variable name connotes a set or vector of n values corresponding to the number n of the axial measurement or scan sampling locations.

As used herein, the term "peak" refers to a geometric surface feature of a generally circular profile at or near a maximum magnitude of distance from an axis or other reference point to the feature, e.g., a (concave) stator lobe feature lying on or near its major ID, or a (convex) rotor lobe feature lying on or near its major OD.

As used herein, the term "power section" refers to the portion of a mud motor comprising the rotor and stator elements.

As used herein, the term "profile" refers to a 2- or 3-dimensional representation of features of a surface of an object, such as texture, topography, or roughness, especially the height, depth, and spacing of a series of peaks and valleys.

As used herein, a "profilometer" is an instrument used to measure the profile of a surface, especially the height, depth, and spacing of peaks and valleys, especially on a small scale, e.g., with accuracy better than 0.01 or 0.001 in. An "optical profilometer" is a profilometer that uses reflections of various types of light or other electromagnetic radiation such as a laser beam ("laser profilometer") to measure surface features in a line or area, as opposed to a contact profilometer that uses a stylus dragged across the surface. Optical profilometry may be based on interferometry (e.g., digital holographic microscopy, vertical scanning interferometry/white light interferometry, phase shifting interferometry, differential interference contrast microscopy), focus detection (e.g., intensity detection, focus variation, differential detection, critical angle method, astigmatic method, Foucault method, confocal microscopy), pattern projection (e.g., fringe projection, Fourier profilometry, Moire, pattern reflection methods), or the like. Optical profilometers such as laser gauges may use mechanical placement or centering devices to hold them in place while collecting measurement data, e.g., while taking a scan inside a generally cylindrical object such as a PDM stator.

As used herein, the term "radial" in connection with imaging, scanning, profilometry, etc., refers to taking measurements or data along an inside or outside diameter with respect to an axial point or line, e.g., a 2-dimensional scan from or around a particular point along an axis or a 3-dimensional scan from or around a series of closely spaced points along the axis.

As used herein, the terms "radial laser [or optical] profilometric scan" and "RLP scan" are used interchangeably herein in reference to the profilometric measurements of the heights and depths of surface data, i.e., the profile data, e.g., datapoints from peaks, flanks, and valleys, collected by radially scanning with an optical profilometer such as, for example, a laser gauge. The terms "scan", "imaging scan" and "laser scan" may also be used herein to refer to optical profilometric data or the use of an optical profilometer to collect profilometric data.

As used herein, the term "rotor" refers to the rotatable part of a mud motor that performs or supports a hydraulic function of the motor.

As used herein, the term "stages" refers to the number K of revolutions the lobes of the power section elements make around the element.

As used herein, the term "statistical data" refers to data that are or can be calculated or extracted from measurement data, such as a maximums, minimums, means, deviations, and so on, and also includes differences between two locations whether they are calculated or measured directly.

As used herein, the term "stator" refers to the stationary part of a mud motor that performs or supports a hydraulic function of the motor.

A "supervised learning algorithm", as used herein, uses labeled data, as in an input feature vector, that have known output or target variables, as in a target vector, and learns a mapping from the input data to the output labels, and then it can make predictions or classifications on new, unseen data, as in a prediction vector. Examples of supervised learning algorithms are linear regression, logistic regression, decision trees, ordinary least squares regression, support vector machines, k-nearest neighbors, naive Bayes, clustering, random forest, and so on.

As used herein, a "target vector" is a list or array of output labels mapped to a feature vector by a machine learning algorithm.

As used herein, the term "valley" refers to a geometric feature of a generally circular profile at or near a minimum magnitude of distance from an axis or other reference point to the feature, e.g., a (convex) stator lobe feature lying on or near its minor ID, or a (concave) rotor lobe feature lying on or near its minor OD.

A vector gauge is a special caliper that is adapted for measuring the inside diameter of a cylinder by extending a number of calibrated shoes radially outwardly into contact with the cylinder surface.

As used herein, the term "wander" refers to the cumulative wobble magnitudes of the center or region of a group of datapoints over a number of scans n.

As used herein, the term "wobble" refers to the distance of the geometric center of a set of datapoints in an element from an axis of the element.

EMBODIMENTS DESCRIPTION

The present disclosure is directed to the machine learning (ML) of characteristics of a positive displacement motor (PDM) as discussed above in connection with FIGS. 1-4, such as the dimensions of the power section elements such as the stator 3 and/or rotor 4 and their geometric features like peaks 3a, 4a, valleys 3b,4b and flanks 3c, 4c; and/or the operating performance, including the interrelationships between mud flow rate (gallons per minute (GPM) or liters per minute (LPM), rotations per volume of mud (rotations per gallon or liter (RPG or RPL), differential pressure across the motor (DP), torque output, etc.; and so on.

The discussion below is in the context of a PDM power section element being a stator and where the surface is an inner surface; however, this is merely an example for the purpose of clarity and the principles of the present invention could similarly be applied to rotor geometry or other elements with complex surfaces, e.g., epicycloid or other hypocycloid surfaces such as gears, for example.

The number r of rotor peaks is an integer that typically ranges from 2 to 10 and the number of stages K can range from 1 to 5, but the values of r, s, and K are not a limitation on the invention.

Figure 8:
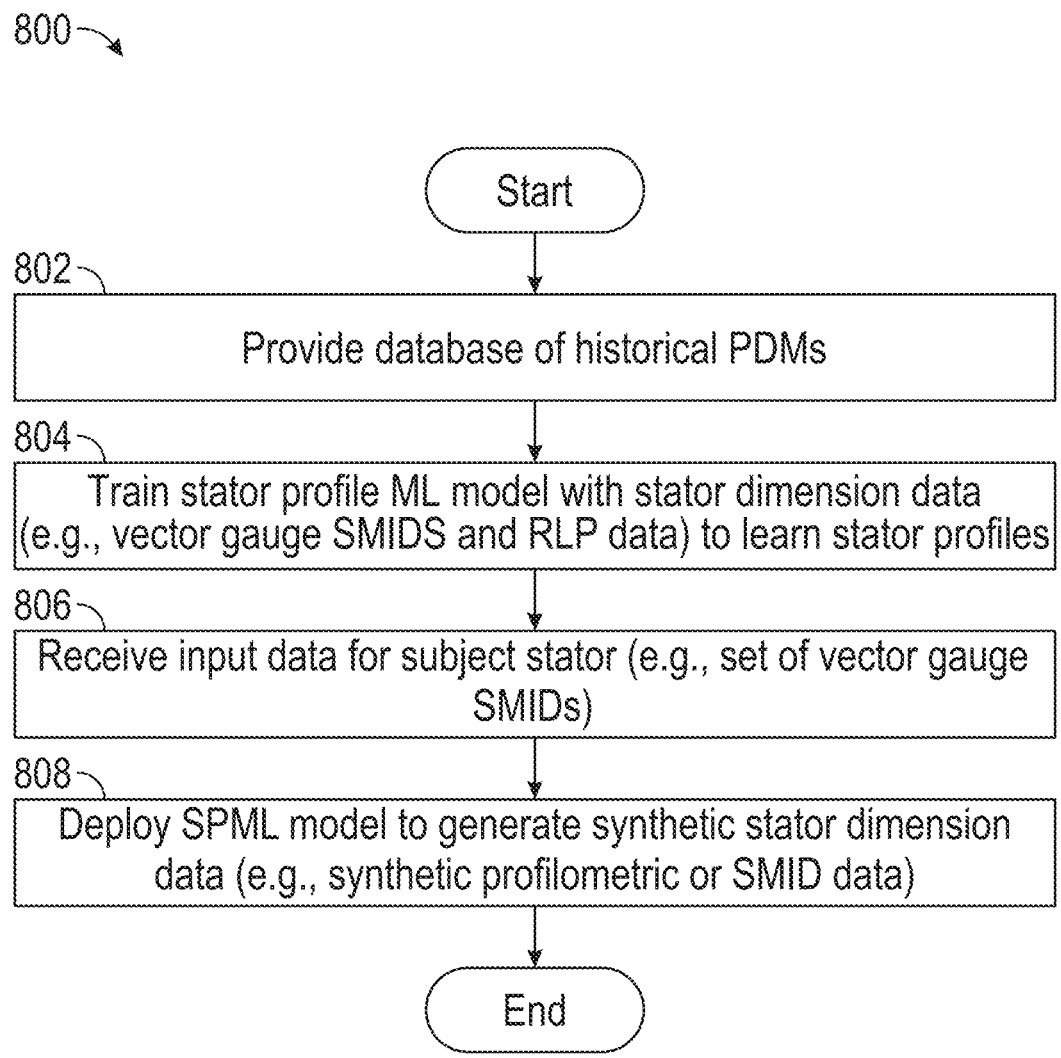
FIG. 8 is a simplified flow chart of a computer-implemented method for generating synthetic stator measurement data for a PDM according to embodiments of the disclosure herein.
Figure 9:
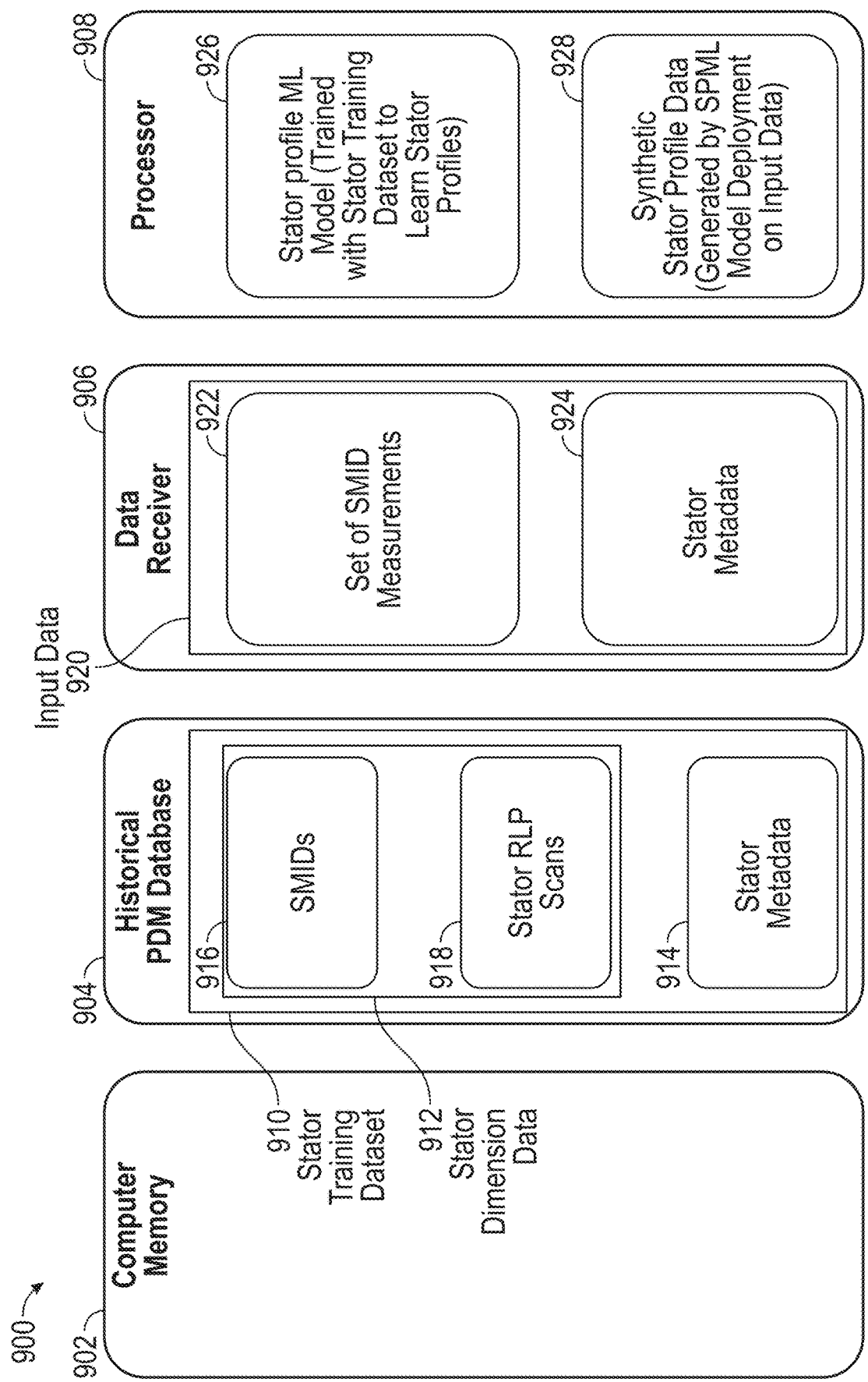
FIG. 9 is a simplified diagram of a computer-implemented system for generating synthetic stator measurement data for a PDM using the method of FIG. 8 according to embodiments of the disclosure herein.

With reference to FIGS. 8 and 9, there is disclosed a method 800 for generating synthetic stator measurement data that can be implemented, for example, in a computer system 900 comprising a computer memory 902, a database 904 of historical PDMs comprising respective stators 3 and rotors 4, a data receiver 906, and a processor 908, according to embodiments herein.

The method 800 comprises a step 802 of providing the database 904, which comprises, among other things, (1) a stator training dataset 910 comprising stator dimension data 912 and (2) stator metadata 914. The stator dimension data 912 are based on (1) mechanical stator minor inside diameter (m-SMID) measurements 916 from some or all of the n measurement/scanning locations L1 to L6 (m-SMID_n) seen in FIG. 5, e.g., taken with vector gauge 20; and (2) stator radial laser profilometric ("RLP") scans 918, e.g., obtained using laser gauge 25 at some or all of the n measurement/scanning locations L1 to L6.

Thus, the stator dimension data 912 are generally obtained as a set of n measurements and/or scans taken with, e.g., a vector gauge 20 or a laser gauge 25, respectively, in each of the stators 3. The number n of measurements and/or scans obtained should be sufficient to inform an ML model of the attributes of the stator 3 or other element measured or scanned, but not so many measurements/scans that the model is overwhelmed with data. For example, n is at least 2 (e.g., at least one at or near each end) but may range up to 20 or more as desired (e.g., up to 10 or more from either end). Preferably, the number of measurement/scan locations n ranges from 4 to 10 (e.g., from 2 to 5 from either end), more preferably from 4 to 8 (e.g., from 2 to 4 from either end), and especially about 6 (e.g., 3 from either end).

The n measurement/scan locations are preferably from the same approximate locations in each set, e.g., at or near the ends of each stator 3 and about 2-3 ft and about 4-6 ft from each end. While consistency in the number n of the measurements/scans and locations L1 to L6 among and between stators 3 and PDMs 2 is desirable for machine learning (ML), the precise location and even the number of measurement/scan locations n are not especially critical and may, for example, occasionally vary among the sets of measurements and scans for the database 904 and/or the input data 922. In the following discussion, for the purposes of illustration and clarity, n=6 is used as an example, but this is not a limitation on the invention.

The m-SMID measurements 916 will thus include a set of n measurements (m-SMID_n), where n is the number of measurement locations. This vector of m-SMID_n measurements is preferably additionally used to extract an average m-SMID value (m-SMID_mean) and/or a mean absolute deviation value (m-mad_SMID), which can also populate the m-SMID measurement data 916 in the stator training dataset 910 in the database 904. The m-SMID_mean and m-mad_SMID values can be extracted from the m-SMID_n as follows:

$$m-\text{SMID\_mean} = \frac{1}{n}\sum_{i=1}^{n} m-\text{SMID\_n} \qquad \text{(Equation 2)}$$

$$m-\text{mad\_SMID} = \qquad \text{(Equation 3)}$$
$$\frac{1}{n}\sum_{i=1}^{n} |m-\text{SMID\_n} - m-\text{SMID\_mean}|3 \ldots 22$$

where m-SMID_n is the set of mechanical SMIDs (e.g., by vector gauge 20) at each measurement location (e.g., L1 to L6), n is the number of measurement locations, m-SMID_mean is the average mechanical SMID of all measurement locations collectively, and m-mad_SMID is the mean absolute deviation of the mechanical SMIDs of all measurement locations collectively. The m-SMID_mean and m-mad_SMID values may be calculated manually, but are preferably calculated automatically, e.g., in the processor 908 when input, and may reside in the database 904.

Similarly, in an embodiment the stator RLP scan data 918 may comprise, for example, the corresponding laser (or other optical profilometer) derived SMID values for each of the n scan locations (L-SMID_n), a mean SMID value (L-SMID_mean), and a mean absolute deviation value (L-mad_SMID), which may be extracted, for example, in step 1812 as discussed below in connection with FIGS. 16-18. In other embodiments, the RLP scan data 918 may comprise, for example, the preprocessed RLP scan data output from step 1618 (FIG. 16) and/or the statistical RLP data extracted in steps 1806, 1808, 1810, and/or 1812 (FIG. 18).

The stator training dataset 910 also comprises stator metadata 914, for example, OEM classification data specific for each stator 3 in the database 904, such as elastomer type, number of lobes, number of stages, motor size (or size range), and so on.

In step 804 (FIG. 8), the method 800 trains a stator profile ML (SPML) model 926 (FIG. 9) with the stator training dataset 910 to learn stator profile data 928 from the stator dimension data 912, e.g., the learned stator profile data 928 can comprise stator SMID data or preferably stator profile information including information characterizing stator peaks 3b, valleys 3c, flanks 3d, and so on.

In step 806, input data 920 (FIG. 9) are received for a subject PDM. The input data 920 comprise a set of mechanical SMID measurements taken, e.g., with a vector gauge 20 (FIG. 5), preferably with the same or a similar number n, manner, and approximate locations L1 to L6 of the spaced axial measurements discussed above in connection with the database 904; however, this is not a strict requirement since the method will also function with a lesser or greater number of measurement locations n and/or slightly different locations in the subject stator than with respect to the historical stators in the database 904.

Then, in step 808 the SPML model 926 is deployed on the input stator data 920 comprised of mechanical SMID measurements 922, preferably without any laser data, e.g., the m-SMID_n values, the m-SMID_mean value, and/or the m-mad_SMID value, the later two of which can be calculated manually or preferably automatically in the processor 908. The SPML model 926 generates synthetic stator profile data 928. The synthetic stator profile data 928 generated in step 808 can comprise, for example, a synthetic mean SMID (s-SMID_mean), a set of synthetic SMID measurements for each of the measurement locations L1 to L6 (s-SMID_n), and/or a mean absolute deviation SMID value (s-mad_SMID), with improved accuracy similar to the SMID measurements as if captured with the laser gauge 25. For example, as discussed below in Example 3 and shown in FIG. 34, these synthetic laser measurements are almost always more accurate than the vector gauge 20 measurements and in these examples are on average typically at least 0.0035 in. more accurate.

These synthetic SMID measurements 928 can then be used in one embodiment to calculate the Fit* parameter for conventional PDM performance estimation or can be used in a motor performance ML (MPML) model 2326, 2520, 2732 (FIGS. 23, 25, 27) used to estimate PDM performance data, for example, where the MPML model is trained with a performance training dataset of the stator profiles learned by the SPML model 926. For example, where the SPML model 926 and the MPML model are trained with m-SMID data (m-SMID_n, m-SMID_mean, and/or m-mad_SMID) and L-SMID data (L-SMID_n, L-SMID_mean, and/or L-mad_SMID), and other stator/PDM metadata, rotor data, and/or PDM performance data as appropriate, the SPML model 926 can generate the corresponding synthetic SMID data (s-SMID_n, s-SMID_mean, and/or s-mad_SMID; collectively "s-SMID data"). The s-SMID data in the synthetic stator profile data 928 can then be used as input subject stator dimension data (in lieu of input RPL scans) for deployment of the MPML model, as discussed below in connection with FIGS. 26-28.

Preferably, the synthetic stator profile data 928 comprise information about geometrical features present in the stator profile such as, for example, peaks 3b, valleys 3c, flanks 3d, and so on, that are not captured by the mechanical SMID measurements such as obtained with the vector gauge 20, since the SMID data only reflects the approximate average of the minimum valley distance magnitudes from the stator axis in each respective measurement locations L1 to L6. The synthetic stator profile data 928 preferably comprise synthetic stator profilometric statistical data, and/or a vector of RLP scan-type coordinate data, which may include preprocessed scan data and/or extracted statistical data (see discussion of FIGS. 10-19 below). Additionally, the synthetic stator profile data 928 may be embedded in a latent space 2124 of proposal data vectors 2125 as discussed in more detail below in connection with FIGS. 20-21. These synthetic stator profile data 928 can be used in MPML model 2326, 2520, 2732 (FIGS. 23, 25, 27) for PDM performance prediction, with improved accuracy and reliability relative to the Fit* parameter method as discussed in connection with Examples 1-2 and FIGS. 7 and 30-33.

Figure 5:
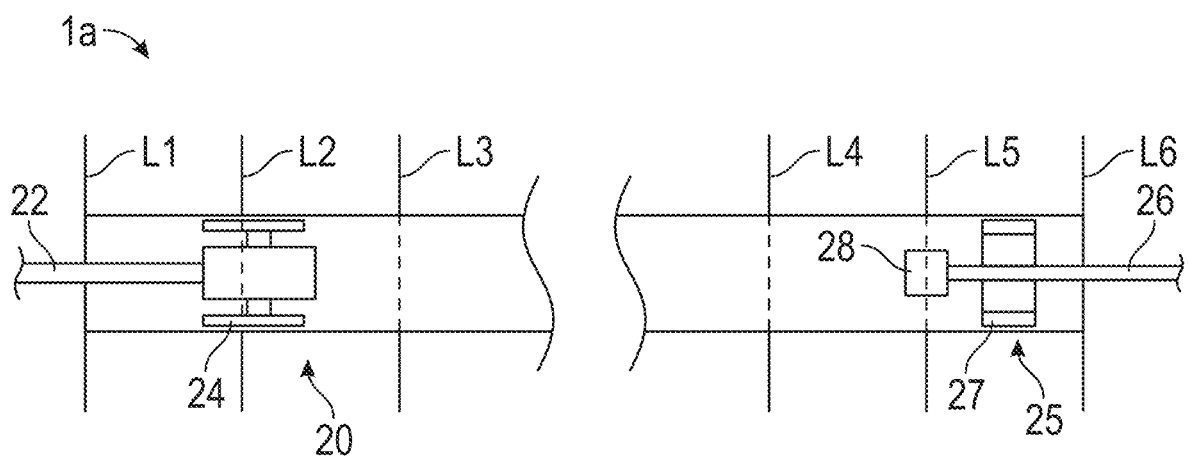
FIG. 5 is a side view showing relative measuring locations of a PDM stator according to embodiments disclosed herein.
Figure 10:
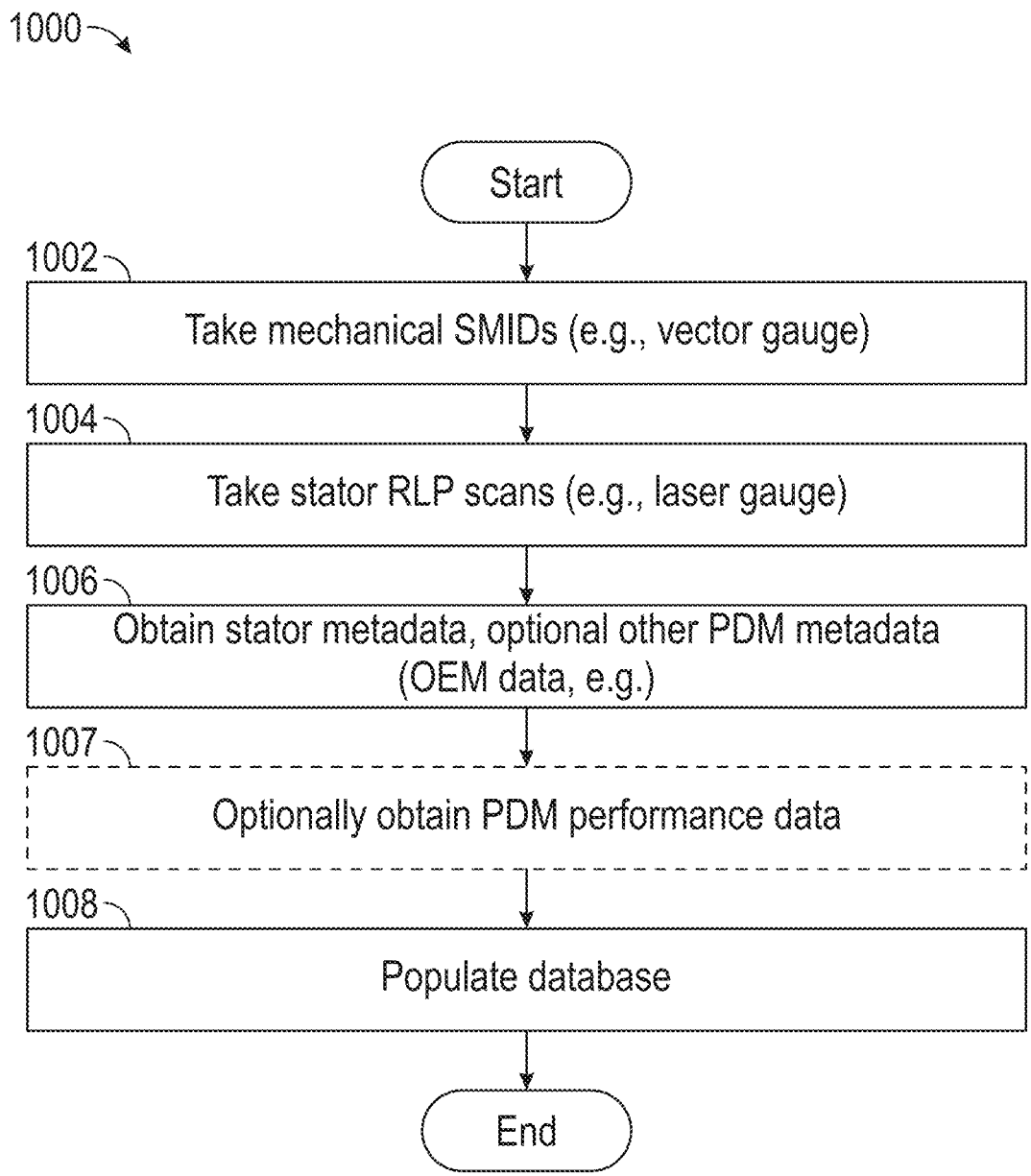
FIG. 10 is a simplified flow chart of a method for building a database for machine learning of stator profiles according to embodiments of the disclosure herein.

Preferably the method 800 comprises building the database 904 according to the flow chart embodiment of method 1000 shown in FIG. 10, which comprises:
(1) in step 1002 taking the mechanical SMID measurements 916 for the historical PDMs at or near a plurality of spaced axial measurement locations n, which can be the same as L1 to L6 (FIG. 5);
(2) in step 1004 taking the RLP scans 918 for the historical PDMs at or near a plurality of spaced axial scan locations n, which can be the same as L1 to L6 (FIG. 5);
(3) in step 1006 obtaining the stator metadata 914 for the historical PDMs, e.g., elastomer type, number of lobes, number of stages, motor size or size range, and so on. Step 1006 may also comprise obtaining other PDM metadata, e.g., where PDM performance is to be predicted (e.g., see FIGS. 21-33 and discussion thereof below);
(4) optionally obtaining PDM performance data in step 1007, e.g., by evaluating the PDM on a dynamometer, or otherwise obtaining the evaluation data, which can include, for example, the relationship between torque and differential pressure (DP), e.g., slope of a linear relationship between torque and DP, maximum recommended full load DP (FLDP) to avoid excessive loss of stator life, full load torque, and so on; rotational speed (RPM) of the rotor as a function of volumetric flow rate (e.g., rotations per gallon (RPG) or per liter (RPL)) and/or DP, e.g., full load RPM, full load flow rate; and so on; and
(5) in step 1008 populating the historical PDM database 904 with the mechanical SMID measurements 916, the RLP scans 918, and the stator metadata 914 for the historical PDMs, and where desired the other PDM metadata and PDM performance data.

RLP Data Preprocessing—Data Acquisition and Feature Alignment

Figure 11:
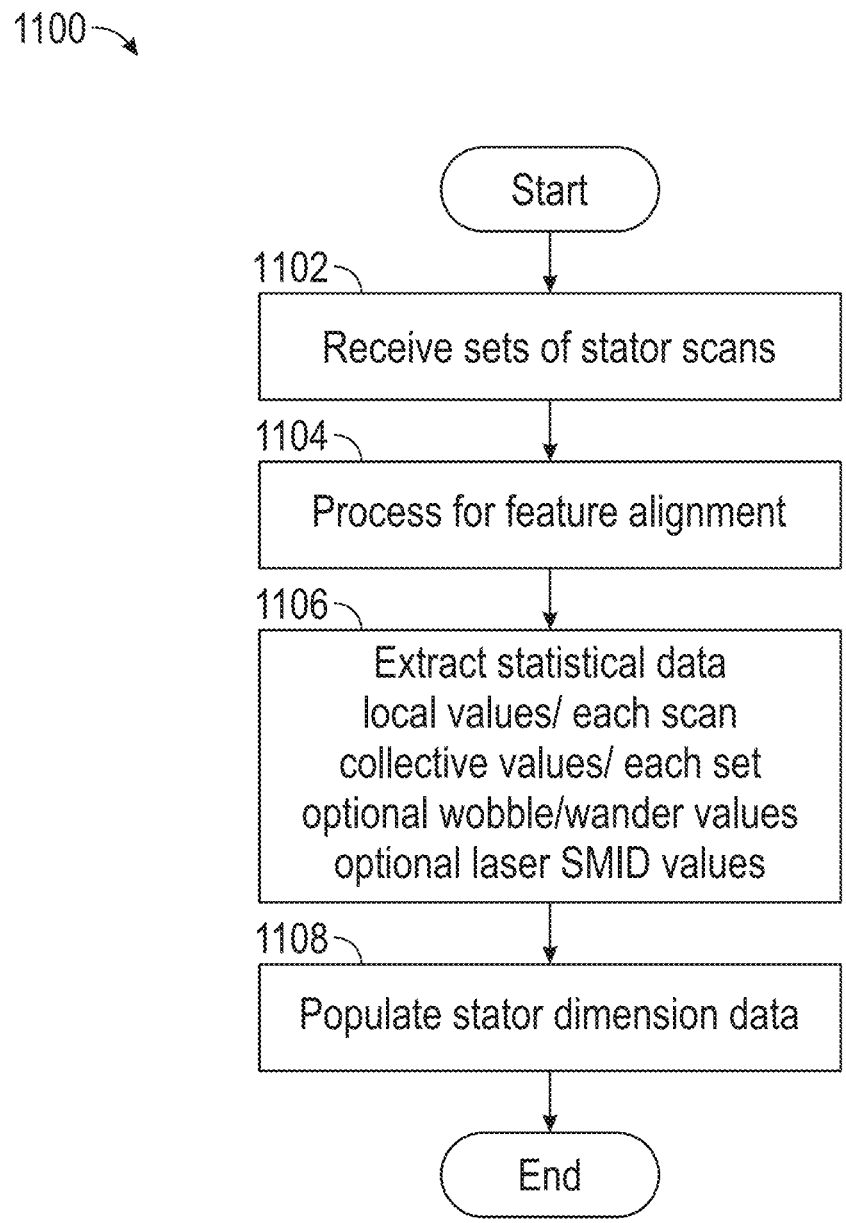
FIG. 11 is a simplified flow chart of a method for acquisition and conditioning of radial laser profilometric (RLP) scan data for machine learning of stator profiles according to embodiments of the disclosure herein.

FIG. 11 illustrates an embodiment of the invention for a processing method 1100 of the RLP scan data to facilitate use in machine learning (ML). Conditioning or preprocessing of the data in processing method 1100 facilitates analysis of the detailed attributes with the objectives to discern differences, detect alterations, or highlight specific attributes within the distinct contours of the stator 3, and during comparisons among stators with otherwise identical specifications. The RLP data processing method 1100 comprises in preprocessing step 1102 receiving a set of stator scans 918 (FIG. 9), and preprocessing the scans 918 for feature alignment in step 1104. As discussed in more detail below, if desired, the method 1100 can also include a processing step 1106 for extracting RLP statistical data. Step 1108 populates the stator dimension data 912 in the stator training dataset 910 with the extracted RLP statistical data, and, if desired, the extracted RLP statistical data may be kept in the database 904.

In any embodiment where the RLP scans 918 are used, a laser profilometer 25 (FIG. 5) can be used in step 1102 to obtain the limited number n of scans radially of the inner surface of the stator insert 3f (FIGS. 2-3) at the respective n axial locations that are spaced apart, e.g., at locations L1 to L6, as discussed above.

Each scan preferably gathers coordinates of points on the inner surface of the stator insert 3f that correlate to magnitudes of distances between the stator axis and the respective points and directions of the points with respect to the axis. Cartesian coordinates are discussed herein as an example, but this is not a limitation on the invention since polar coordinates, for example, could also be used. The optical profilometer used for the scans can be any suitable imaging device for collecting accurate profilometric measurement data for the stator 3, such as, for example, the laser gauge 25 (FIG. 5). The discussion below refers to the laser gauge 25 by way of example and not limitation for the purposes of illustration and clarity.

The laser gauge 25 is typically positioned axially in the stator 3 via rod 26 and held in position via self-centering arms 27 while the scan data are acquired. Each scan generally acquires coordinates of the surface points by radially scanning the stator surface. For convenience and clarity, as an example, and not as a limitation, the optical profilometer is referred to hereinbelow as a laser device or laser gauge for scanning the stator 3 and obtaining the imaging or RLP scans. The laser data may be placed in an electronic file which is transferred into the database 904.

Where optical profilometric data for the rotor 4 are optionally obtained, a coordinate-measuring machine (CMM) or 3D optical image mapping machine can be used to extract the rotor geometry analogous to the laser gauge 25 used for the stator geometry.

The conditioning of the RLP data into a prepared format suitable for ML processing includes preprocessing in step 1104 for feature engineering and alignment with the preferred degree of precision which can be demanded for the application of some types of deep learning neural networks. The preprocessing step 1104 refines raw laser data by smoothing, interpolation, normalization, and so on, to mitigate noise, outliers, and superfluous data. The feature engineering preferably identifies reference points or attributes in the dataset conducive for alignment, depending on the data variant being aligned.

The feature alignment of the high precision laser data obtained from the laser gauge 25, e.g., an array of 3600 datapoints for each scan times n=6 scans, can be extremely important to obtain an ML solution, depending on the algorithm(s) employed. We observed what we call "the principle—and the paradox—of precision alignment". The principle postulates that as the scale of observation narrows, the complexity in aligning the high-precision data across disparate samples increases. The accuracy of the laser scans considered herein generally passes a critical point where intrinsic variability takes precedence in alignment considerations, viz., granular noise in the data can obscure extrema points desired to be used for the alignment. On the other hand, the paradox of precision alignment is that, as the data become more exact and the probability of an accurate alignment diminishes, there is a need to incorporate advanced algorithmic and/or statistical methods that are generally applied to data with lesser precision.

Figure 12:
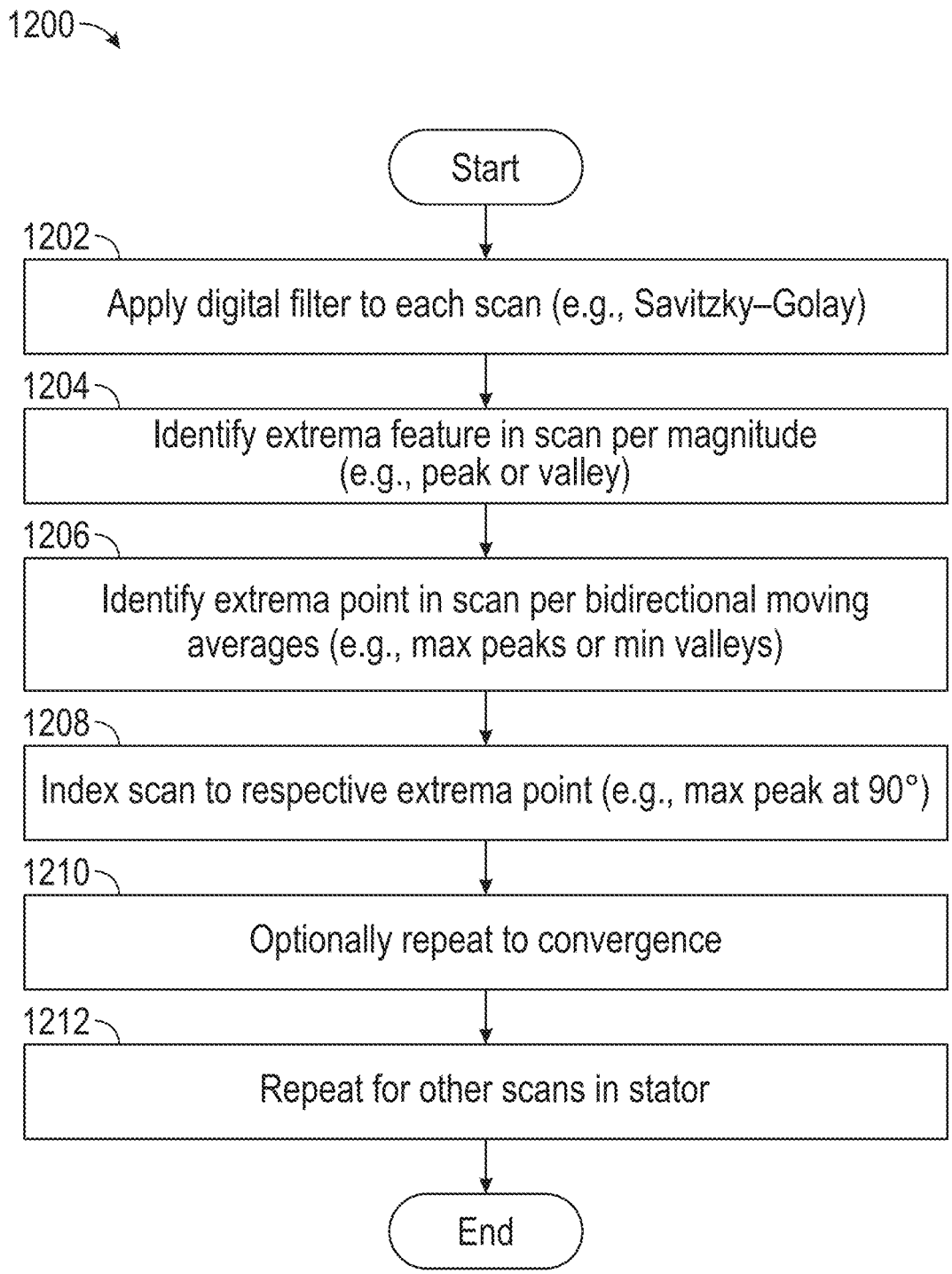
FIG. 12 is a simplified flow chart of a method for preprocessing of RLP scan data for machine learning of stator profiles according to embodiments of the disclosure herein.

One solution for the preprocessing step 1102 is a preprocessing method 1200 for the laser data as illustrated in the embodiment of FIG. 12, which comprises:
(1) for the RLP scans in a set from a particular stator at different axial positions, applying a digital filter in a step 1202 to smooth granular noise;
(2) identifying an extrema feature in the RLP scan in a step 1204, which is based on magnitude of distance from an axis of the stator to datapoints in the respective extrema feature;
(3) identifying an extrema point in a first one of the RLP scans in a step 1206, which is based, for example, on respective intersections of bidirectional moving averages or another processing technique normally employed to process data of low precision;
(4) if necessary, indexing or radially shifting the RLP scan in a step 1208 to assign the respective identified extrema point to a common alignment angle;
(5) if desired, in an optional step 1210, steps 1204, 1206, and/or 1208 can be repeated one or more times to convergence, i.e., until the extrema feature identified in step 1204 is the same as the extrema point identified in step 1206 or within a pre-set tolerance, and no further indexing is required in step 1208; and
(6) in step 1212, repeating the above procedure for the other RLP scans in the stator set so that the extrema points for all scans in the set are aligned to the common alignment angle.

In step 1202, a digital filter can be applied to smooth any granular noise in the scans. Any suitable digital filter can be used, for example, the digital filer can use an impulse response or a difference equation with feed-forward or feed-backward, and can be recursive or non-recursive, direct, series, cascaded, parallel, lattice and ladder, state-space structured, coupled, and so on. Preferably, the digital filter is a Savitzky-Golay filter, e.g., a first order or second order Savitzky-Golay filter, which is a well-known digital filter. Step 1202 can also include removal of unusable data such as bad datapoints in a scan, e.g., due to the presence of liquid or dirt on the stator surface, and/or scans in a set, e.g., where the laser gauge was not positioned correctly or malfunctioned.

Then, in step 1204 extrema features, e.g., peaks 3b or valleys 3c, in the RP scans are identified based on magnitudes of distance from an axis of the stator to datapoints in the respective extrema features. For example, the maximum magnitude peak or the minimum magnitude valley in each scan can be identified as a datapoint or region, e.g., a suspect or candidate datapoint(s) in one of the suspect or candidate peaks or valleys among the peaks or valleys in the scan. In other words, if the maximum peak point is chosen for the alignment feature, the peak in the scan with the point having the largest distance magnitude is selected as the extrema feature.

However, due to the precision of the laser data and granular noise, together with the relatively flat slope at the tips of the features (see FIGS. 13-15), using the magnitude alone as in step 1204 may misidentify the true maximum peak datapoint, illustrating our principle of precision alignment. To overcome this difficulty, the step 1206 is used to check the centrality of the extrema from step 1204 and identify the extrema points in the radial imaging scans, e.g., the maximum peak or minimum valley, based on respective intersections of bidirectional moving averages. This technique obtains a moving average of the areas under the curves traced by the datapoints in a data window as the suspected extrema point is approached by the data window from either side, and the datapoint where the moving average values are the same, i.e., intersect, from both directions is identified as the correct extrema datapoint. The size of the data window should be large enough to encompass a substantial portion of a respective side of the extrema feature on approach to the intersection, e.g., the peak or valley, but should not be so large that it extends beyond the extrema feature into the next peak or valley such that the average calculated includes interference from the adjacent feature. This technique exemplifies the paradox of precision alignment by employing the bidirectional moving average technique, which is more commonly applied to low-precision data.

Then, if steps 1204 and 1206 do not obtain the same extrema in a scan, in step 1208 the scan is indexed by rotationally shifting the datapoints so that the extrema point from step 1206 is aligned to a common alignment angle. For example, the maximum peak or minimum valley from step 1206 in each scan can be set as N=1 aligned at, say e.g., 90 degrees.

Next, in step 1210, if indexing is needed to be applied in step 1208, steps 1204 and 1206 are preferably repeated, followed by indexing again as needed in the subsequent step 1208, to convergence, i.e., until the extrema feature by magnitude in step 1204 is the same as the extrema datapoint by the bidirectional moving average method in step 1206, or within a pre-set tolerance. For example, indexing the datapoints in step 1208 may result in a shift to angles requiring interpolation between datapoints in a table (e.g., where the calculated bidirectional moving average intersection is between datapoints), which could then result in a different peak or valley in a scan, or a different datapoint in a peak or valley, having the suspected extrema feature.

After the extrema datapoint is properly identified in the RLP scan, the process is then repeated in step 1212 for the other RLP scans in the set from the particular stator. The result is that the extrema points in all the RLP scans in the set for the stator 3 are aligned to the common alignment angle and consequently the features, e.g., peaks, valleys, and flanks in all the RLP scans in the set, are likewise aligned. Processing the RLP scans for each stator in the database results in a uniform feature alignment for all scans for all stators. This aligns the laser data in all the scans and for all stators scanned so that an identifiable feature can be used as a common reference point. For example, the maximum magnitudes of the lobe peaks farthest from the axis, or the minimum magnitudes of the lobe valleys closest to the axis, in each scan can always be set to a common alignment angle, e.g., 90 degrees. This surprisingly obtains the desired degree of precision feature alignment that is conducive to the implementation of some ML algorithms, e.g. an autoencoder framework, a convolutional neural network, and so on.

Figure 13A:
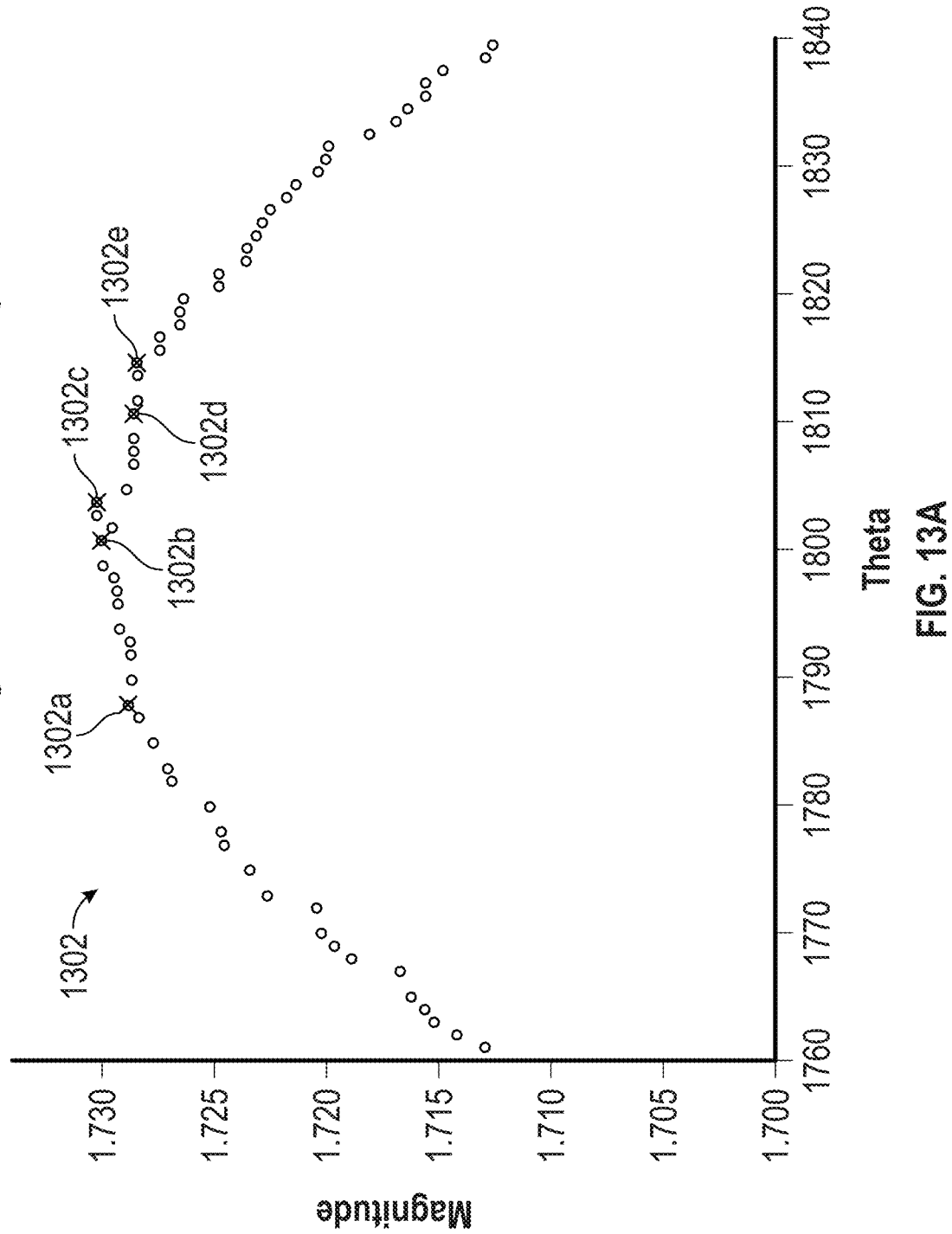
FIG. 13A shows an example of the granularity of raw RLP scan data from a stator peak region plotting magnitude versus theta with multiple candidate extrema points identified by their local magnitudes, according to embodiments of the disclosure herein.

By way of example, FIG. 13A shows the magnitude versus theta for raw datapoints 1302 in a peak region of a stator (theta=1760 to 1840) collected in an RLP scan, where theta is the number order of the datapoint collected by the laser gauge 25. It is seen that possible maximum peak candidate datapoints 1302a, 1302b, 1302c, 1302d, 1302e in the raw data have similar apparent magnitudes but the true extrema is obscured by the granularity of the datapoints 1302.

Figure 13B:
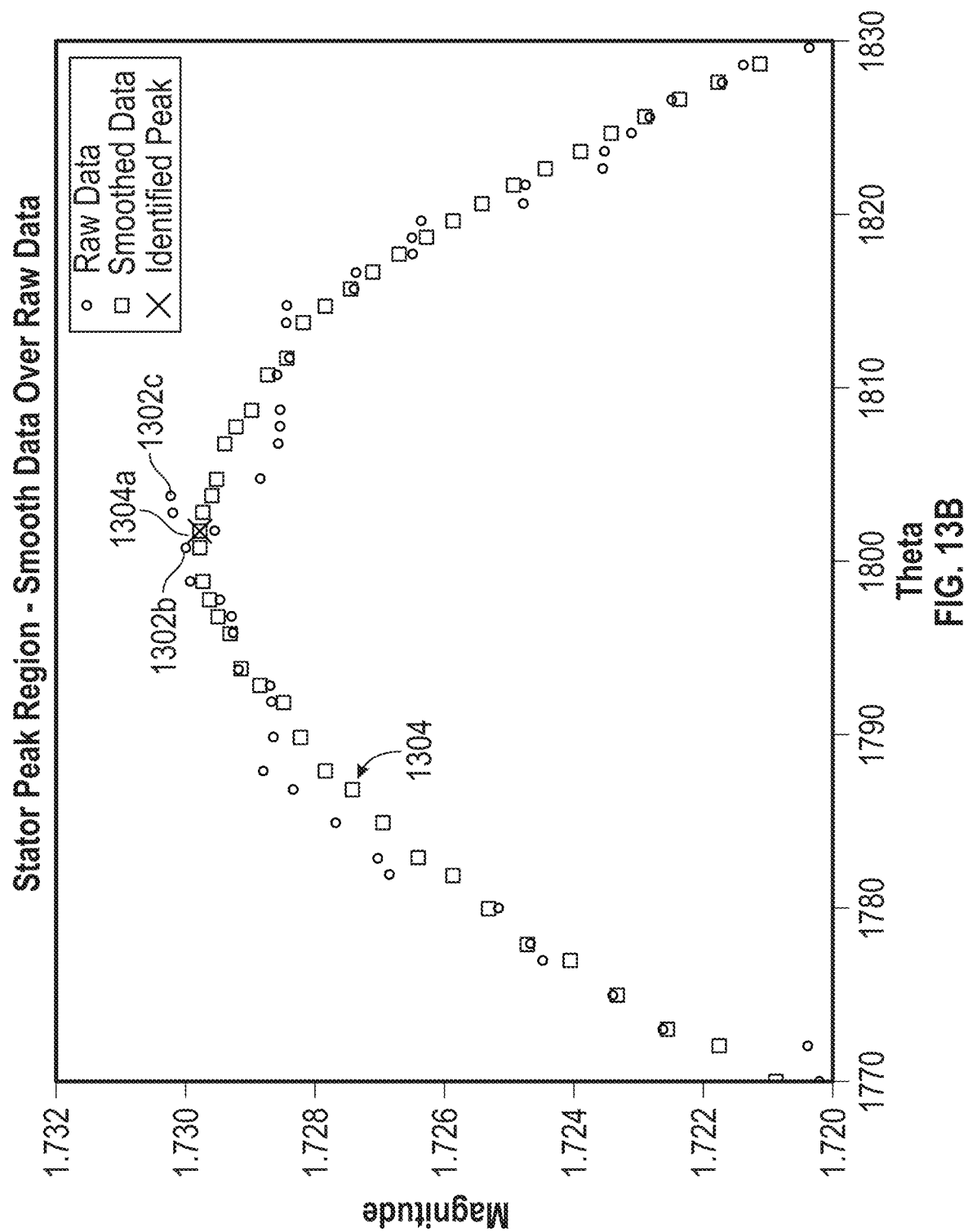
FIG. 13B shows an overlay of smoothed FIG. 13A RLP scan data by application of a filter, on the raw laser data from FIG. 13A, for an enlarged portion of the peak region with a candidate extrema feature selected by its magnitude, according to embodiments of the disclosure herein.

FIG. 13B shows an enlarged view of a portion of the same peak region with smoothed datapoints 1304 (open boxes) after application of a Sovitzky-Golay filter, superimposed over the raw datapoints 1302 (open circles). The maximum peak candidate datapoint 1304a in the smoothed data is identified by its magnitude and has a different theta value and a different magnitude than points 1302b, 1302c, for example. Additionally, it is seen that other smoothed datapoints 1304 adjacent to 1304a have similar magnitudes differing by an amount that is much smaller than the granularity reflected in the raw datapoints 1302.

Figure 13C:
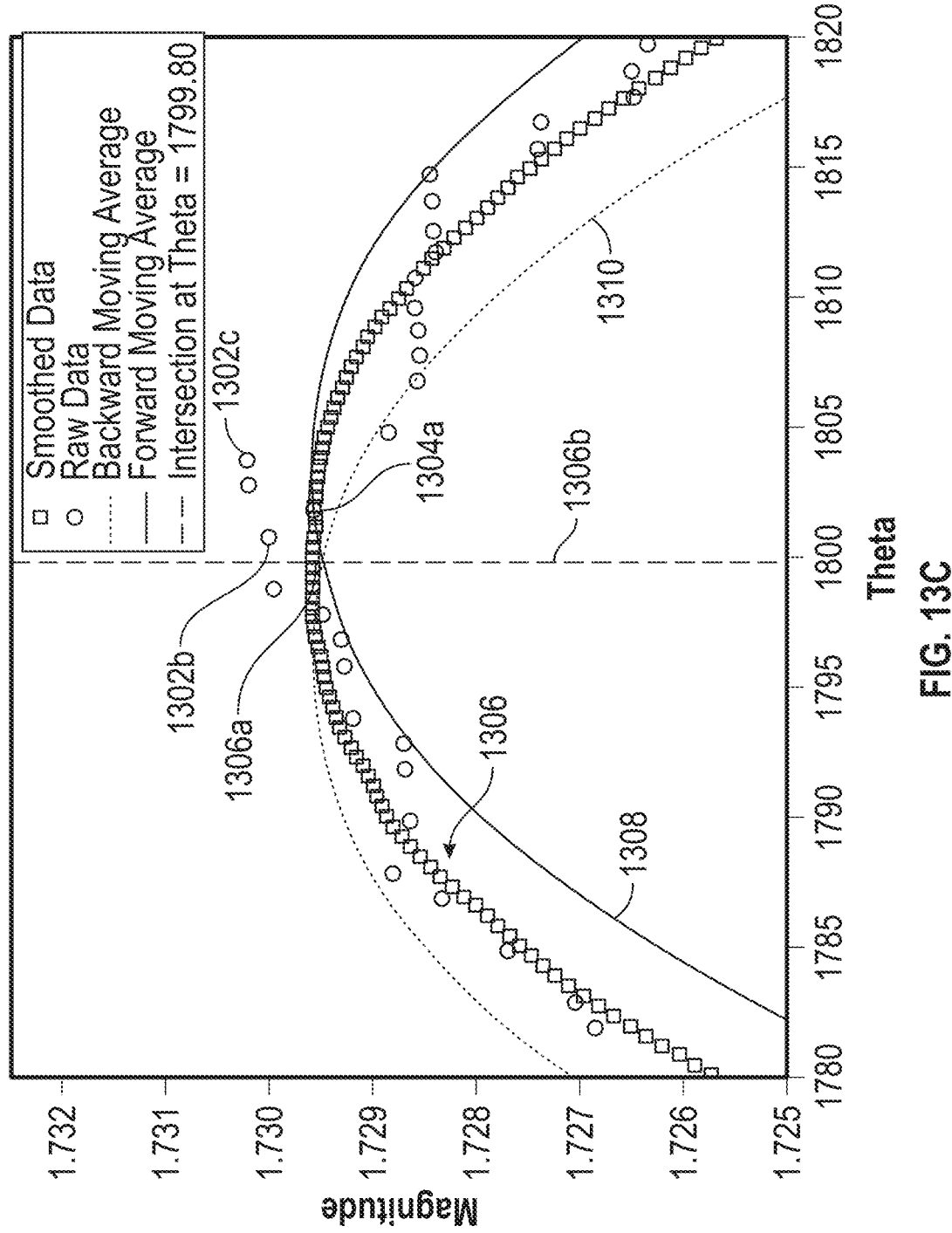
FIG. 13C shows an overlay of expanded and indexed datapoints from processing the smoothed data from FIG. 13B for the further enlarged peak region of FIGS. 13A, 13B, with an extrema point identified as the intersection of bidirectional moving averages, according to embodiments of the disclosure herein.

FIG. 13C shows smoothed and expanded datapoints 1306 (open boxes) for the same stator peak region of FIGS. 13A, 13B after processing iteration(s) to add additional theta values not present in the raw data 1302. The extrema datapoint 1306a is identified as the intersection 1306b of the bidirectional moving averages, i.e., the forward moving average 1308 and the backward moving average 1310, at theta=1799.80. The datapoints 1306 are populated for every theta value and may include additional points interpolated between the datapoints 1304, in contrast to the raw datapoints 1302 (FIG. 13A) and initial smoothed datapoints 1304 (FIG. 13B) that may be missing some theta values due to RLP scanning errors or bad data that were excluded. The maximum magnitude datapoint 1306a and intersection 1306b were obtained by preprocessing and indexing as described herein. The datapoints 1306 can be further processed by interpolating and shifting 0.20 theta to normalize theta=1799.80 at 90 degrees (not shown). Note in this example maximum magnitude peak datapoint 1306a obtained by bi-directional moving averages is spaced away from the raw extrema candidate datapoints 1302b, 1302c and the initial smoothed data extrema candidate 1304a based solely on magnitude.

Figure 14:
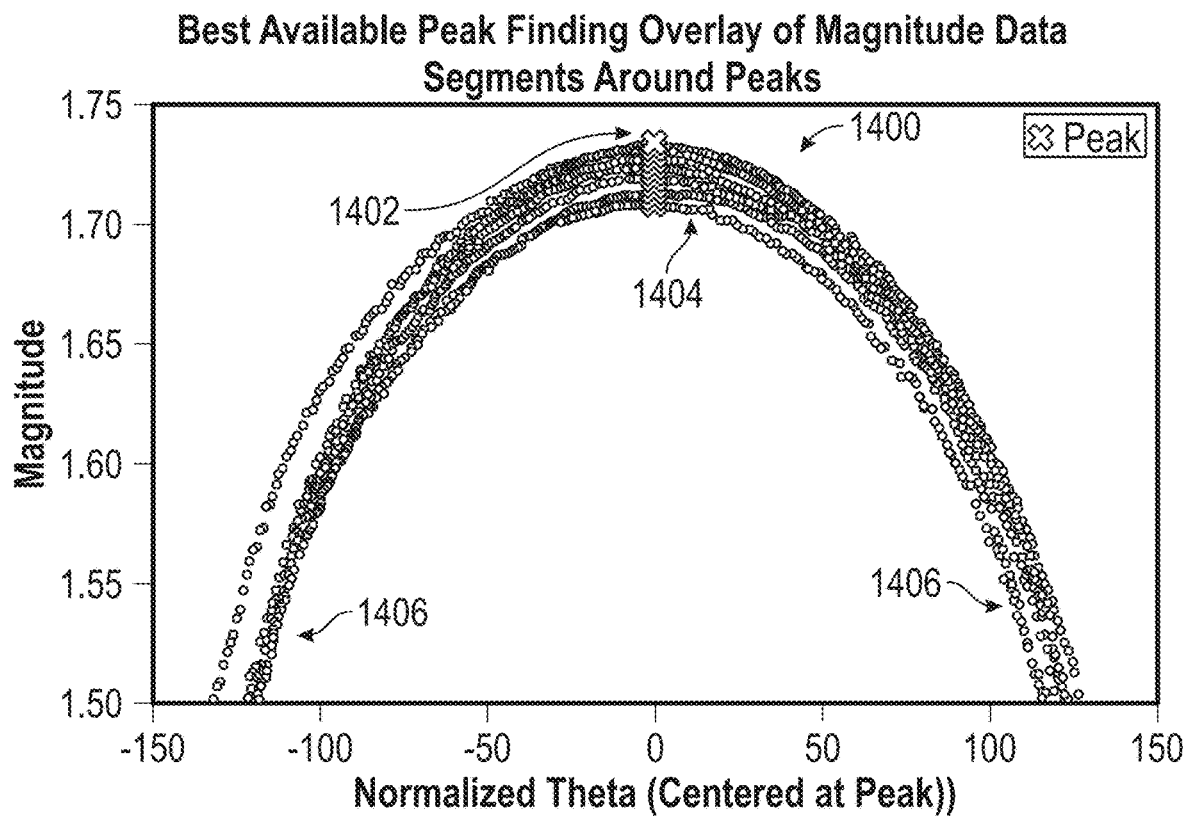
FIG. 14 shows an overlay of preprocessed laser data for the maximum peak regions with normalized theta for all lobes from a single scan of a stator at one axial measurement location, according to embodiments of the disclosure herein.

FIG. 14 is a best available peak finding overlay of magnitude data segments around peaks in an RLP scan stator with six lobes and shows an example of the precision of an overlay 1400 of the maximum magnitude peak datapoints 1402 from each peak region in the RLP scan, as determined by the location of the intersection of bidirectional moving averages and index shifting as described herein, with a normalized theta. It is seen that there is excellent feature alignment by the nearly identical alignment of the adjacent sub-maximum peak points 1404 and flank points 1406.

Figure 15:
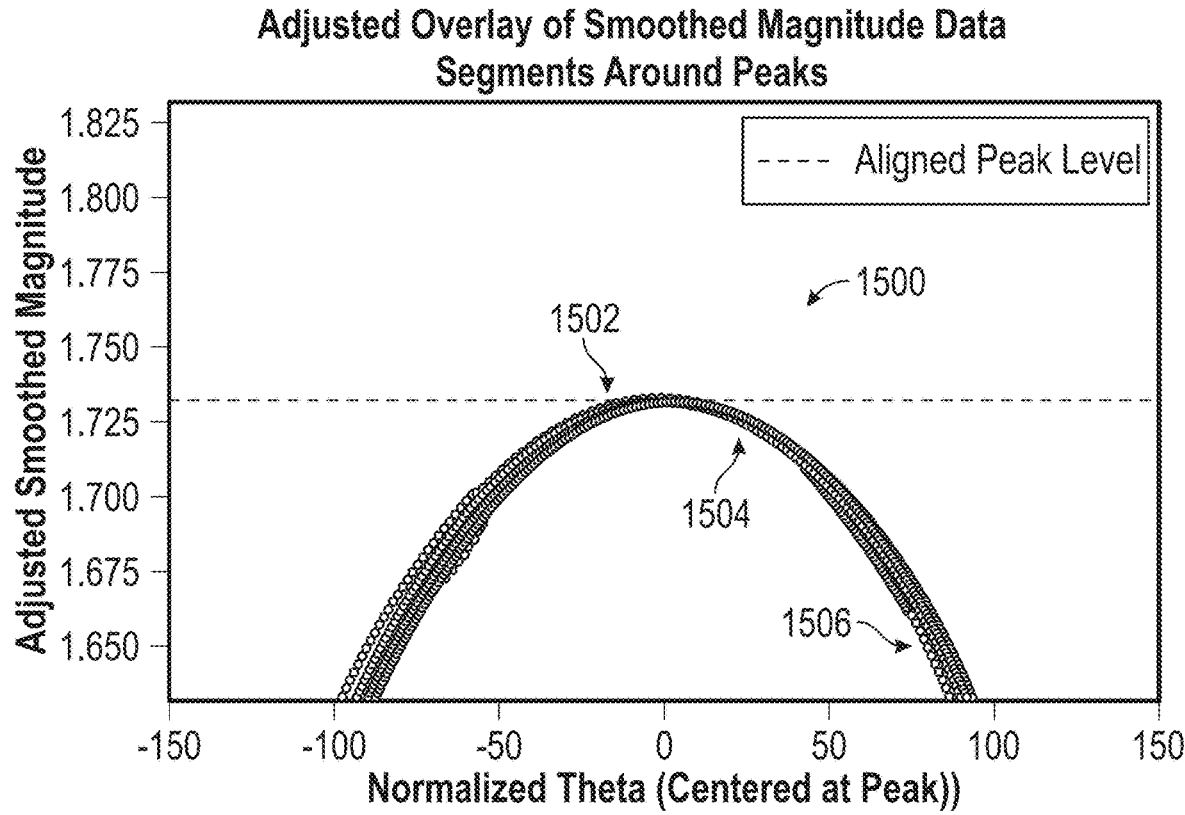
FIG. 15 shows an overlay of preprocessed profilometric data for the maximum peak regions with normalized theta from each scan in a set of six scans of a stator at different axial measurement locations according to embodiments of the disclosure herein.

FIG. 15 is an adjusted overlay of smoothed magnitude data segments around maximum peaks from each of six RLP scans at different axial measurement locations in a stator according to the present disclosure. FIG. 15 shows an example of the precision of an overlay 1500 of the maximum peak regions by maximum peak datapoints 1502 from each scan in a set of 6 scans from different axial locations in the same stator with a normalized theta, using the feature engineering and alignment according to embodiments herein, e.g., as determined by the location of the intersection of bidirectional moving averages. It is likewise seen that there is excellent feature alignment, not only at the peak datapoints 1502, but also by the nearly identical alignment of the adjacent sub-maximum peak points 1504 and flank points 1506.

Figure 16:
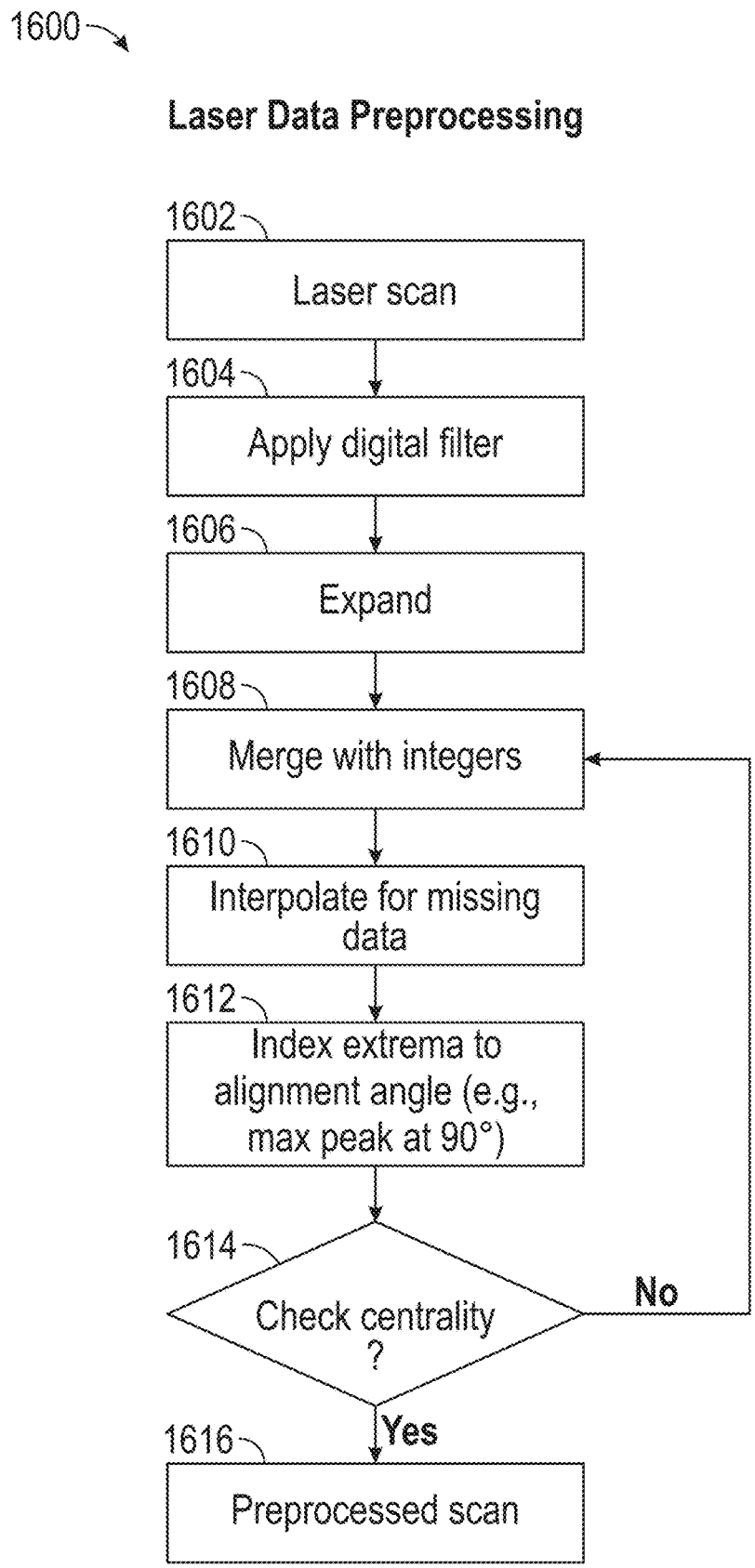
FIG. 16 is a simplified flow chart illustrating preprocessing of RLP data from stator scans according to an embodiment of this disclosure.

By way of further example, with reference to the exemplary detailed laser data preprocessing method 1600 shown in FIG. 16, in step 1602 the raw laser data in the RLP scans may be acquired in polar and/or cartesian coordinates, e.g., datapoints comprising an angle θ and a magnitude $r_i$ of the distance from the origin to the datapoint i on the surface of the stator, and/or values of $X_i$ and $Y_i$ where capital letters $X_i$ and $Y_i$, are used to designate the x and y coordinates including magnitude of the datapoint i for all theta values, e.g., i=1 to N in this example, where "theta" or "theta value" or "theta integer generally refer herein to the ordinal number N of the magnitude measurement in the scan as the laser moves from one radial position to the next as it travels around the axis of the stator at the axial scanning position, and N is the potential number of magnitude datapoints in the scan—note data at some theta values may be missing or bad or otherwise removed. By way of example, the laser gauge 25 can obtain an array of N datapoints where theta is an integer ranging from 1 to N, preferably where N is greater than 500, more preferably greater than 1800, and especially where N≥3600, i.e., at least ten theta integers for every degree of rotation where each theta increment corresponds to 0.1 degrees between adjacent datapoints, is used in the following example for the purpose of illustration and not limitation.

Application of a digital filter, which may include removal of unusable data or scans, is implemented in step 1604, in the manner as discussed above in connection with FIG. 12 and step 1202.

The data are then preferably expanded in step 1606, e.g., to include angle information separately. Cosine ($x_i$) and sine ($y_i$) values can be extracted by stripping magnitude from the X and Y coordinates of the datapoints so $x_i$, $y_i$ correspond to unit circle values for the i-th datapoint centered at 0, 0 on the cartesian plane. Lower case letters x and y are used herein to designate unit circle values stripped of magnitude to represent the angle $\theta_i$ of the corresponding i-th scan datapoint theta.

The data can then be merged in step 1608 by rounding a copy of the corresponding theta values and merging these with a vector of N theta integers. These data can then be merged with the corresponding unit circle ($x_i$, $y_i$) and magnitude features ($X_i$, $Y_i$) where they are found in the laser data. The data can then be populated with any missing values in step 1610 by completing the data as a time series, e.g., by iteratively interpolating the missing $x_i$, $y_i$, data for each, single one-step, until there are N datapoints for each x and y assigned to each theta, and interpolating again for any missing magnitude values $X_i$, $Y_i$, e.g., with the cubic spline interpolation technique. Thus, the dataset is completed in this example so that every theta integer is associated with values for angle ($x_i$, $y_i$) and magnitude ($X_i$, $Y_i$). Datapoints not assigned to a theta integer (i.e., between the theta integers) can normally be removed from the dataset at this point.

Next, in step 1612 the index of the data can be rotationally shifted so that an extrema reference point in each scan, e.g., the maximum peak (or minimum valley) magnitude value, is associated with the corresponding integer 1, i.e., max (X)=$X_1$, and the $x_1$ and $y_1$ values on the unit circle are at a fixed location, e.g., (0, 1) or 90 degrees, preferably with theta=1, so that the contours are rotationally invariant. Here, the extrema can be identified as the peak (or valley) region datapoint with the highest (or lowest) magnitude value in the smoothed RLP data and/or in a subsequent iteration (cf. steps 1204 and 1206 as discussed above in connection with FIG. 12). This preliminarily aligns the smoothed laser data in the scan so that an identifiable feature is set to a common alignment angle, e.g., the maximum magnitude of the lobe peak farthest from the axis in the scan is set to theta=1 and 90 degrees.

Next, a check for the true centrality of the maximum (or minimum) magnitude may be made in step 1614. Because of the difficulty in selecting the correct true extrema identified by magnitude in step 1612, the centrality can be checked, for example, by taking a bidirectional moving average of the datapoints on either side of the extrema datapoint identified in step 1612 and identifying the extrema as the intersection. If the extrema datapoint identified from the bidirectional moving averages is not the same as or sufficiently close to the extrema datapoint identified in step 1612, then the bidirectional moving averages extrema can be indexed to the common alignment angle, and steps 1608 to 1612 repeated. When the same extrema datapoint is identified by magnitude in step 1612 and by bidirectional moving averages in step 1614, the preprocessing is concluded in step 1616. If desired, datapoints not assigned to a theta integer can preferably be removed from the dataset after steps 1608, 1610, 1612, and/or 1614, so that the preprocessed data from step 1616 consists only of datapoints assigned to a theta integer.

This procedure beginning with step 1602 can be repeated for each of the RLP scans from the different axial locations in the set for each stator, and then for each stator in the database. Preprocessing the scans in this manner thus aligns the RLP data in all the scans and for all stators scanned so that an identifiable feature is set to a common alignment angle and can be used as a common reference point, e.g., the minimum magnitudes of the lobe valleys closest to the axis in each scan is always set to N=1 and 90 degrees.

Figure 17:
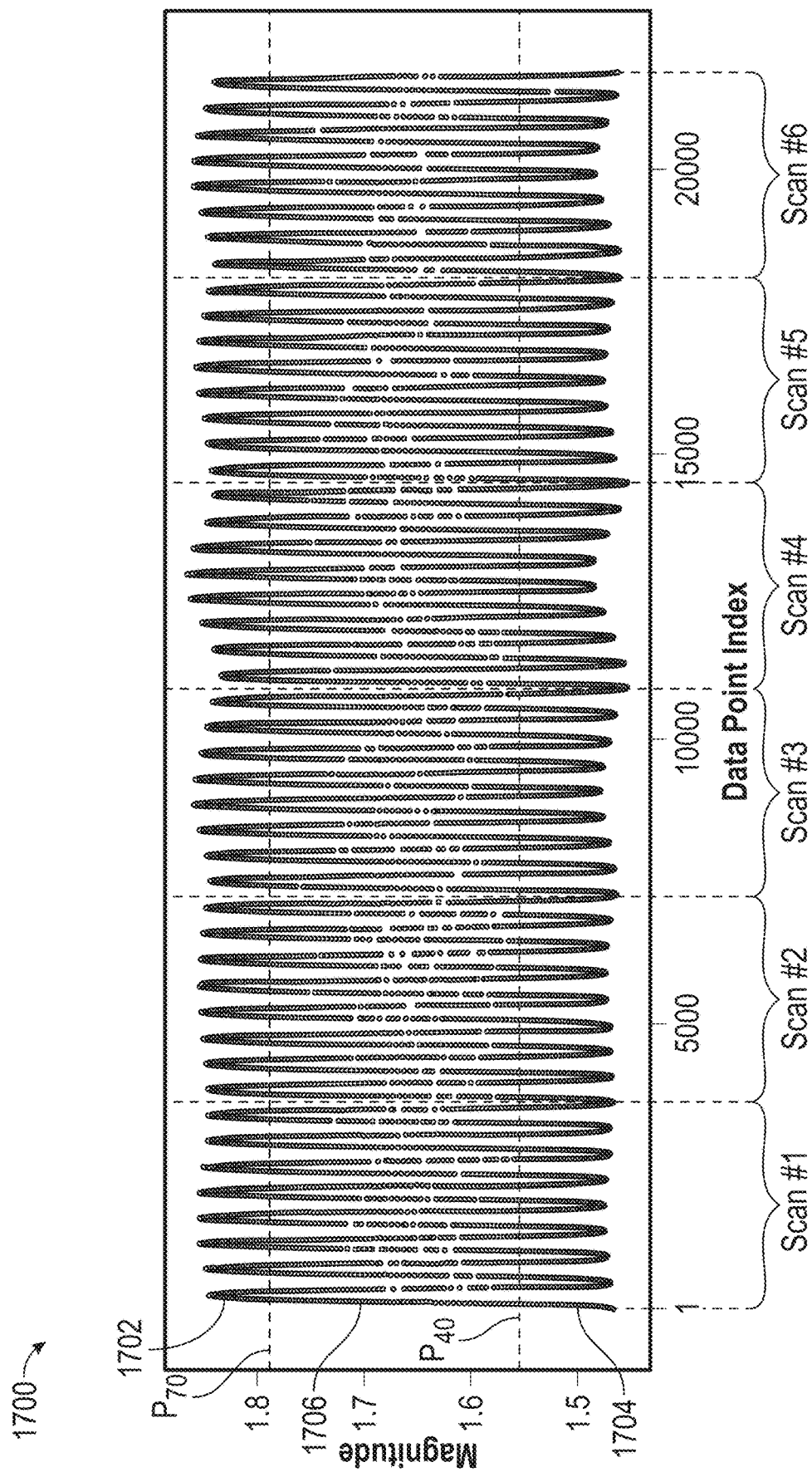
FIG. 17 is a graph of preprocessed RLP data showing the representative data contours of an 8-lobe stator for six scans according to an embodiment of this disclosure.
Figure 18:
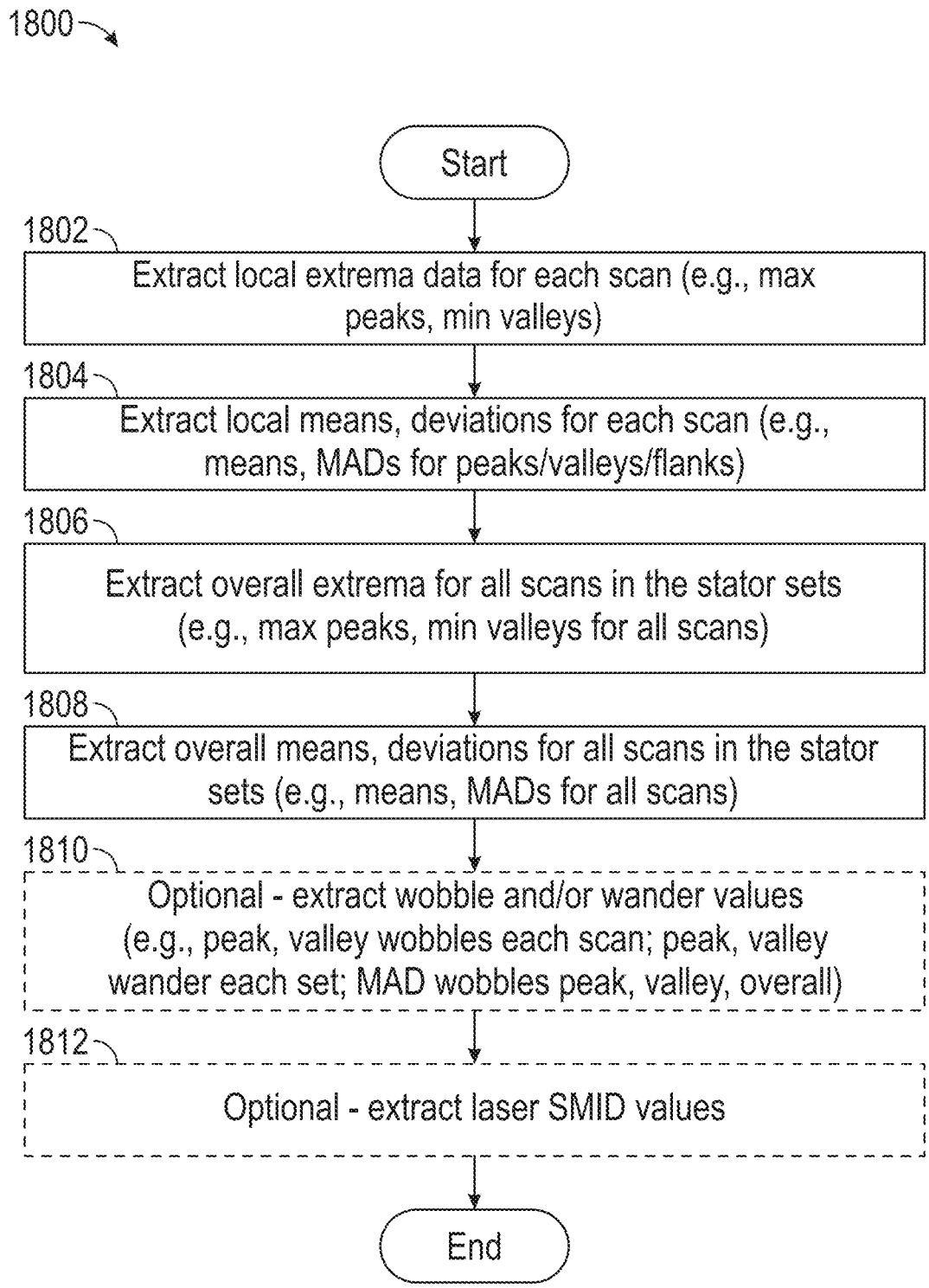
FIG. 18 is a simplified flow chart for extracting statistical profilometric data from preprocessed laser profilometer scans according to an embodiment of this disclosure.

An example of the stator RLP data processed for feature alignment in the manner described above, where N=3600 theta datapoints/scan, n=6 scans per stator, and s=8 lobes, is presented graphically in a serial sequence of each scan in FIG. 17.

Radial Laser Profilometric (RLP) Scan Processing—Statistical Data Extraction

Referring back to FIG. 11, the processing method 1100 preferably includes a processing step 1106 to extract radial laser profilometric (RLP) statistical data which are then populated in step 1108 in the database 904 (FIG. 9) as stator dimension data 912 for the stator training dataset 910. In step 1106, the statistical data are preferably extracted from the RLP scan data after processing for feature alignment in step 1104 and as exemplified in the discussion above of FIGS. 12-17. The RLP statistical data from step 1106 can include, for example, for each set of RLP scans from the respective stator, one or more of local maximum, minimum, mean and/or deviation magnitude values extracted separately from each of the scans in the set, and one or more of overall maximum, minimum, mean and/or deviation magnitude values extracted from the scans in the respective stator set collectively.

Preferably, the RLP statistical data can also include values related to wobble, the "off-centering" of one or more or all geometric regions at a distance from the axis of origin, and/or wander, a cumulative or sum of the wobbles for successive scans. The wobble- and wander-related values, if present, can account for the possibility that the clearance or fit between the lobes of the stator and the lobes of the rotor may change as the rotor rotates, e.g., a loose fit with less compression, less friction, and/or more clearance and fluid slip against the rotor at a stator lobe and/or region of the stator lobe on one side of the stator in the direction of the wobble, and a tight fit with more compression, more friction, and/or less clearance and fluid slip on the other side opposite the direction of the wobble. Power calculations premised on a constant Fit* parameter as in the prior art fail to account for any variation or dimensionality reflected in wobble and/or wander as implemented herein. Preferably, the extracted RLP statistical data from step 1106 comprise one or more wobble values from the respective RLP scans, one or more wander values from the respective set of the RLP scans, one or more mean absolute deviation wobble values from the respective set of the RLP scans collectively, and so on, or a combination thereof.

Optionally, the extracted RLP statistical data can also include laser SMID data (L-SMID) such as the average laser SMID for each scan (L-SMID_n), the mean laser SMID for all scans of the stator (L-SMID_mean), and/or the mean absolute SMID deviation for all scans (L-mad_SMID).

In an embodiment of a statistical data extraction method 1800 shown in FIG. 18, in step 1802 local extrema data in each scan individually are extracted, e.g., maximum peak and minimum valley magnitudes from each respective peak and valley region in the scan.

Then in step 1804, local means and/or deviation values can be extracted from each scan. Local means and mean absolute deviation values here can include, e.g., average maximum peak magnitude in all peak regions in the scan, average absolute difference of the maximum peak magnitude in each peak region with respect to a reference magnitude such as the average maximum peak magnitude or the overall maximum peak magnitude of the scan, average minimum valley magnitude in all valley regions in the scan, average absolute difference of the minimum valley magnitude in each valley region with respect to a reference magnitude such as the average minimum valley magnitude or the overall minimum valley magnitude of the scan, an average absolute difference of a dimension(s) of the flank region with respect to a reference magnitude; and so on.

There will be a set or vector of these local values from steps 1802, 1804, i.e., local values for each of the n=6 scans for each stator in this example.

Then in step 1806, overall extrema data for all scans in each stator set collectively are extracted, e.g., maximum peak and minimum valley magnitudes of all respective peak and valley regions in all of the scans in the respective stator set.

Next in step 1808, overall means and/or deviation values, e.g., mean absolute difference values, can be extracted for all scans in each stator set collectively. Collective means and mean absolute deviation values here can include, e.g., average maximum peak magnitude of all scans in the stator set, average absolute difference of the maximum peak magnitudes in each scan with respect to a reference magnitude such as the average maximum peak magnitude or the overall maximum peak magnitude of all scans in the stator set, average minimum valley magnitude of all scans in the stator set, average absolute difference of the minimum valley magnitudes in each scan with respect to a reference magnitude such as the average minimum valley magnitude or the overall minimum valley magnitude of all scans in the stator set, an average absolute difference of a dimension(s) of the flank region with respect to a reference magnitude; and so on.

There are generally single values of each quantity extracted from steps 1806, 1808, i.e., collective values for each stator set of scans in this example.

In an embodiment, the extracted RPL statistical data values may further comprise wobble and/or wander values extracted in optional step 1810, e.g., peak and valley wobbles for each scan; peak and valley wander for each set of stator scans; one or more overall deviation values; and so on. The wobble deviation values can include mean absolute deviation values, for example, mean absolute deviations for the peak and valley regions and overall (central or collective peak, valley, and flank regions), and the like.

Finally, in step 1812, if desired, laser SMID data (L-SMID) can be calculated from the RLP scans, e.g., an average of the minimum magnitude valley in each valley region in a scan (e.g., a vector of L-SMID values for n scans, L-SMID_n), an overall average of the minimum magnitude valley (e.g., a single mean L-SMID value, L-SMID_mean), a mean absolute difference value (e.g., a single mean of the differences between the average SMID for the set (L-SMID_mean) and the SMID at each measuring location (L-SMID_n)), etc.

A more detailed example of an embodiment of the RLP statistical data extraction step 1106 (FIG. 11) for a set of RLP scans taken at n axial measurement locations from a stator is seen in FIG. 19. RLP statistical data extraction method 1900 receives the preprocessed RLP scan data for the respective stator in step 1902, e.g., from step 1616 in FIG. 16. In this example, the prepared RLP scan datapoints are generally provided in a table reflecting the datapoint angle, datapoint magnitude, theta value, and so on, e.g., $X_{i,j}$, $Y_{i,j}$; $x_{i,j}$, $y_{i,j}$; $N_{i,j}$, where i=1 to N (theta values in each scan) and j=1 to n (number of scans).

Next, the datapoints are classified by region in step 1904, e.g., into peaks, valleys, flanks, or whatever geometric features are selected for contouring. For example, the datapoint distribution 1700 (FIG. 17) shows the $\text{peak}_n$ datapoints 1702 with magnitudes greater than the $70^{th}$ percentile $P_{70}$, the magnitudes of the $\text{flank}_n$ datapoints 1704 equal to or less than the $70^{th}$ percentile $P_{70}$ and greater than the $40^{th}$ percentile $P_{40}$, and the magnitudes of the $\text{valley}_n$ datapoints 1706 equal to or less than the $40^{th}$ percentile $P_{40}$.

The prepared RLP data may thus be classified in step 1904 in an example as follows:

$$\text{valley}_n = \begin{cases} 1, & \text{if magnitude}_i \leq P_{vf}(\text{magnitude}) \\ 0, & \text{otherwise} \end{cases} \quad \text{(Equation 4)}$$

$$\text{flank}_n = \begin{cases} 1, & \text{if } P_{vf} < \text{magnitude}_i \leq P_{fp}(\text{magnitude}) \\ 0, & \text{otherwise} \end{cases} \quad \text{(Equation 5)}$$

$$\text{peak}_n = \begin{cases} 1, & \text{if magnitude}_i > P_{fp}(\text{magnitude}) \\ 0, & \text{otherwise} \end{cases} \quad \text{(Equation 6)}$$

where $P_{vf}$(magnitude) is the percentile demarcation between the valley and flank regions and $P_{fp}$ (magnitude) is the percentile demarcation between the flank and peak regions.

In step 1906, the local extrema and deviation values for each of n scans (e.g., 6) are extracted into a vector of n scans, by the following calculations:

(a) for the peak region datapoints 1702 in each scan individually, extracting:

(1) n maximum magnitude values, max_peak_n (preferably a vector of n values, one for each scan) as follows:

$$\text{max\_peak}_n = \max\{\text{magnitude}_i | \text{peak}_{i,n} = 1\} \quad \text{(Equation 7)}$$

where $\text{magnitude}_i$ is the magnitude of the i-th point of N in the n-th scan and $\text{peak}_{i,n}$ indicates whether the i-th datapoint in the n-th scan is in one of the peak regions. This will usually be the maxima as determined by the intersection of the bidirectional moving averages;

(2) n mean absolute peak deviation values, mad_peak_n (preferably a vector of n values, one for each scan) as follows:

$$\text{mad\_peak}_n = \frac{1}{N} \sum_{i=1}^{N} \left| \text{magnitude}_i - \mu_{peak_n} \right| \quad \text{(Equation 8)}$$

where N is the number of peak region datapoints in the n-th scan, $\text{magnitude}_i$ is the magnitude of the i-th peak region datapoint in the n-th scan, and $\mu_{peak_n}$ is a mean magnitude of the peak region datapoints in the n-th scan;

(b) for the valley region datapoints 1704 in each scan individually, extracting:
  (1) n minimum magnitude values min_valley_n (preferably a vector of n values, one for each scan) as follows:

$$\text{min\_valley\_}n = \min\{\text{magnitude}_i | \text{valley}_{in} = 1\} \quad \text{(Equation 9)}$$

where $\text{magnitude}_i$ is the magnitude of the i-th datapoint in the n-th scan and $\text{valley}_{in}$ indicates whether the i-th datapoint in the n-th scan is in one of the valley regions. This will usually be the minima as determined by the intersection of the bidirectional moving averages;

(2) n mean absolute valley deviation values, mad_valley_n (a vector of n values, one for each scan) as follows:

$$\text{mad\_valley\_}n = \frac{1}{N}\sum_{i=1}^{N}\left|\text{magnitude}_i - \mu_{\text{valley}_n}\right| \quad \text{(Equation 10)}$$

where N is the number of valley datapoints in the n-th scan, $\text{magnitude}_i$ is the magnitude of the i-th valley datapoint in the n-th scan, and $\mu_{\text{valley}_n}$ is a mean magnitude of the valley datapoints in the n-th scan; and (c) for the flank region datapoints 1706 in each scan individually, extracting n mean absolute flank deviation values, mad_flank_n (preferably a vector of n values, one for each scan) as follows:

$$\text{mad\_flank\_}n = \frac{1}{N}\sum_{i=1}^{N}\left|\text{magnitude}_i - \mu_{\text{flank}_n}\right| \quad \text{(Equation 11)}$$

where N is the number of flank region datapoints in the n-th scan, $\text{magnitude}_i$ is the magnitude of the i-th flank region datapoint in the n-th scan, and $\mu_{\text{flank}_n}$ is a mean magnitude of the flank region datapoints in the n-th scan.

Next, in step 1908, the overall or collective values for all of the n scans for the stator set collectively, are extracted, by the following calculations:

(a) for the peak region datapoints 1702 in the scans collectively, extracting:
  (1) a collective maximum magnitude peak value, max_peak (preferably a single value) as follows:

$$\text{max\_peak} = \max(\text{magnitude}_{peak}) \quad \text{(Equation 12)}$$

where $\text{magnitude}_{peak}$ is the magnitude of the collective peak region datapoints;

(2) a collective mean peak magnitude value, mean_peak (or $\mu_{peak}$) (preferably a single value) as follows:

$$\text{mean\_peak} = \mu_{peak} = \frac{1}{N}\sum_{i=1}^{N}\text{magnitude}_{peak_i} \quad \text{(Equation 13)}$$

where N is the number of collective peak region datapoints, $\text{magnitude}_{peak_i}$ is the magnitude of the i-th collective peak region datapoint, and $\mu_{peak}$ is the mean magnitude of the collective peak region datapoints; and (3) a collective mean absolute peak deviation value, mad_peak (preferably a single value) as follows:

$$\text{mad\_peak} = \frac{1}{N}\sum_{i=1}^{N}\left|\text{magnitude}_{peak_i} - \mu_{peak}\right| \quad \text{(Equation 14)}$$

where N is the number of collective peak region datapoints, $\text{magnitude}_{peak_i}$ is the magnitude of the i-th collective peak region datapoint, and $\mu_{peak}$ is the collective mean peak magnitude value;

(b) for the valley region datapoints 1704 in the scans collectively, extracting:
  (1) a collective minimum magnitude valley value, min_valley (preferably a single value) as follows:

$$\text{min\_valley} = \min(\text{magnitude}_{valley}) \quad \text{(Equation 15)}$$

where $\text{magnitude}_{valley}$ is the magnitude of the collective valley region datapoints;

(2) a collective mean valley magnitude value, mean_valley (or $\mu_{valley}$) (preferably a single value) as follows:

$$\text{mean\_valley} = \mu_{valley} = \frac{1}{N}\sum_{i=1}^{N}\text{magnitude}_{valley_i} \quad \text{(Equation 16)}$$

where N is the number of collective valley region datapoints ($N_v \times n$), $\text{magnitude}_{valley_i}$ is the magnitude of the i-th collective valley region datapoint, and $\mu_{valley}$ is the collective mean valley magnitude value; and (3) a mean absolute valley deviation value, mad_valley (preferably a single value) as follows:

$$\text{mad\_valley} = \frac{1}{N}\sum_{i=1}^{N}\left|\text{magnitude}_{valley_i} - \mu_{valley}\right| \quad \text{(Equation 17)}$$

where N is the number of collective valley region datapoints, $\text{magnitude}_{valley_i}$ is the magnitude of the i-th collective valley region datapoint, and $\mu_{valley}$ is the collective mean valley magnitude value; and (c) for the flank region datapoints 1706 in the scans collectively, extracting:
  (1) a collective mean flank magnitude value, mean_flank (or $\mu_{valley}$) (preferably a single value) as follows:

$$\text{mean\_flank} = \mu_{flank} = \frac{1}{N}\sum_{i=1}^{N}\text{magnitude}_{flank_i} \quad \text{(Equation 18)}$$

where N is the number of collective flank region datapoints, $\text{magnitude flank}_i$ is the magnitude of the i-th collective flank region datapoint, and $\mu_{flank}$ is the collective mean flank magnitude value; and (2) a collective mean absolute flank deviation value, mad_flank (preferably a single value) as follows:

$$\text{mad\_flank} = \frac{1}{N}\sum_{i=1}^{N}\left|\text{magnitude}_{flank_i} - \mu_{flank}\right| \quad \text{(Equation 19)}$$

where N is the number of collective flank region datapoints, $\text{magnitude}_{flank_i}$ is the magnitude of the i-th collective flank region datapoint, and $\mu_{flank}$ is the collective mean flank magnitude value.

Next, if they are to be included in the RLP statistical data, the wobble and/or preferably wander data can be extracted in step 1910 according to the following examples. For example, for the segmented r-th region (center/collective, peak, valley, or flank) for the n-th scan, wobble_r_n (preferably a set or vector of 24 values, i.e., 4 regions×6 scans where n=6) can be calculated as follows:

$$\text{wobble}_{r,n} = \sqrt{\left(\frac{1}{N_r}\sum_{i=1}^{N_r} X_{r,i}\right)^2 + \left(\frac{1}{N_r}\sum_{i=1}^{N_r} Y_{r,i}\right)^2} \quad \text{(Equation 20)}$$

where wobble$_{r,n}$ is the wobble of the r-th region of the n-th scan, N$_r$ is the number of datapoints in the scan region, and X$_{r,i}$ and Y$_{r,i}$ are the x and y coordinates of the magnitudes of each datapoint. In this example, the center is considered to be the mean of all datapoints for the scan, including the peak, flank, and valley regions. For example, the wobbles of the centers, peaks, flanks, and valleys of a given scan n (wobble_center_n, wobble_peak_n, wobble_flank_n, wobble_valley_n), can be calculated as follows:

$$\text{wobble\_center\_}n = \sqrt{(X_{\text{center\_}n})^2 + (Y_{\text{center\_}n})^2} \quad \text{(Equation 21)}$$

$$\text{wobble\_peak\_}n = \sqrt{(X_{\text{peak\_}n})^2 + (Y_{\text{peak\_}n})^2} \quad \text{(Equation 22)}$$

$$\text{wobble\_flank\_}n = \sqrt{(X_{\text{flank\_}n})^2 + (Y_{\text{flank\_}n})^2} \quad \text{(Equation 23)}$$

$$\text{wobble\_valley\_}n = \sqrt{(X_{\text{valley\_}n})^2 + (Y_{\text{valley\_}n})^2} \quad \text{(Equation 24)}$$

where $X_{\text{center\_}n}$, $Y_{\text{center\_}n}$, $X_{\text{peak\_}n}$, $Y_{\text{peak\_}n}$, $X_{\text{flank\_}n}$, $Y_{\text{peak\_}n}$, $X_{\text{valley\_}n}$, $Y_{\text{valley\_}n}$, are the average X and Y magnitudes for the datapoints in the respective regions in the n-th scan, which can be calculated as follows:

$$X_{\text{region}_n} = \frac{1}{N_r}\sum_{i=1}^{N_r} X_{r,i}, \quad Y_{\text{region}_n} = \frac{1}{N_r}\sum_{i=1}^{N_r} Y_{r,i}. \quad \text{(Equation 25)}$$

Wander is the cumulative of all wobble values for a particular region or regions over all scans:

$$\text{wander}_r = \sum_{j=1}^{n} \text{wobble}_{r,j} = \sum_{j=1}^{n}\sqrt{\left(\frac{1}{N_r}\sum_{i=1}^{N_r} X_{r,i}\right)^2 + \left(\frac{1}{N_r}\sum_{i=1}^{N_r} Y_{r,i}\right)^2} \quad \text{(Equation 26)}$$

where wander$_r$ is the wander of the r-th region(s) (center/collective, peak, valley, flank) in all scans, n is the number of scans, N$_r$ is the number of datapoints in the respective r-th region(s) in the j-th scan, and X$_{r,i}$ and Y$_{r,i}$ are the X and Y coordinates of the magnitudes of each datapoint.

For example, wander_peak and wander_valley (preferably single values), are preferred wander data in the laser statistical data, and can be calculated as follows:

$$\text{wander\_peak} = \sum_{j=1}^{n}\text{wobble}_{\text{peak},j} = \quad \text{(Equation 27)}$$

$$\sum_{j=1}^{n}\sqrt{\left(\frac{1}{N_{\text{peak}}}\sum_{i=1}^{N_{\text{peak}}} X_{\text{peak},i}\right)^2 + \left(\frac{1}{N_{\text{peak}}}\sum_{i=1}^{N_{\text{peak}}} Y_{\text{peak},i}\right)^2}$$

$$\text{wander\_valley} = \quad \text{(Equation 28)}$$
$$\sum_{j=1}^{n}\text{wobble}_{\text{valley},j} = \sum_{j=1}^{n}\sqrt{\left(\frac{1}{N_{\text{val}}}\sum_{i=1}^{N_{\text{val}}} X_{\text{val},i}\right)^2 + \left(\frac{1}{N_{\text{val}}}\sum_{i=1}^{N_{\text{val}}} Y_{\text{val},i}\right)^2}$$

where wander_peak and wander_valley are the wander of the peak and valley regions in all scans, n is the number of scans, N$_r$ is the number of datapoints in the respective r-th regions in the n-th scan, and X$_{r,i}$ and Y$_{r,i}$ are the X and Y coordinates of the magnitudes of each datapoint.

Similarly, mean absolute deviation of all-region or the center wobble, mad_wobble, another preferred wobble value included in the laser statistical data, is the average of the absolute difference between the average wobble for all regions in all scans less the wobble for all regions in each scan, which can be calculated as follows:

$$\text{mad\_wobble} = \frac{1}{n}\sum_{i=1}^{n}\left|\text{wobble}_{\text{center},i} - \mu_{\text{wobble}_{\text{center}}}\right| \quad \text{(Equation 29)}$$

where wobble$_{\text{center}_i}$ or wobble_center_n is the wobble for all regions in the n-th scan, n is the number of scans, and $\mu_{\text{wobble}_{\text{center}}}$ is the average wobble of all scans collectively, i.e., wander_center/n).

Additionally, mean absolute deviations of the peak wobble, mad_wobble_peak, and the valley wobble, mad_wobble_valley, additional preferred wobble values included in the laser statistical data, are the average of the absolute difference between the average wobble for the peak and valley regions in all scans less the wobble for the peak and valley regions in each scan, which can be calculated as follows:

$$\text{mad\_wobble\_peak} = \frac{1}{n}\sum_{i=1}^{n}\left|\text{wobble}_{\text{peak}_i} - \mu_{\text{wobble}_{\text{peak}}}\right| \quad \text{(Equation 30)}$$

$$\text{mad\_wobble\_valley} = \frac{1}{n}\sum_{i=1}^{n}\left|\text{wobble}_{\text{valley}_i} - \mu_{\text{wobble}_{\text{valley}}}\right| \quad \text{(Equation 31)}$$

where wobble$_{\text{peak}_i}$ or wobble_peak_n is the wobble for the peak regions in the n-th scan, n is the number of scans, and $\mu_{\text{wobble}_{\text{peak}}}$ is the average peak wobble of all scans collectively (or wander_peak/n); and wobble_valley_n is the wobble for the valley regions in the n-th scan, and $\mu_{\text{wobble}_{\text{valley}}}$ is the average wobble of all scans collectively (or wander_valley/n).

Finally, in step 1912, the RLP SMID data are optionally extracted, e.g., for use in a simplified ML framework or comparison to mechanical or synthetic SMID values. These extracted laser SMID data can include any or all of the mean SMID of all scans (L-SMID_mean), or preferably the n mean SMIDs for each laser scan (L-SMID_n) and/or the mean absolute deviation of the SMIDs for all scans (L-mad_SMID), which are calculated as follows:

$$L\text{-SMID\_n} = \frac{2}{s}\sum_{i=1}^{s}\min\{\text{magnitude}_{is}\mid \text{valley}_{is} = 1\} \quad \text{(Equation 32)}$$

$$L\text{-SMID\_mean} = \frac{1}{n}\sum_{i=1}^{n} L\text{-SMID\_n} \quad \text{(Equation 33)}$$

-continued $$L\text{-mad\_SMID} = \frac{1}{n}\sum_{i=1}^{n}|L\text{-}SMID_n - L\text{-SMID\_mean}|$$ (Equation 34)

where L-SMID_n is the laser SMID of the n-th scan, s is the number of stator lobes, magnitude$_{is}$ is the magnitude of the i-th datapoint in the s-th valley of the n-th scan, valley$_{is}$ indicates whether the i-th datapoint in the s-th valley of the n-th scan is in one of the valleys; L-SMID_mean is the average laser SMID of all scans collectively; and L-mad_SMID is the mean absolute deviation of the laser SMIDs of all scans collectively.

Synthetic Laser Data from the Stator Profile ML (SPML) Model

In the embodiment of FIGS. 8 and 9, in step 804 the stator profile ML (SPML) model 926 is trained in step 804 with the dataset 910 which includes stator metadata 914 and stator dimension data 912 including both data that are based on the mechanical SMID measurements 916 and data that that are based on the stator RLP scans 918. The SPML model 926 learns to predict stator profiles from the mechanical SMID measurements 916 in step 804. The SPML model 926 can then be deployed to generate synthetic stator profile data 928 in step 808 based on input data 920 received by data receiver 906 in step 806.

Preferably, the data based on the mechanical SMID measurements 916 in the stator dimension data 912 include the vector gauge 20 measurements from the measurement locations L1 to L6 (M-SMID_n), and more preferably also include extracted values for the mean vector gauge SMID (M-SMID_mean) and the mean absolute deviation (M-mad_SMID). In one embodiment, the M-SMID_mean M-mad_SMID values are automatically calculated from the input M-SMID_n values, for example, in processor 908.

In any embodiment, the stator dimension data 912 based on the RLP scans 918 in the stator training dataset 910, used to train the SPML model 926 in step 804, can be or include:

(1) the laser SMID data from step 1812;
(2) any or all of the extracted statistical laser data from step 1814 discussed above in connection with FIG. 18, e.g.:
  (A) one or more of local maximum, minimum, mean and/or deviation magnitude values extracted from each of the scans separately from step 1806,
  (B) one or more of overall maximum, minimum, mean and/or deviation magnitude values extracted from the scans collectively from step 1808, and/or
  (C) any of the wander and/or wobble data from step 1810, and/or
(3) the preprocessed laser scan data from step 1618 (FIG. 16), e.g., where N=500 to 10,000 (preferably 3600) datapoints and n=4 to 8 (preferably 6) scans.

In any embodiment, the level of detail in the stator profiles learned in step 804, and the synthetic stator profile data 928 that is generated in step 808, can generally reflect the level of detail in the stator RPL scan data 918 used to train the SPML model 926. For example, where the SPML model 926 is trained with the laser SMID data from step 1812, e.g., L-SMID_n, L-SMID_mean, and/or L-mad-SMID, the synthetic stator profile data 928 can comprise the corresponding synthetic SMID data, i.e., the S-SMID_n, S-SMID_mean, and/or S-mad-SMID values. The synthetic stator profile data 928 in this embodiment can, for example, be an output feature vector of the synthetic stator SMID values.

Similarly, but with relatively more accurate and more detailed synthetic stator profile data 928, training the SPML model 926 with the laser statistical data extracted in steps 1806 (scan-level vectors such as L-max_peak_n, L-mad_peak_n, L-min_valley_n, L-mad_valley_n, and L-mad_flank_n) and 1808 (collective values such as L-max_peak, L-mean_peak, L-mad_peak, L-min_valley, L-mean_valley, L-mad_valley, and L-mean_flank), can obtain the equivalent values in the output vector of synthetic stator profile data 928, e.g., S-max_peak_n, S-mad_peak_n, S-min_valley_n, S-mad_valley_n, S-mad_flank_n, S-max_peak, S-mean_peak, S-mad_peak, S-min_valley, S-mean_valley, S-mad_valley, and S-mean_flank. The synthetic stator profile data 928 in this embodiment can, for example, also be an output feature vector of the synthetic stator scan-level and collective statistical data values.

Preferably, the RLP statistical data used to train the SPML model 926 further includes, in addition to the scan-level vectors from step 1806 and the collective values from step 1808, the wobble/wander values extracted in step 1810, such as L-wobble_peak_n, L-wobble_valley_n, L-wander_peak, L-wander_valley, L-mad_wander, L-mad_wobble_peak, and/or L-mad_wobble_valley, and/or the SMID data extracted from step 1812, such as L-SMID_n, L-SMID_mean, and/or L-mad-SMID. In this instance, the synthetic stator profile data 928 will comprise the corresponding synthetic wobble/wander values, i.e., S-wobble_peak_n, S-wobble_valley_n, S-wander_peak, S-wander_valley, S-mad_wander, S-mad_wobble_peak, and/or S-mad_wobble_valley, and/or the synthetic SMID data values, i.e., S-SMID_n, S-SMID_mean, and/or S-mad-SMID. Likewise, the synthetic stator profile data 928 in this embodiment can, for example, also be an output feature vector of the synthetic stator wobble/wander values and the synthetic SMID data values.

In a preferred embodiment, the SPML model 926 is trained with the preprocessed stator RLP scans 918, e.g., as preprocessed in FIG. 10 or especially in FIG. 12 for feature alignment. In this embodiment the RLP scans 918 comprise preprocessed laser scan data from step 1618 as sets of n×N datapoints for each stator scanned, where N is the number of datapoints in each scan and n is the number of scans from each stator, as defined above. The training dataset 910 in this embodiment can, if desired, also include the statistical profilometric data extracted in any or all of steps 1806, 1808, 1810, and/or 1812.

The synthetic stator profile data 928 in this embodiment can, if desired, also be a simple output feature vector of the synthetic laser scan-level datapoints, e.g., sets of n×N datapoints for the subject stator of the input data 920 of vector gauge SMIDs in step 806, and also including synthetic statistical imaging data equivalent to any statistical laser imaging data extracted in any or all of steps 1806, 1808, 1810, and/or 1812 that is present in the training dataset 910. Preferably, however, the synthetic stator profile data 928 comprises a compressed proposal data vector 2125 in latent space 2124 in which the synthetic laser scan-level datapoints and any synthetic statistical imaging data are embedded, as discussed in connection with FIGS. 20-21.

Training the Stator Profile Machine Learning (SPML) Model

Depending on the type of the stator RLP scan data 918 that is used, the machine learning (ML) framework used to train the first ML model 926 can be any one or combination of a tree model, a logistic regression model, a perceptron, neural network, a feed-forward neural network, an autoencoder, a probabilistic network, a convolutional neural network, a radial basis function network, a multilayer perceptron, a deep neural network, a recurrent neural network, and/or a suitable type of differentiable or non-differentiable model. Example neural networks can include: Boltzman machines, echo state networks, long short-term memory (LSTM), hierarchical neural networks, stochastic neural networks, and other suitable types of differentiable neural networks.

Where only the statistical laser imaging data extracted in any or all of steps 1806, 1808, 1810, and/or 1812 is used to train the SPML model 926 in step 804, the SPML learning framework can include, for example, any one or more of AI prediction algorithms such as linear regression learning algorithms (LR), nested tokenization algorithms (XT), random forest algorithms (RF), multilayer neural network building algorithms (e.g., NN Torch), deep learning libraries (e.g., FASTAI, CATBoost, LightGBM), and so on, or any suitable combination.

These algorithms are preferably used in an ensemble framework, which is more preferably stacked or blended and weighted, to learn the optimal combination and weighting of the prediction algorithms to minimize the loss function, such as, for example, mean square error, mean absolute error, Huber loss, log-cosh loss, quantile loss, contrastive loss, reconstruction loss, and so on, preferably a reconstruction loss function. Here the loss function is based on the error between predicted results, e.g., RLP data estimated for a stator based on M-SMID data inputs, and the target vector, i.e., the actual extracted laser statistical data from any of steps 1806, 1808, 1810, and/or 1812.

Figure 20:
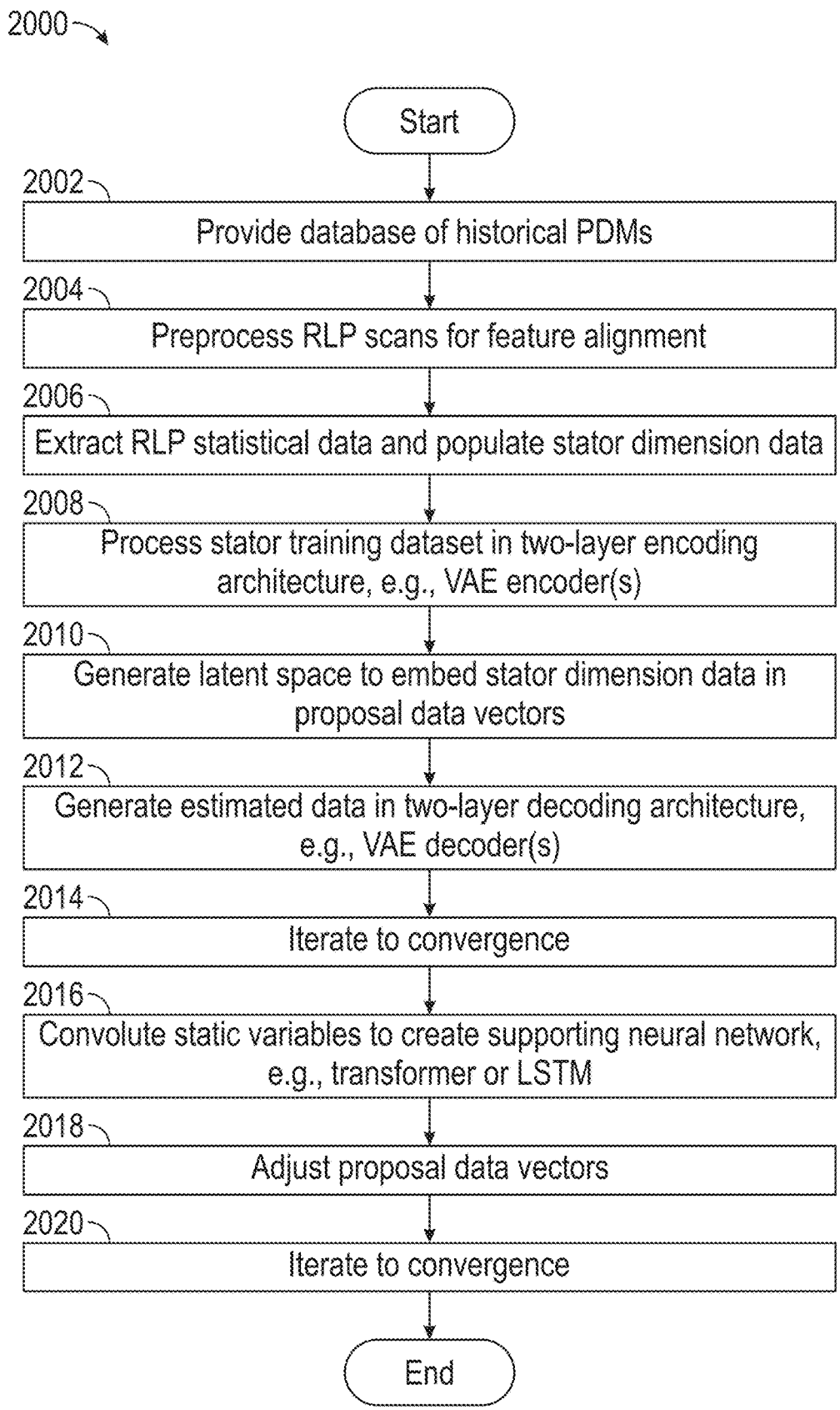
FIG. 20 is a simplified flow chart for training a stator profile machine learning (SPML) model according to an embodiment of this disclosure.

With reference to FIG. 20, the SPML model 926.

With reference to FIG. 20, the SPML model training 804 is preferably according to the training method 2000. In step 2002, the database of historical PDMs 2102 (FIG. 21) is preferably provided substantially as described above in step 802 (FIG. 8) or method 1000 (FIG. 10).

Next, in step 2004 the RLP scans from the database 2102 are preprocessed for feature alignment, e.g., as in step 1104 or methods 1200, 1600 as discussed above in connection with FIGS. 11-17.

Preferably, the RLP statistical data are extracted from the preprocessed laser data in step 2006 and populated in the stator dimension data in the SPML training dataset, as discussed above in connection with FIGS. 18 and/or 19.

Figure 21:
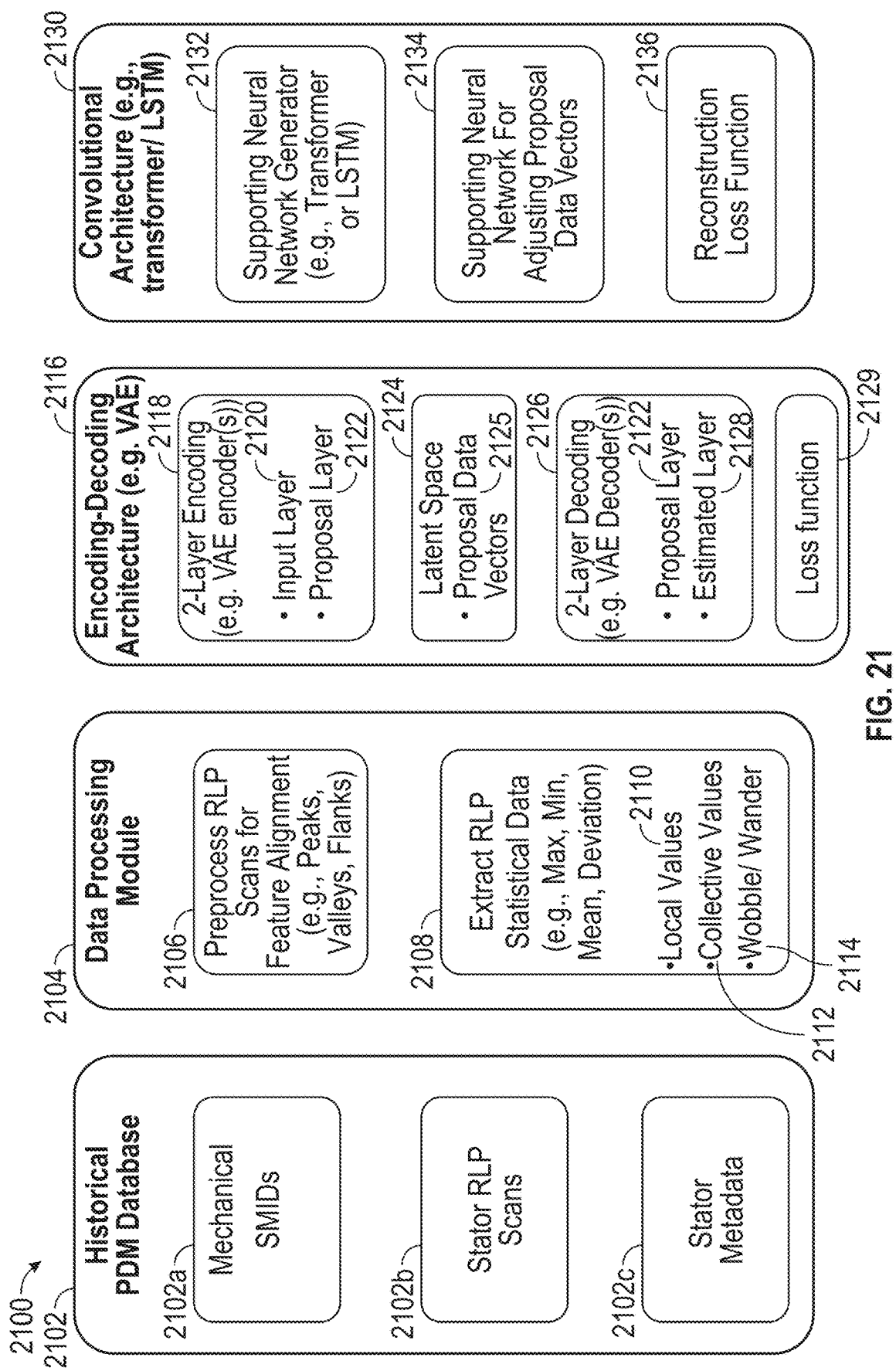
FIG. 21 is a simplified diagram of a machine learning framework for training the SPML model using the method of FIG. 20 according to embodiments of the disclosure herein.

With the stator dimension data populated as desired, in step 2008, the dataset is processed in an ML framework, preferably comprising a two-layer encoding architecture 2118 comprising an input layer 2120 receiving the stator training dataset, and a proposal neural network layer 2122 (FIG. 21). In step 2010 a latent space 2124 of proposal data vectors 2125 are generated in the proposal neural network layer 2122 embedding the stator dimension data.

In step 2012, estimated data are generated from the proposal data vectors in a two-layer decoding architecture 2126 of the ML framework comprising the proposal neural network layer 2122 and an estimated neural network layer 2128. Then, in step 2014 the encoding-decoding steps 2008-2012 are iterated to convergence, for example, by minimizing an appropriate loss function 2129 such as mean square error, mean absolute error, Huber loss, log-cosh loss, quantile loss, contrastive loss, reconstruction loss, and so on. Preferably the loss function 2129 comprises a reconstruction loss function.

Preferably, the ML framework for steps 2008, 2010, 2012 comprises a conditional variational autoencoder (VAE) learning framework comprising one or more VAE encoders in the two-layer encoding architecture in steps 2008, 2010, and one or more VAE decoders in the two-layer decoding architecture in step 2012. The ML framework may comprise, for example, a conditional variational autoencoder (VAE) learning framework comprising one or more VAE encoders in the two-layer encoding architecture 2118 and one or more VAE decoders in the two-layer decoding architecture 2126. The encoding-decoding architecture 2116 can be tailored for capturing the intricate details of contour features within a highly compressed latent space.

Preferably, the method 2000 also comprises: step 2016 for convoluting static variables from the stator metadata to create a supporting neural network, preferably comprising one or more VAE support layers; step 2018 for adjusting the proposal data vectors with the supporting neural network; and step 2020 for iterating steps 2016, 2018 to minimize a loss function such as a reconstruction loss function 2136 and obtain an output model for the deployment as the SPML model in step 808 (FIG. 8). The static variables are preferably convoluted in step 2016 using convolutional architecture 2130, which may comprise an LSTM learning framework, or more preferably a two-layer transformer learning framework, or the like, including combinations thereof.

The training method 2000 can be implemented, for example, using the machine learning framework 2100 shown in FIG. 21 implemented in the processor 908 (FIG. 9) for training the SPML model 926. The framework 2100 can include a database 2102 of historical PDMs with stator data substantially as described above for database 904 (FIG. 9), e.g., mechanical SMID measurement data 2102a, stator RLP scans 2102b, stator metadata 2102c, and so on.

The framework 2100 can include a database 2102 of historical PDMs with stator data substantially as described above for database 904 (FIG. 9), e.g., mechanical SMID measurement data 2102a, stator RLP scans 2102b, stator metadata 2102c, and so on.

The framework 2100 can also include a processing module 2104 with a preprocessing submodule 2106 for preprocessing the RLP scans 2102b from the database 2102 for feature alignment in each set to obtain preprocessed sets of the RLP scans for the respective stators, e.g., comprising commonly aligned peaks, valleys, and flanks; and a statistical data extraction submodule 2108 for extracting profilometric statistical data from the preprocessed sets of the RLP scans from submodule 2106. The profilometric statistical data extracted in submodule 2108 may comprise local values 2110 such as one or more of local maximum, minimum, mean and/or deviation magnitude values from each of the respective RLP scans separately, and collective values 2112 such as one or more of overall maximum, minimum, mean and/or deviation magnitude values from the respective set of the RLP scans collectively. If desired, the extraction module 2108 may also extract wobble and/or wander values 2114, e.g., one or more wobble values from the respective RLP scans, one or more wander values from the respective sets of the RLP scans, one or more mean absolute deviation wobble values from the respective sets of the RLP scans collectively, and so on, or a combination thereof.

The framework 2100 can also include an encoding-decoding architecture 2116, e.g., a conditional variational autoencoder (VAE) learning framework. The encoding-decoding architecture 2116 comprises: (1) a two-layer encoding architecture 2118, comprising an input layer 2120 receiving the stator training dataset, and a proposal neural network layer 2122, e.g., one or more VAE encoders; (2) a latent space 2124 of proposal data vectors 2125 in the proposal neural network layer 2122 embedding the stator dimension data; and (3) a two-layer decoding architecture 2126 for generating estimated data from the proposal data vectors 2125, the decoding architecture 2126 comprising the proposal neural network layer 2122 and an estimated neural network layer 2128, e.g., one or more VAE decoders. The encoding-decoding architecture 2116 can also comprise a loss function 2129 such as mean square error, mean absolute error, Huber loss, log-cosh loss, quantile loss, contrastive loss, reconstruction loss, and so on, which can be iteratively minimized for convergence as in step 2014 (FIG. 20). Preferably the loss function 2129 is a reconstruction loss function.

The framework 2100 can also include a convolutional architecture 2130 comprising a supporting neural network generator 2132 such as, for example, a two-layer transformer learning framework, an LSTM learning framework, or the like, for creating a supporting neural network 2134, e.g., one or more VAE support layers. The supporting neural network 2134 can be used to adjust the proposal data vectors 2125 in step 2108. The convolutional architecture 2130 thus gives feedback 1270 to encoding-decoding architecture 2116.

The convolutional architecture 2130 iteratively creates the trained SPML model 926 that can generate the synthetic stator profile data 928 with sufficient granularity and detail that the extracted statistical values and/or the N datapoints in a preprocessed profilometric scan can also be predicted, e.g., the synthetic geometry in one embodiment comprises the equivalent datapoints and scan data obtained by measuring the stator with the laser gauge 25.

Preferably, the stator dimension data supplied to the input layer 2120 is conditioned by adding Gaussian noise to mimic imperfections that might naturally be found in laser measurements. If desired, the Gaussian noise can be added to the stator dimension data, grouped by classes of motor size range and lobe configuration. Additionally, several copies of the same stator dimension data with different levels, e.g., increasing levels, of gaussian noise can be prepared. The conditioned data dataset can then be strategically down-sampled, preserving essential alignment points of X, Y for effective model training, e.g., local peak maximums and valley minimums. A normalization step can also be applied to facilitate equal contribution of all features to the learning process and optimization of the model.

The preferred VAE encoders can take the preferably noised, down-sampled data as input and transform it into a compact representation in the latent space 2124. This process involves two main steps, feature extraction and latent space representation. In the feature extraction step, the VAE encoder analyzes the input layer data to identify and encode the most salient features into a lower-dimensional space. This is achieved through a series of linear transformations and non-linear activations, allowing the model to distill essential information from the input data layer 2120. In the latent space representation step the VAE encoder outputs vectors such as, for example, means (u) and variances (62), which define a distribution over the latent space 2124. This probabilistic approach allows the model to capture the inherent uncertainty and variability in the input data, and facilitates the generation of diverse outputs.

The VAE decoder 2126 samples latent vectors from the latent space 2124 and uses reparameterization for backpropagation in its attempts to reconstruct the input data. This process tests the effectiveness of the encoder 2118 in capturing the essential information in a compact form and the ability of the decoder 2126 to expand this information back into the original data space.

As the lobe configuration classes are encoded and decoded by the VAE in steps 2008, 2012, the latent space 2124 has robust representations that facilitate encoding the increasingly noised data. The representation in latent space 2124 may capture some of this noise. To counter this, the VAE decoder 2126 is directed to attain the center point of the averaged, noised data in latent representation 2124, since by definition the average of a normal gaussian distribution is zero, which would be the location of perfect accuracy.

The VAE 2116 is preferably a conditional variational autoencoder that encapsulates and compacts the contour features of the stator, e.g., the peaks, valleys, flanks, and so on, within latent space 2124. The static features such as the stator metadata 2102c are also encoded in the latent space 2124 data and passed through to the decoder estimated layer 2128. The decoder 2126 seeks to use this latent representation 2124 to regenerate the gaussian-noised contours, aided by the static features. This involves encoding the down sampled data to extract pertinent latent features.

Figure 23:
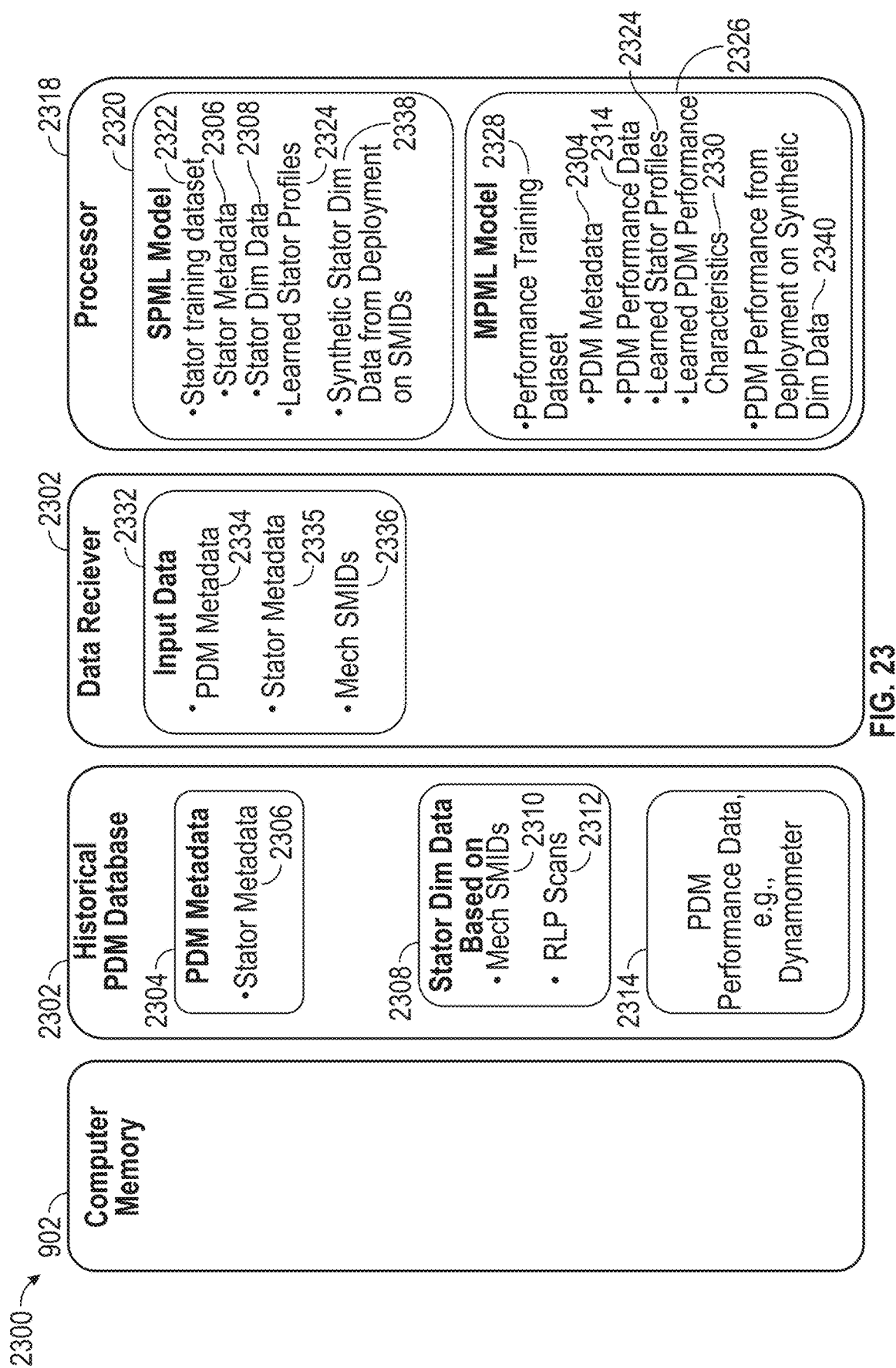
FIG. 23 is a simplified diagram of a computer-implemented system for predicting PDM performance using the method of FIG. 22 according to embodiments of the disclosure herein.
Figure 25:
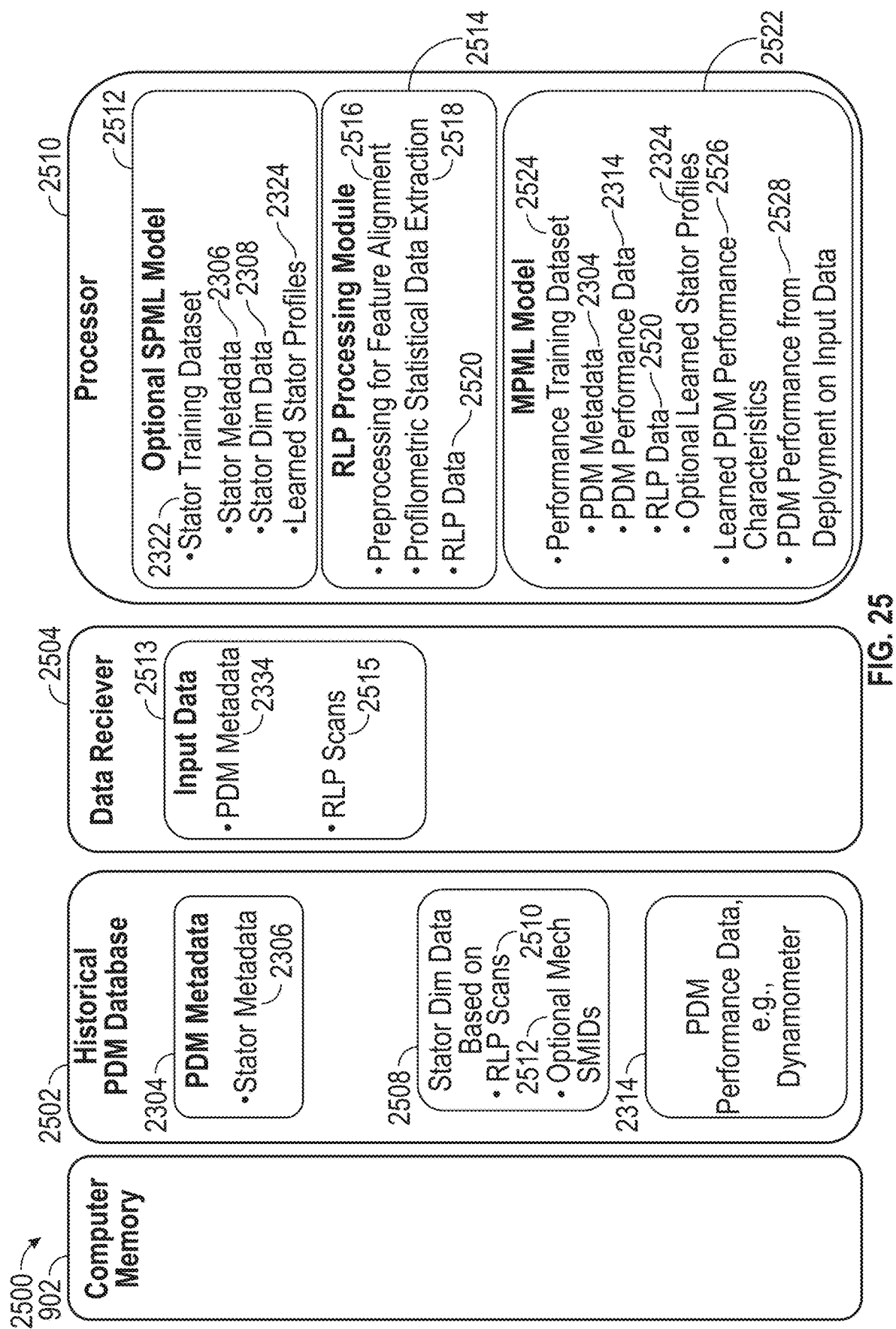
FIG. 25 is a simplified diagram of a computer-implemented system for predicting PDM performance using the method of FIG. 24 according to embodiments of the disclosure herein.
Figure 27:
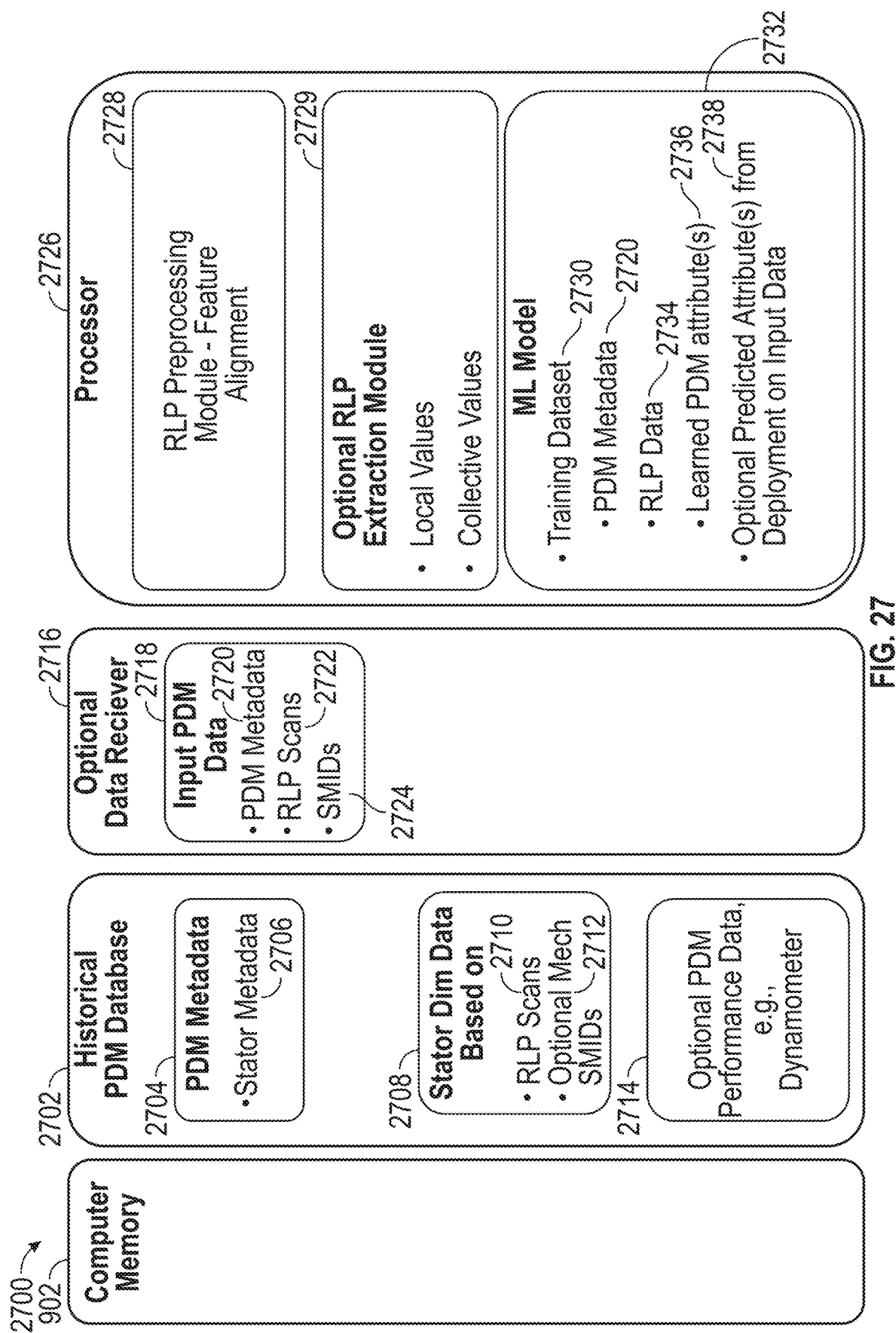
FIG. 27 is a simplified diagram of a computer-implemented system for predicting one or more PDM attributes using the method of FIG. 26 according to embodiments of the disclosure herein.

It can be mentioned that the latent space 2124 can also be used in the data inputs to MPML model 2326, 2520, 2732 (FIGS. 23, 25, 27).

The convolutional architecture 2130 can include a transformer, for example, which can be equipped with attention mechanisms to focus on sequence-to-sequence tasks. The encoder of the transformer processes a combined input of VAE latent space 2124 encoding of the laser data, static numerical features, and the decoded output 2125 from the VAE decoder 2126, into three respective neural networks. The decoded VAE output 2128 is processed with positional encodings and self-attention within the architecture of the transformer to enable the model to capture both global and local dependencies, enhancing the accuracy and contextual awareness of datapoint magnitude prediction.

The noising of the laser data in the manner described above can additionally be useful in the operation of the transformer in architecture 2130, which implements the final step of producing an accurate synthetic laser scan, as the differences between the data decoded by the transformer and the raw (prepared) laser data.

The decoder-encoder of the transformer is integrated with the VAE encoder 2118 and decoder 2126 by processing the VAE encoded features 2122 in the encoder-decoder framework of the transformer. This step integrates the compact latent representations with averaged numerical features, facilitating and enhancing advanced sequence-to-sequence prediction capabilities and leveraging the efficiencies of data compression in the VAE encoder 2118 and data generation in the VAE decoder 2126, as well as in the transformer, which handles the sequential data and captures complex dependencies.

The transformer in architecture 2130 preferably also employs an architecture designed specifically for sequence-to-sequence (Seq2Seq) tasks. The inclusion of the static features mentioned above ensures that the transformer encoder has access to a rich context that can enable more nuanced understanding and representation of the input sequence. This process benefits from the transformer preferably having multiple layers of self-attention networks and feedforward networks. These networks parse and contextualize the information for accurate sequence modeling, allowing the model to focus on different parts of the input sequence for generating each word of the output sequence.

The transformer decoder utilizes the preferably context-rich embeddings generated by the transformer encoder, informed by both dynamic and static inputs, to produce predictions. The attention mechanisms can facilitate a focus on relevant portions of the input sequence and static context to generate precise and informed outputs.

Preferably, the positional encodings are integrated with input embeddings in the transformer to maintain sequential integrity of the data. The attention mechanisms in the transformer further enhance the model capabilities to discern and prioritize various elements of the input sequence, including those influenced by static features, allowing for a nuanced understanding of both global and local dependencies.

MOTOR Performance Prediction from SMID Data and Synthetic Profilometric Data

Figure 22:
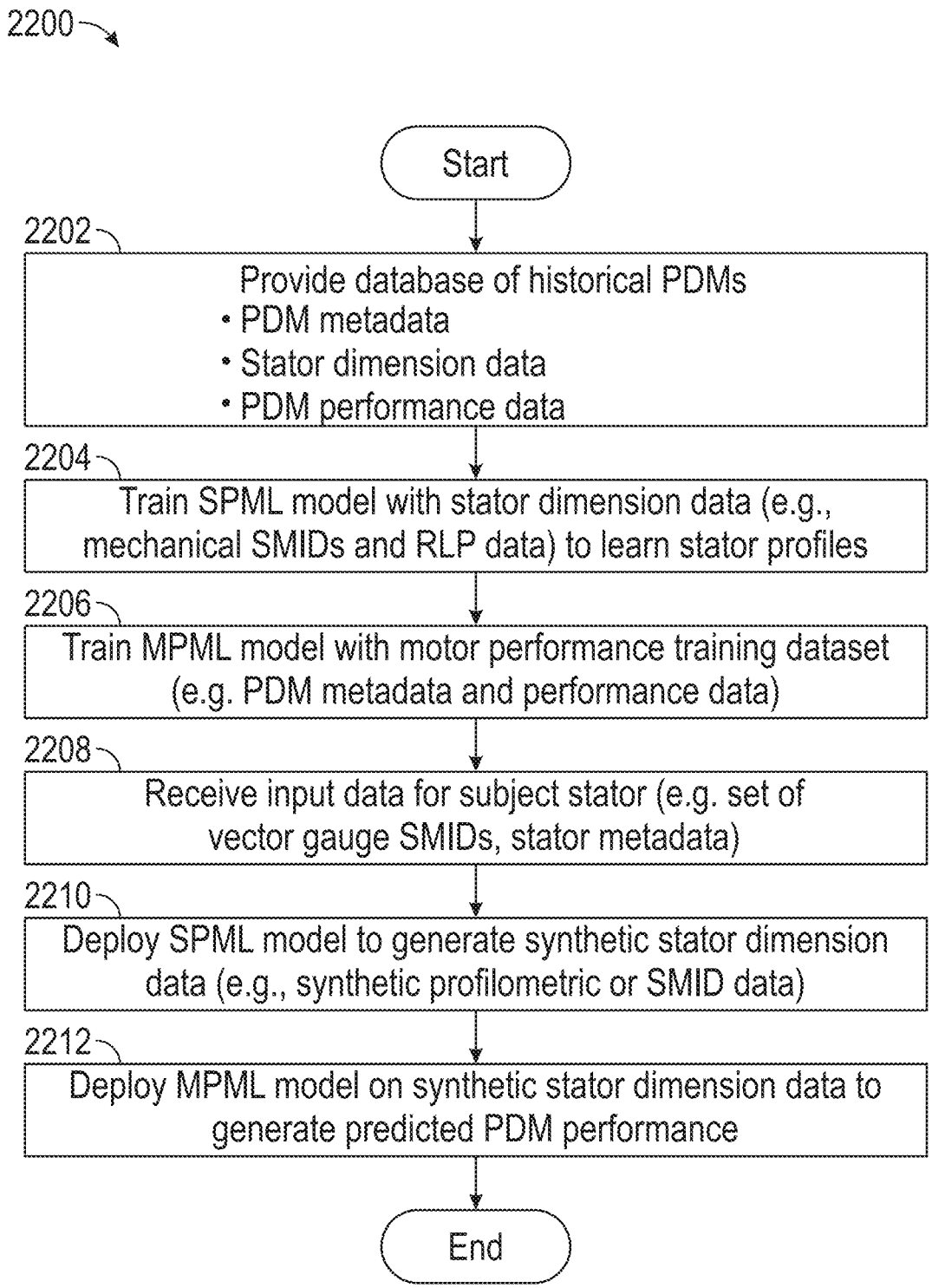
FIG. 22 is a simplified flow chart for using an SPML model and a motor performance machine learning (MPML) model to predict PDM performance from SMID input data and synthetic stator dimension data, according to an embodiment of this disclosure.

With reference to the simplified diagrams of FIGS. 22 and 23, there is disclosed a computer-implemented method 2200 for predicting performance characteristics of a positive displacement motor (PDM) from SMID input data and synthetic stator dimension data. The method 2200 can be implemented, for example, in a computer system 2300 comprising a computer memory 902, a database 2302 of historical PDMs comprising respective stators 3 and rotors 4, a data receiver 2316, and a processor 2318, according to embodiments herein.

In step 2202, a database 2302 of historical PDMs comprising respective stators and rotors is provided. The database 2302 comprises PDM metadata 2304 comprising stator metadata 2306; stator dimension data 2308 based on sets of mechanical stator minor inside diameter (SMID) measurements 2310 and radial laser profilometric (RLP) scans 2312 taken at or near a plurality of spaced axial PDM measurement locations in the respective stators of the historical PDMs; and PDM performance data 2314, e.g., data from the evaluation of the PDM on a dynamometer as discussed above in connection with FIG. 10 and step 1007, which can include: the relationship between torque and differential pressure (DP), e.g., slope of a linear relationship between torque and DP, maximum recommended full load DP (FLDP) to avoid excessive loss of stator life, full load torque, and so on; rotational speed (RPM) of the rotor as a function of volumetric flow rate (RPG or RPL) and/or DP, e.g., full load RPM, full load flow rate; and so on. The PDM performance data 2314 (and/or the PDM metadata 2304) may also include data for adjustment for variations in operating temperature, drilling fluid characteristics (e.g., viscosity, density), any drilling fluid-elastomer chemical interactions, and so on. The database 2302 can otherwise be populated substantially as described above in connection with the database 904 and FIGS. 8-19, especially FIG. 10 with the inclusion of PDM metadata in step 1006 and PDM performance evaluation in step 1007, for example.

In step 2204, a stator profile machine learning (SPML) model 2320 is trained with a stator training dataset 2322 comprising the stator metadata 2306 and the stator dimension data 2308 in the database 2302 to learn stator profiles 2324 from the stator dimension data. Step 2204 can be carried out substantially as described above in connection with FIGS. 20-21.

In step 2206, a motor performance ML (MPML) model 2326 is trained with a motor performance training dataset 2328 comprising, for example, the PDM metadata 2304 and the PDM performance data 2314 from the database 2302, and the learned stator profiles 2324 from step 2204, to learn PDM performance characteristics 2330. The training dataset 2328 preferably also comprises the preprocessed RLP scan data with feature alignment, the extracted statistical profilometric data (FIGS. 18-19), and rotor OD measurement data. In some embodiments, the learned stator profiles 2324 in the training dataset 2328 comprise the proposal data vectors 2125 (FIG. 21) compressed in latent space 2124 in which the learned stator profile data are embedded, which can include the preprocessed RLP scan data with feature alignment and/or the extracted statistical profilometric data as discussed in connection with FIGS. 20-21.

The MPML model 2326 can comprise algorithms such as, for example, nested tokenization algorithms such as XT 1354, random forest algorithms such as RF, algorithms for training and building layers of neural networks such as NN Torch, deep learning libraries such as FASTAI NN, CATBoost, LightGBM, linear regression learning algorithms such as LR, and so on, or any suitable combination. These algorithms can be used in weighted stacked ensembles, e.g., on the H2O platform, to learn the optimal combination and weighting of the prediction algorithms to minimize an appropriate loss function.

In step 2208, input data 2332 for a subject PDM are received. The input data 2332 comprise input PDM metadata 2334 including stator metadata 2235, and input mechanical stator minor inside dimension (SMID) measurements 2336 taken at or near a plurality of spaced axial PDM measurement locations in the stator of the subject PDM.

In step 2210, the SPML model 2320 is deployed on the input mechanical SMID measurements 2336 to generate synthetic stator dimension data 2338 for the subject PDM.

In step 2212, the MPML model 2326 is deployed on the synthetic stator dimension data 2338 generated in step 2210 to predict PDM performance 2340 for the subject PDM.

The computer system 2300 shown in FIG. 23 includes computer memory 902 described above in connection with FIG. 9.

The database 2302 of historical PDMs includes PDM metadata 2304 including stator metadata 2306; stator dimension data 2308 based on mechanical SMID measurements 2310 and RLP scans 2312; and PDM performance data 2314. The database 2302 is substantially the same as database 904 (FIG. 9) but includes PDM metadata obtained in step 1006 (FIG. 10) and PDM performance data obtained in step 1007 which were optional in FIGS. 8-9.

A data receiver 2316 receives input data 2332 for a subject PDM comprising the PDM metadata 2334 including the stator metadata 2335, and input mechanical SMID data 2336.

A processor 2318 trains the SPML model 2320 with the training dataset 2322 comprising the stator metadata 2306 and the stator dimension data 2308 to obtain the learned stator profiles 2324, and deploys the SPML model 2320 on the appropriate input data 2332 to obtain synthetic stator dimension data 2338. The SPML model 2320 can be trained substantially as described above in connection with FIGS. 11-17.

The processor 2318 also trains the MPML model 2326 with the motor performance training dataset 2328 comprising the PDM metadata 2304, PDM performance data 2314, and the learned stator profiles 2324, and deploys the MPML model 2326 on the synthetic stator dimension data 2338 to obtain the predicted motor performance data 2340.

Motor Performance Prediction from RLP Scan Data

Figure 24:
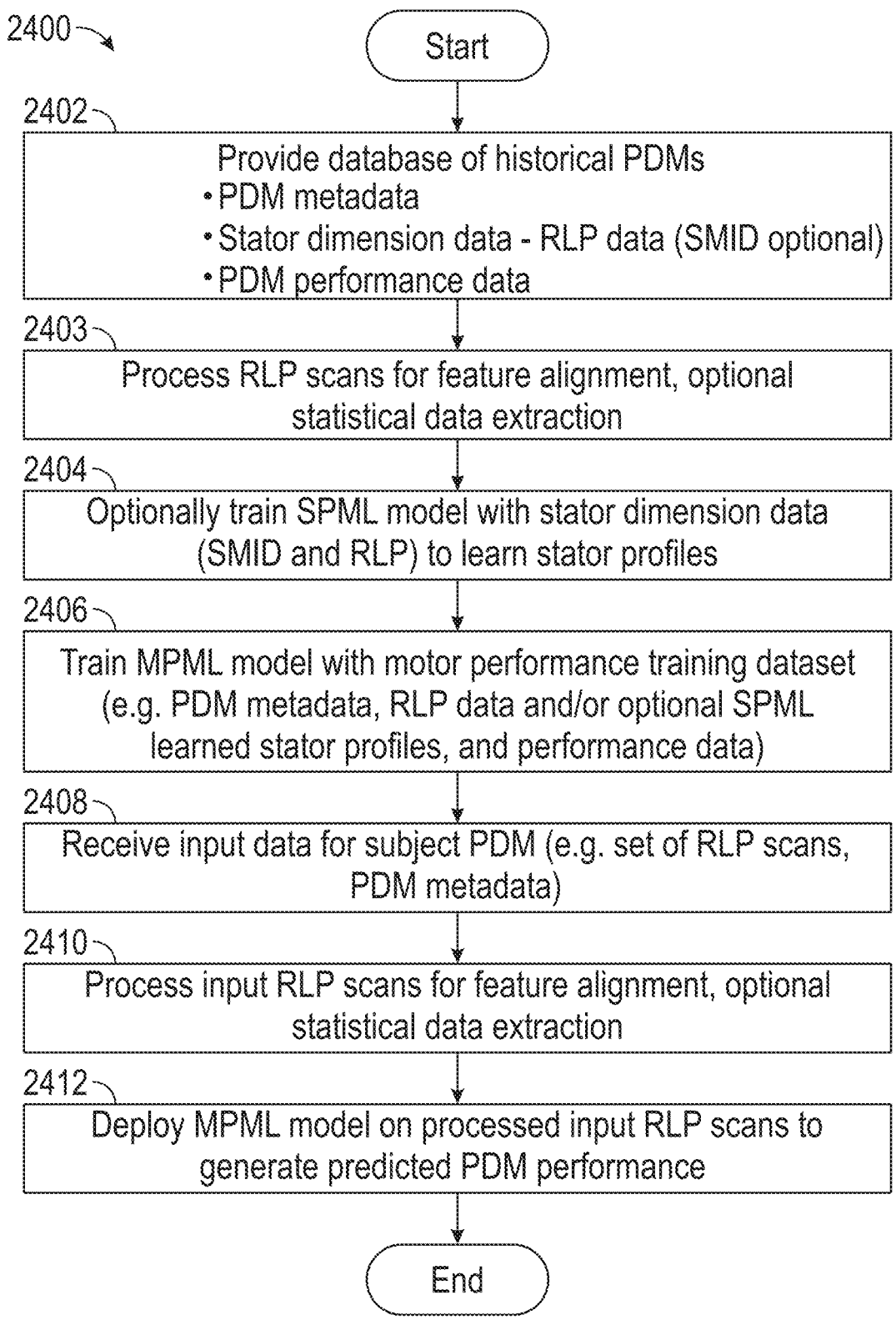
FIG. 24 is a simplified flow chart for using an MPML model to predict PDM performance from RLP scans, according to an embodiment of this disclosure.

With reference to the simplified diagrams of FIGS. 24 and 25, there is disclosed a computer-implemented method 2400 for predicting performance characteristics of a positive displacement motor (PDM) from RLP scans. The method 2400 can be implemented, for example, in a computer system 2500 comprising a computer memory 902, a database 2502 of historical PDMs comprising respective stators 3 and rotors 4, a data receiver 2504, and a processor 2510, according to embodiments herein.

In step 2402, the database 2502 of historical PDMs is provided. The database 2502 comprises PDM metadata 2304 comprising stator metadata 2306 as described above in connection with FIGS. 22-23; stator dimension data 2508 based on sets of RLP scans 2312 and optionally mechanical SMID measurements 2512, taken at or near a plurality of spaced axial PDM measurement locations in the respective stators of the historical PDMs; and PDM performance data 2314, e.g., data from the evaluation of the PDM on a dynamometer as discussed above in connection with FIG. 10 and step 1007, which can include: the relationship between torque and differential pressure (DP), e.g., slope of a linear relationship between torque and DP, maximum recommended full load DP (FLDP) to avoid excessive loss of stator life, full load torque, and so on; rotational speed (RPM) of the rotor as a function of volumetric flow rate (RPG or RPL) and/or DP, e.g., full load RPM, full load flow rate; and so on. The PDM performance data 2314 (and/or the PDM metadata 2304) may also include data for adjustment for variations in operating temperature, drilling fluid characteristics (e.g., viscosity, density), any drilling fluid-elastomer chemical interactions, and so on. The database 2502 can otherwise be populated substantially as described above in connection with the database 904 and FIGS. 8-19, especially FIG. 10 with the inclusion of PDM metadata in step 1006 and PDM performance evaluation in step 1007, for example.

In step 2403, the RLP scans 2510 are processed in RLP processing module 2514, which may include preprocessing for feature alignment in submodule 2516 and optionally profilometric statistical data extraction in submodule 2518, to obtain RLP data 2520 based on the RLP scans 2510. The RLP data 2520 from step 2403 can be used in the performance training dataset 2524 to train motor performance ML (MPML) model 2522.

In optional step 2404, if implemented, a stator profile machine learning (SPML) model 2512 is optionally trained with a stator training dataset 2322 comprising the stator metadata 2306 and the stator dimension data 2508 in the database 2502 (including dimension data based on the optional SMID data 2512) to learn stator profiles 2324 from the stator dimension data. Step 2404 can be carried out substantially as described above in connection with FIGS. 20-21. Step 2404 is optional since in this embodiment the MPML model 2522 can be trained from the RLP scans 2510 alone.

In step 2406, MPML model 2522 is trained with motor performance training dataset 2524 comprising, for example, the PDM metadata 2304 and the PDM performance data 2314 from the database 2502, RLP data 2520 based on the RLP scans 2510 from RLP processing module 2514, and optionally the learned stator profiles 2324 from step 2404, to learn PDM performance characteristics 2526. The RLP data 2520 are preferably based on the RLP scans 2510 preprocessed for feature alignment in submodule 2516 and processed for profilometric statistical data extraction in submodule 2518, for example, as described above in connection with FIGS. 10-19.

In step 2408, input data 2513 for a subject PDM are received. The input data 2513 comprise input PDM metadata 2334, and input RLP scans 2516 taken at or near a plurality of spaced axial PDM measurement locations in the stator of the subject PDM.

In step 2410, the input RLP scans 2515 are processed in RLP processing module 2514, which may include preprocessing for feature alignment in submodule 2516 and optionally profilometric statistical data extraction in submodule 2518, to obtain RLP data 2520 based on the input RLP scans 2516.

In step 2412, the MPML model 2522 is deployed on the input data 2513, including the RLP data 2520 based on the input RLP scans 2516 from step 2410 to predict PDM performance 2528 for the subject PDM.

The computer system 2500 shown in FIG. 25 includes computer memory 902 described above in connection with FIG. 9.

The database 2502 of historical PDMs includes PDM metadata 2304 including stator metadata 2306; stator dimension data 2508 based on RLP scans 2312 and optionally mechanical SMID measurements 2512; and PDM performance data 2314. The database 2502 is substantially the same as database 904 (FIG. 9), but includes PDM metadata obtained in step 1006 (FIG. 10) and PDM performance data obtained in step 1007 which were optional in FIGS. 8-9, and may omit the mechanical SMID data 916, 2512) which are optional in FIGS. 24-25.

A data receiver 2504 receives input data 2513 for a subject PDM comprising the PDM metadata 2334 and input RLP scans 2515.

A processor 2510 is provided to: (1) optionally train the SPML model 2512 with the training dataset 2322 comprising the stator metadata 2306 and the stator dimension data 2508 including data based on the mechanical SMID data 2512, to obtain the learned stator profiles 2324, (2) process RLP scan data 2510, 2515 which are preprocessed for feature alignment in submodule 2516 and processed for profilometric statistical data extraction in submodule 2518 to obtain RLP data 2520, for example, as described above in connection with FIGS. 10-19; (3) train the MPML model 2522 with motor performance training dataset 2524 comprising, for example, the PDM metadata 2304 and the PDM performance data 2314 from the database 2502, RLP data 2520 based on the RLP scans 2510 from RLP processing module 2514, and optionally the learned stator profiles 2324 from SPML model 2512, to learn PDM performance characteristics 2526; and (4) deploys the SPML model 2522 on the appropriate input data 2513 including RLP data 2520 based on input RLP scans 2515 to obtain PDM performance data 2528.

PDM Attribute Prediction from RLP Scan Data

Figure 26:
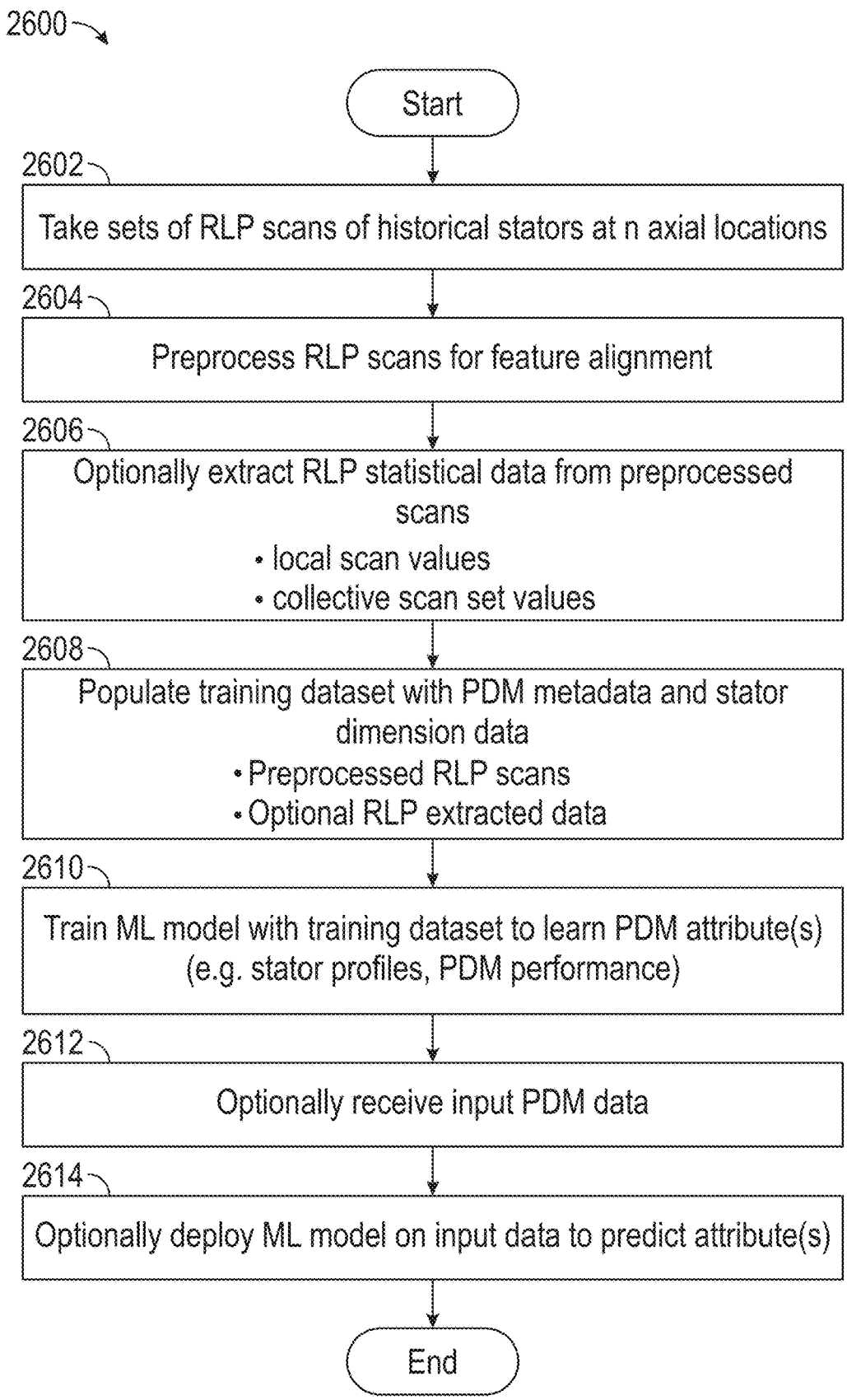
FIG. 26 is a simplified flow chart for predicting one or more attributes of a PDM using preprocessed and/or processed RLP scan data in a training dataset for an ML model according to an embodiment of this disclosure.

With reference to the simplified diagrams of FIGS. 26-27, there is shown a flow chart for a computer-implemented ML method 2600 for predicting one or more attributes of a PDM, e.g., stator profiles, performance, and so on, using preprocessed and/or processed RLP scan data in a training dataset for an ML model, according to an embodiment of this disclosure. The method 2600 can be implemented, for example, in a computer system 2700 comprising a computer memory 902, a database 2702 of historical PDMs, and a processor 2726.

In step 2602, sets of RLP scans 2710 at a plurality of axially spaced measurement locations are taken from the respective stators in the historical PDMs, e.g., with laser gauge 25, to obtain measurements of the peaks, valleys, and flanks in the respective stators, where the number of the spaced axial measurement locations ranges from 2 to about 20, preferably from 4 to 10, more preferably from 5 to 8, and especially 6.

In step 2604, the RLP scans 2710 are preprocessed in RLP preprocessing module 2728 for feature alignment, e.g., as discussed above in connection with FIGS. 11-17. The preprocessed sets of the RLP scans for the respective stators obtained from module 2728 have commonly aligned peaks, valleys, and flanks (see FIG. 17), can then be used directly in an ML model 2732, e.g., in RLP data 2734 in training dataset 2730.

If desired, however, in step 2606, RLP statistical data can optionally be extracted in optional extraction module 2729, e.g., as discussed in connection with FIGS. 18-19. The extracted RLP statistical data from each of the preprocessed sets of RLP scans can comprise, for example, one or more of local maximum, minimum, mean and/or deviation magnitude values from the respective RLP scans separately, and one or more of overall maximum, minimum, mean and/or deviation magnitude values from the respective set of the RLP scans collectively.

Then in step 2608, training dataset 2730 is populated with PDM metadata 2720 comprising stator metadata, and with stator dimension data 2730 comprising the preprocessed sets of the RLP scans from step 2604/module 2728 and/or the optionally extracted RLP statistical data from step 2606/module 2729.

In step 2610, ML model 2732 is trained with training dataset 2730 to learn the attribute(s) 2736, e.g., stator profiles and/or PDM performance.

In optional steps 2612, 2614, if implemented, input PDM data 2718 may be received, e.g., PDM metadata 2720, RLP scans 2722, rotor OD data, SMID measurements 2724., and so on, and the trained ML model 2732 deployed on the input PDM data 2718 to obtain predicted attributes 2738. For example, the ML model 2732 can comprise an SPML model and/or an MPML model trained and/or deployed as discussed in connection with FIGS. 20-25.

The computer system 2700 shown in FIG. 27 includes computer memory 902 described above in connection with FIG. 9.

The database 2702 of historical PDMs includes PDM metadata 2704 including stator metadata 2706; stator dimension data 2708 based on RLP scans 2710 and optionally mechanical SMID measurements 2712; and optionally PDM performance data 2714, e.g., obtained by evaluation of the PDMs on a dynamometer as discussed above. The database 2702 is substantially the same as database 904 (FIG. 9), but includes PDM metadata obtained in step 1006 (FIG. 10) while the mechanical SMID data 916 are optional-since the MPML model can be trained and deployed solely on RLP scan data 2710, 2722, without using SMID data 2722.

An optional data receiver 2704 receives input data 2718 for a subject PDM comprising the PDM metadata 2720, input RLP scans 2722, and if desired, SMID measurement data 2724.

A processor 2726 comprises RLP preprocessing module 2728, optional RLP data extraction module 2729, and ML model 2732. ML model 2732 can be trained with training dataset 2730 comprising PDM metadata 2720 and RLP data 2734 comprising the preprocessed data from module 2728, and optionally the data extracted from module 2729 to obtain learned PDM attribute(s) 2736. The ML model 2732 can optionally be deployed on input PDM data 2718 to obtain the predicted attribute(s) 2738.

Synthetic 3-D Imaging Data from Laser Scan Data or Synthetic Laser Scan Data

The model 1250 (FIG. 12) can be thought of as a tool to transcend the essential 1-dimensionality of the mechanical measurements, sampled n times across the axial dimension of the stator, into the 2-dimensionality of the laser scans n times across the axis. However, just as the model 1250 can extend the mechanical measurement data into the added dimension of the laser measurement data, so too does the model 1250 effectively expand the 2-D laser data into 3-dimensionality that can be nearly completely characterized and synthetically extrapolated with the statistical data that is extracted, for example, by rotating the laser and/or synthetic laser scans through the stages of the motor. This effectively provides a synthetic 3-D representation of the entire inner surface of the stator without having any 3-D data for training.

Alternatively, the same principles can be applied by the dimensional model, for example, with a training dataset comprising the historical data of 2-D laser scans at the n axial dimensions described herein and additionally with continuous laser scans along the length of the stator, or judiciously selected portion(s) less than the entire length. The model would then be informed to extrapolate the 2-D n laser scans, or even the synthetic 2-D scan data obtained from mechanical measurement with vector gauges, into a complete 3-D representation of the inner surface of the stator.

Any of the 3-D models mentioned can similarly be used for PDM performance modeling, such as described below in reference to FIGS. 13-14.

Motor Performance Prediction from RPL Scans or Mechanical SMID Measurements

Figure 28:
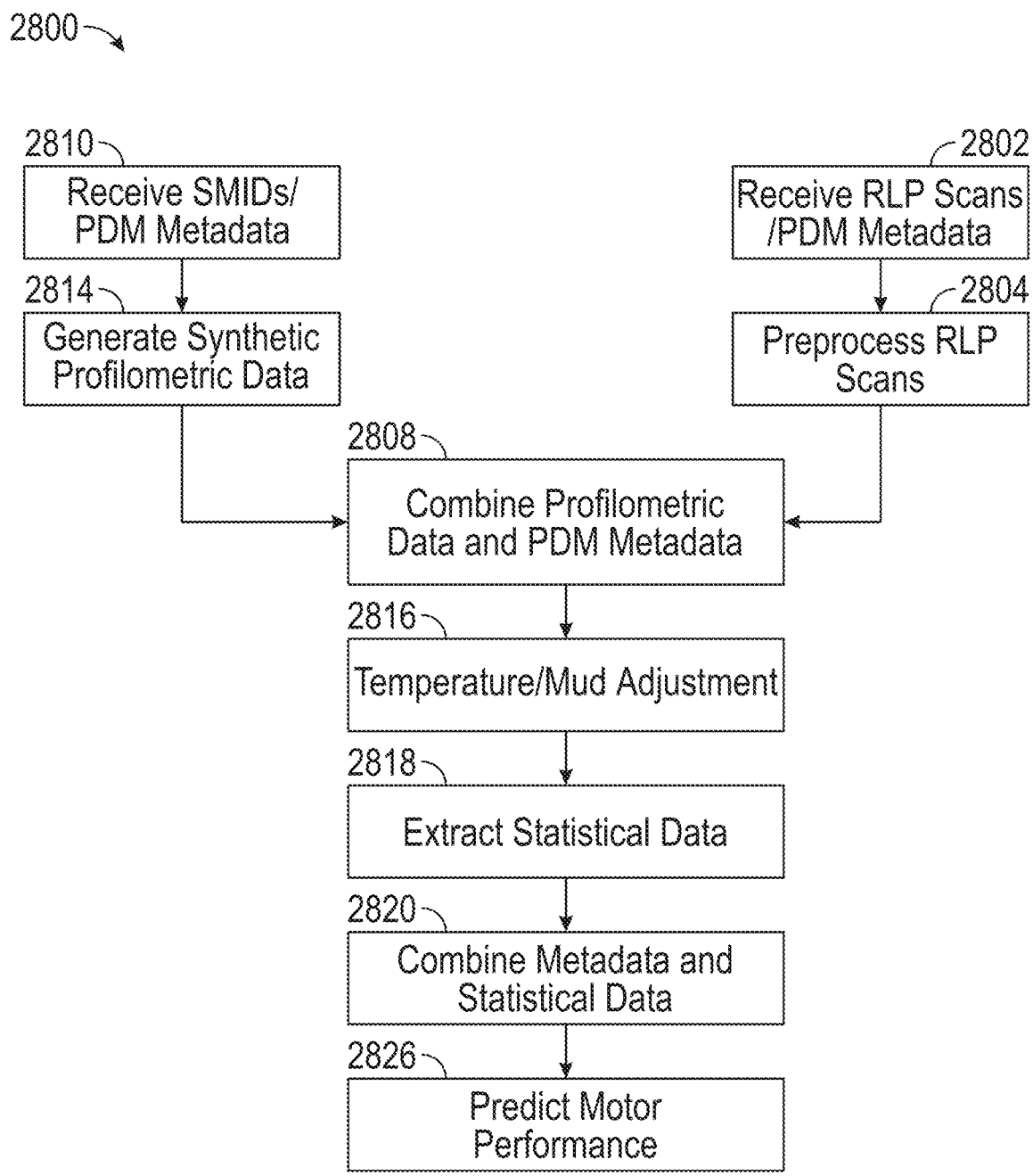
FIG. 28 is a simplified flow chart for PDM performance prediction by deploying an MPML model where the input stator dimension data for a subject PDM can be either mechanical SMID measurements or RLP scans according to an embodiment of this disclosure.

With reference to FIG. 28, the simplified flow diagram shows a PDM performance prediction method 2800, which can predict performance using either RPL scans or mechanical SMIDs from the stator of the subject PDM being evaluated, according to embodiments of the present invention.

Where RPL scans from the subject stator are available, e.g., by using a laser gauge 25 (FIG. 5) to scan the stator at n axial locations, in step 2802 the set of RPL scans and PDM metadata are received as input data. Then, in step 2804 the RLP scans are preprocessed for feature alignment, preferably as described above in connection with FIGS. 11-17.

Where the mechanical SMID measurements are instead used, e.g., by measuring the stator with the vector gauge 20 (FIG. 5) at n axial locations, in step 2810 the set of SMID measurements and PDM metadata are received as the input data. Then, in step 2814 synthetic profilometric data are generated, preferably by deploying a trained SPML model 926 (FIG. 9) as in step 808 (FIG. 8), and/or as discussed above in connection with FIGS. 20-25, e.g., where the SPML model has been trained with RPL and SMID data from the historical database of PDMs.

The PDM metadata received in steps 2802, 2810, i.e., PDM classification data, may include, for example, elastomer type, number of lobes, number of stages, motor size range, OEM full load RPG, OEM no load RPG, OEM no load RPM, OEM torque slope, OEM full load torque, OEM full load differential pressure, and so on. Stator metadata, e.g., elastomer type, number of lobes, number of stages, and so on, can be used in the synthetic profilometric data generation step 2814, where it is used in the SPML model to obtain the synthetic data. The motor metadata can also be used in the geometry adjustment step 2816, the statistical data extraction step 2818, the motor performance prediction step 2820, and so on.

Additionally, measurements of the rotor from the PDM can optionally be received in steps 2802 and/or 2810. These can be obtained, for example, mechanically with conventional mechanical devices such as calipers or with outside diameter optical profilometric devices, such as, for example, the CMM or the 3D optical image mapping device mentioned above. Regardless of the type of measuring device, the measurements of the rotors are preferably made at or near the same n axial measurement locations as the stators. Where a set of rotor OD measurements are taken these can be processed to obtain peak and mean rotor OD for the set and the mean absolute deviation rotor OD. Where imaging scans are taken of the rotors, the profilometric rotor scans can be processed in the same or similar manner as the stator RPL scans as discussed above in connection with FIGS. 11-17.

Next, in step 2808 the PDM metadata and the profilometric data, either the synthetic data from step 2814 or the preprocessed RLP scans from step 2804, are combined. In step 2816, the combined data from step 2814 are adjusted for the expected downhole conditions, such as elevated temperature and the types of drilling fluid and stator elastomer, to take thermal expansion and elastomer swelling into account.

Next, in step 2816 the adjusted profilometric data are processed to extract statistical data, for example, as discussed above in connection with FIGS. 18-19, for the PDM performance prediction step 2826. Although the adjusted profilometric data from step 2816 comprising the complete sets of indexed datapoints from each scan location can be used, we prefer to use the statistical data to improve the speed and focus of the algorithms in the PDM performance prediction step 2826. The extracted profilometric statistical data may include, e.g., one or more of local maximum, minimum, mean and/or deviation magnitude values extracted from each of the scan locations separately; one or more of overall maximum, minimum, mean and/or deviation magnitude values extracted from the scans collectively; one or more wobble or wander magnitude values; and/or one or more stator minor ID (SMID) magnitude values, SMID mean, and/or mean absolute deviation SMID; and so on.

Finally, in step 2820 the statistical data from step 2818 are combined with the PDM metadata received in steps 2804 or 2810 and the combined data are used to predict the motor performance characteristics in step 2826, e.g., using MPML model 2326, 2520, 2732 (FIGS. 23, 25, 27) described above.

Figure 29:
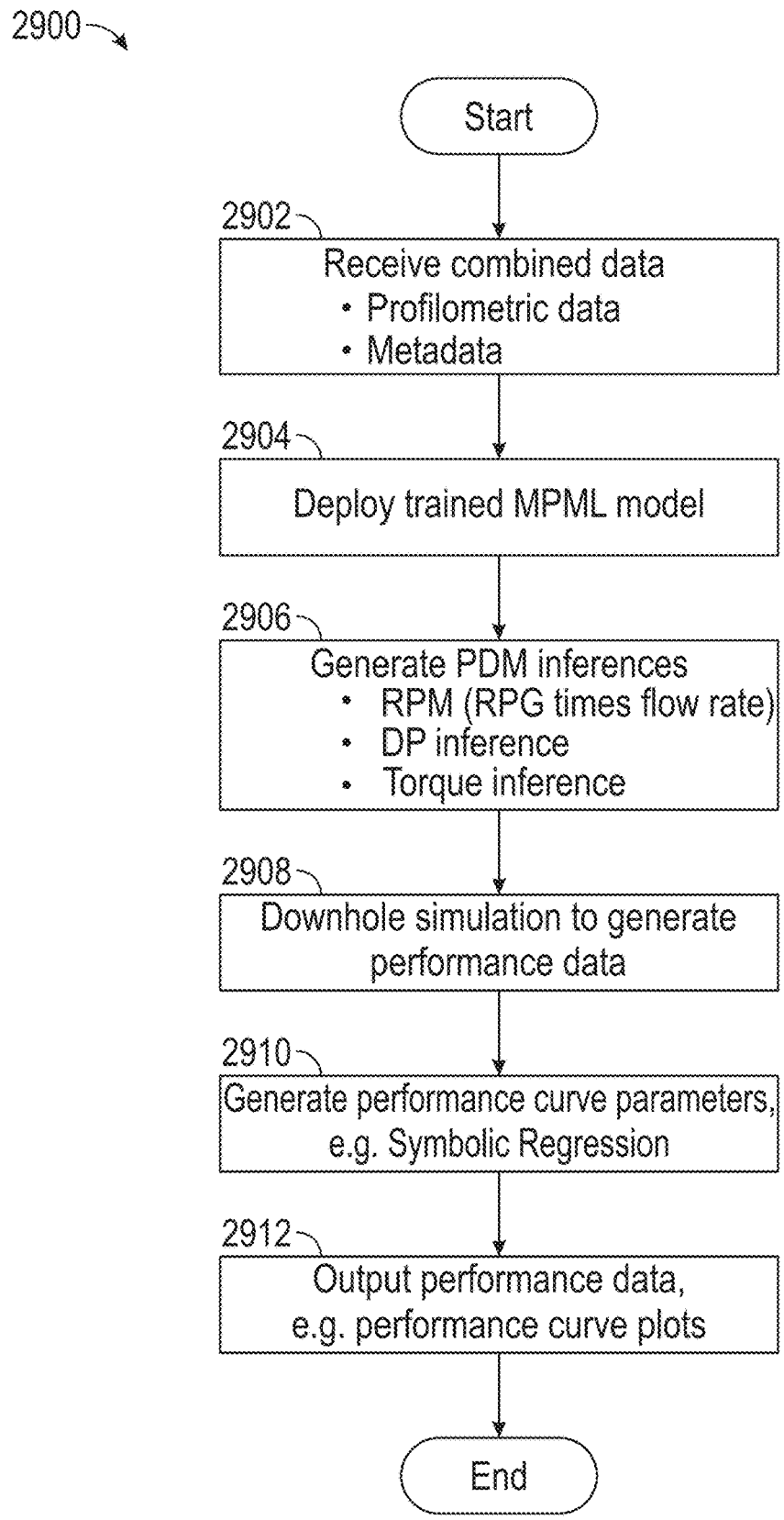
FIG. 29 is a simplified diagram of a computer-implemented MPML model according to an embodiment of this disclosure.
Figure 30:
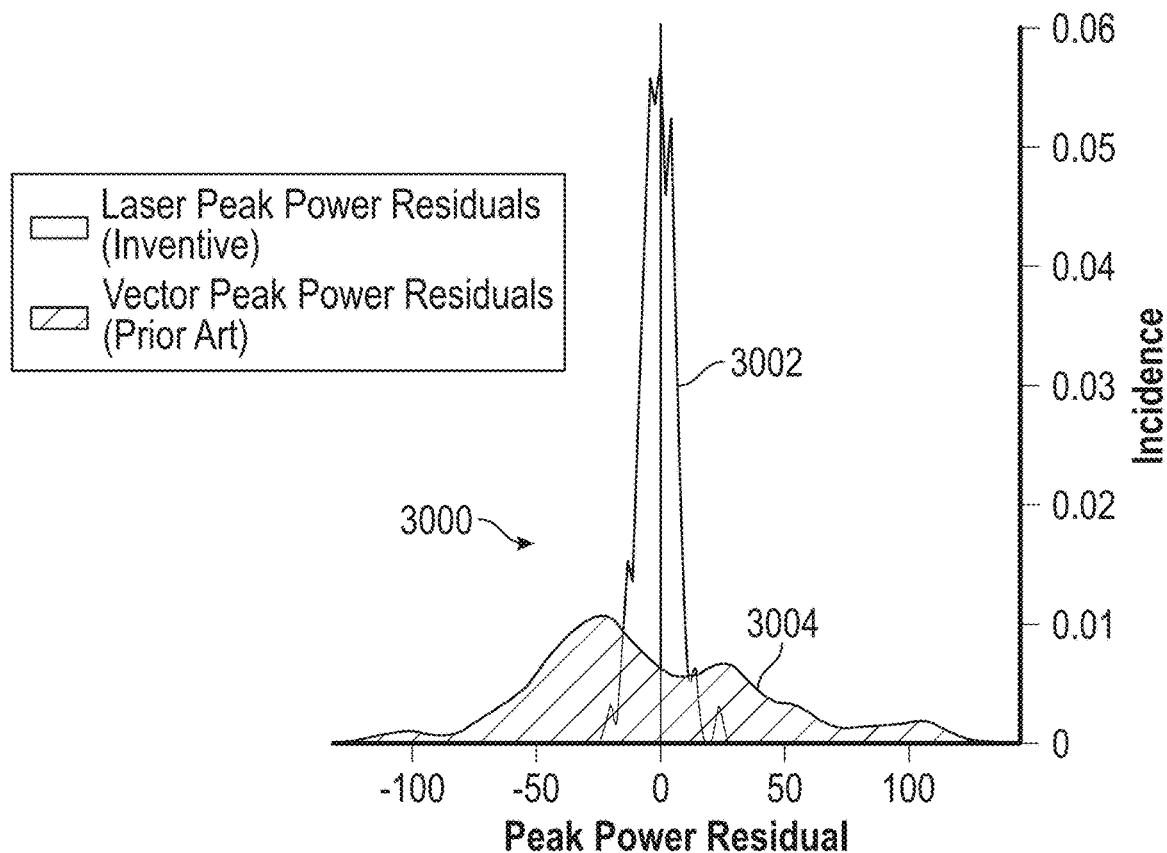
FIG. 30 is a diagram of overlaid synthetic laser and vector gauge distributions of the error residuals between measured and predicted peak power for PDMs using laser scans according to the present disclosure and vector gauge data in the prior art.

An exemplary embodiment of step 2826 is shown in the simplified flow chart of method 2900 in FIG. 29. In step 2902 the combined PDM metadata and profilometric statistical data from step 2820 are received and in step 2904 the trained MPML model is deployed. In step 2906 PDM inferences are generated by the MPML model, e.g., rotational speed (RPM) of the rotor calculated as the rotations per gallon or liter times the volumetric flow rate, the DP, and the torque.

Figure 6A:
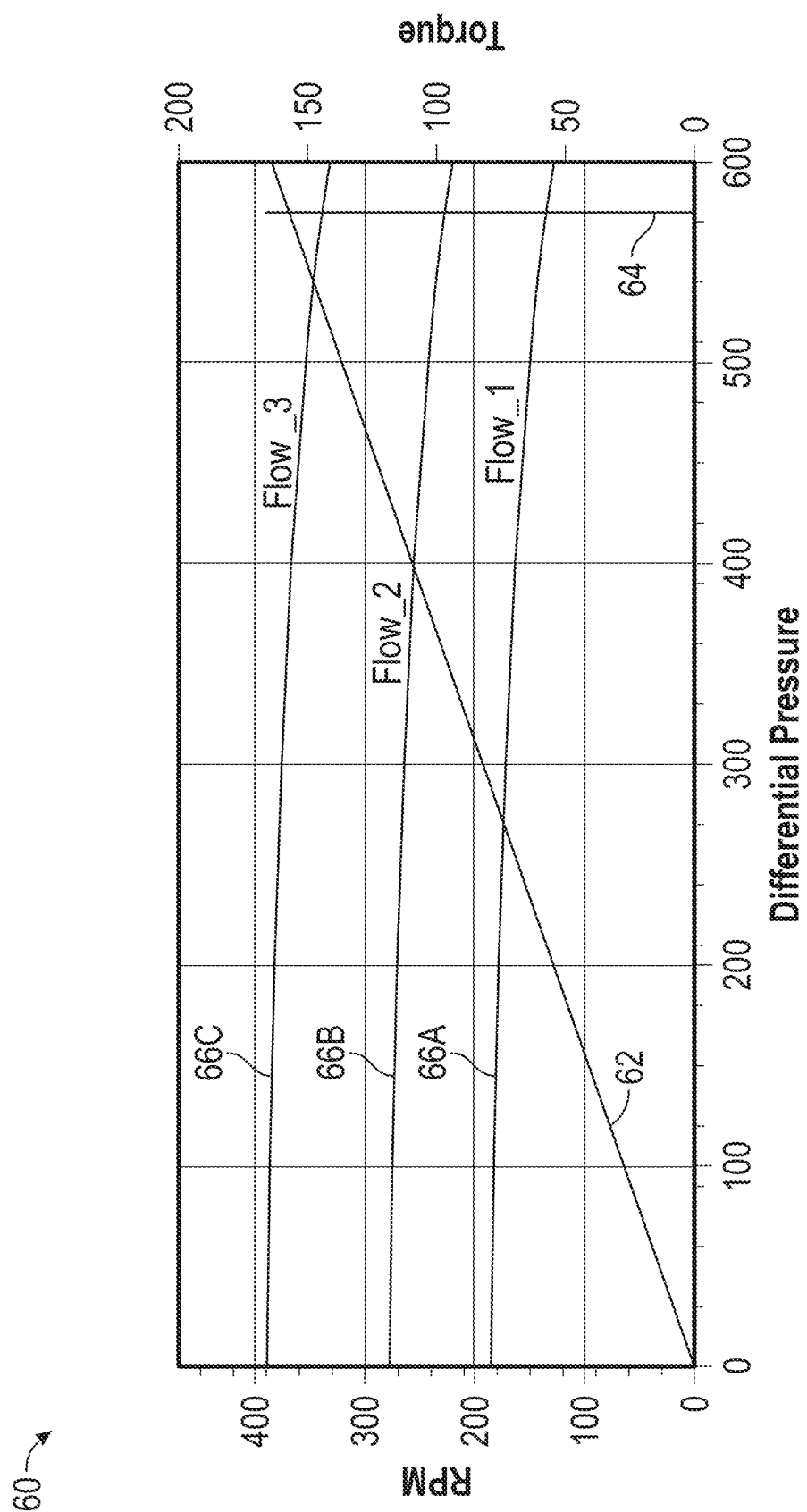
FIG. 6A shows a typical mud motor power curve from a manufacturer (OEM)

Next the motor inferences from step 2906 are used in a downhole simulation step 2908 to generate performance data. Predicted PDM performance characteristics can include, for example, full load and/or no load RPG, RPM, differential pressure, torque, peak power, and so on, or any combination thereof. Then in step 2910 performance curve parameters are generated, e.g., using an algorithm such as Symbolic Regression. Then, in step 2912 the performance data can be output from, e.g., as a performance curve similar to FIG. 6A.

EMBODIMENTS LISTING

Accordingly, the present disclosure provides the following embodiments:
1. A computer-implemented method for generating synthetic stator profilometric data for a positive displacement motor (PDM), comprising the steps of:
(a) providing a database of historical PDMs, the historical PDMs comprising respective stators and rotors, the database comprising PDM metadata comprising stator metadata, and stator dimension data based on sets of mechanical stator minor inside diameter (SMID) measurements and radial laser profilometric (RLP) scans taken at or near a plurality of spaced axial PDM measurement locations in the respective stators of the historical PDMs;
(b) training a stator profile machine learning (SPML) model with a stator training dataset comprising the stator metadata and the stator dimension data in the database to learn stator profiles from the stator dimension data;
(c) receiving input data for a subject PDM, the input data comprising input stator data comprising input stator metadata and input mechanical SMID measurements taken at or near a plurality of spaced axial PDM measurement locations in the stator of the subject PDM; and
(d) deploying the SPML model on the input mechanical SMID measurements to generate synthetic stator dimension data for the subject PDM.
2. The method of embodiment 1 further comprising building the database of historical PDMs comprising the stator training dataset, wherein building the database comprises:
taking the mechanical SMID measurements and the RLP scans of the stators of the historical PDMs at or near the plurality of spaced axial PDM measurement locations;
processing the mechanical SMID measurements and the RLP scans to obtain the stator dimension data;
obtaining the stator metadata for the historical PDMs; and
populating the database with the stator dimension data and the stator metadata.
3. The method of embodiment 1 or 2, further comprising:
(e) preprocessing the RLP scans from step (a) for feature alignment in each set to obtain preprocessed sets of the RLP scans for the respective stators comprising commonly aligned peaks, valleys, and flanks.
4. The method of embodiment 3 wherein the preprocessing comprises, for the sets of RLP scans from the respective stators of the historical PDMs:
(1) applying a digital filter to smooth granular noise in the RLP scans of each set;
(2) identifying extrema features in each RLP scan in the respective set based on magnitudes of distance from an axis of the stator to datapoints in the respective extrema features;
(3) identifying extrema points [e.g., max peak or min valley] in each RLP scan of the respective set based on respective intersections of bidirectional moving averages; and
(4) indexing the RLP scans in each respective set to assign the respective identified extrema points to a common alignment angle to obtain the preprocessed sets of the RLP scans.
5. The method of embodiment 3 or 4 further comprising:
(f) extracting RLP statistical data from the preprocessed sets of the RLP scans; and
(g) populating the stator dimension data in the stator training dataset with the extracted RLP statistical data;
wherein the extracted profilometric statistical data from each of the preprocessed sets of RLP scans comprise (i) one or more of local maximum, minimum, mean and/or deviation magnitude values from each of the respective RLP scans separately, and (ii) one or more of overall maximum, minimum, mean and/or deviation magnitude values from the respective set of the RLP scans collectively.
6. The method of embodiment 5, wherein the extracted RLP statistical data further comprise (iii) one or more wobble values from the respective RLP scans, one or more wander values from the respective set of the RLP scans, one or more mean absolute deviation wobble values from the respective set of the RLP scans collectively, or a combination thereof.

7. The method of embodiment 5 or 6 wherein the extraction of the stator profilometric statistical data in step (f) comprises:
(f-1) for each RLP scan in the respective set, classifying datapoints into peak, valley, and flank region datapoints;
(f-2) extracting from each RLP scan in the respective set a scan vector comprising (1) the maximum peak magnitude in the respective scan, (2) the minimum valley magnitude in the respective scan, and (3) one or more mean absolute deviation values in the respective scan (A) for the peak region datapoints with respect to the maximum peak magnitude, (B) for the valley region datapoints with respect to the minimum valley magnitude, and/or (C) for the flank region datapoints with respect to an average flank magnitude of the flank region datapoints, to obtain a scan vector set comprising scan vectors corresponding to each of the spaced axial PDM measurement locations; and
(f-3) extracting from each respective set of RLP scans collective values comprising (1) an overall maximum peak magnitude, a collective mean peak magnitude value of the peak region datapoints, and a collective mean absolute peak deviation value with respect to the collective mean peak magnitude value of the peak region datapoints, for all of the peak region datapoints in the RLP scans in the set, (2) an overall minimum valley magnitude, a collective mean valley magnitude value of the valley region datapoints, and a collective mean absolute valley deviation value with respect to the collective mean valley magnitude value of the valley region datapoints, for all of the valley region datapoints in the RLP scans in the set, and (3) a collective mean flank magnitude value of the flank region datapoints, for all of the flank region datapoints in the RLP scans in the set.

8. The method of embodiment 7 wherein the stator profilometric statistical data extracted in step (f) further comprises, for each respective set of the RLP scans:
scan wobble values of the peak and valley region datapoints for the respective RLP scans of the set;
wander values for the peak and valley region datapoints in the RLP scans in the set; and
mean absolute deviation wobble values for the peak regions, the valley regions, and all regions overall in the RLP scans for each respective set.

9. The method of any of embodiments 5-8 wherein the SPML model training in step (b) comprises:
(1) processing the stator training dataset from step (g) in an ML framework comprising a two-layer encoding architecture comprising an input layer receiving the stator training dataset, and a proposal neural network layer;
(2) generating a latent space of proposal data vectors in the proposal neural network layer embedding the stator dimension data;
(3) generating estimated data from the proposal data vectors in a two-layer decoding architecture of the ML framework comprising the proposal neural network layer and an estimated neural network layer; and
(4) iterating steps (1) to (3) to minimize an estimated neural network layer loss function.

10. The method of embodiment 9 wherein the ML framework comprises a conditional variational autoencoder (VAE) learning framework comprising one or more VAE encoders in the two-layer encoding architecture and one or more VAE decoders in the two-layer decoding architecture.

11. The method of embodiment 9 or 10 wherein the SPML model training in step (b) further comprises:
(5) convoluting static variables from the stator metadata to create a supporting neural network, preferably comprising one or more VAE support layers;
(6) adjusting the proposal data vectors with the supporting neural network; and
(7) iterating steps (5) to (6) to minimize a reconstruction loss function and obtain an output model for the deployment as the SPML model in step (d).

12. The method of embodiment 11 wherein the static variables are convoluted in step (5) using a two-layer transformer learning framework, an LSTM learning framework, or a combination thereof.

13. The method of any preceding embodiment wherein the synthetic stator dimension data comprise synthetic SMID value(s) for the subject PDM selected from a vector of synthetic SMID values corresponding to the plurality of spaced axial PDM measurement locations, a mean synthetic SMID value, and a combination thereof.

14. The method of any preceding embodiment wherein the synthetic stator dimension data comprise synthetic stator profilometric data.

15. The method of any preceding embodiment 14 wherein the synthetic stator dimension data comprise synthetic stator statistical profilometric data for the subject PDM comprising (A) one or more of local maximum, minimum, mean and/or deviation magnitude values of peaks and valleys at each one of the plurality of the spaced axial measurement locations separately, (B) one or more of overall maximum, minimum, mean and/or deviation magnitude values of peaks and valleys for the plurality of the spaced axial measurement locations collectively, and optionally (C) one or more wobble values, one or more wander values, or a combination thereof.

16. The method of embodiment 14 or 15 further comprising embedding the synthetic stator profilometric data in a corresponding synthetic stator data vector in a latent space of stator data vectors embedding the learned stator profiles from step (b).

17. The method of any preceding embodiment wherein the database of historical PDMs comprises PDM performance data, wherein the input data comprise subject PDM metadata, and wherein the method further comprises:
(I) training a motor performance ML (MPML) model with a PDM training dataset comprising the PDM metadata and the PDM performance data from the database, and the learned stator profiles from step (b), to learn PDM performance characteristics; and
(II) deploying the MPML model on the subject PDM metadata and the synthetic stator dimension data generated in step (d) to predict PDM performance for the subject PDM.

18. The method of embodiment 17 wherein the synthetic stator dimension data comprise synthetic SMID value(s), synthetic stator profilometric data, synthetic stator statistical profilometric data, a latent space vector embedding the synthetic stator profilometric data and/or the synthetic stator statistical profilometric data, or a combination thereof.

19. The method of any preceding embodiment wherein the database of historical PDMs comprises PDM performance data, wherein the input data comprise subject PDM metadata, and wherein the method further comprises:
(I) training a motor performance ML (MPML) model with a PDM training dataset comprising the PDM metadata and the PDM performance data from the database, and the latent space of proposal data vectors embedding the stator dimension data from step (2), to learn PDM performance characteristics;
(II) deploying the MPML model on the input data and the synthetic stator dimension data generated in step (d) to predict PDM performance for the subject PDM.

20. The method of any preceding embodiment wherein the database of historical PDMs comprises rotor dimension data [preferably mechanical rotor major outside dimension data, more preferably taken at or near the plurality of spaced axial PDM measurement locations for the respective rotors of the historical PDMs], and wherein the input data comprise input rotor dimension data.

20A. A computer-implemented method for predicting performance characteristics of a positive displacement motor (PDM), comprising the steps of:
(a) providing a database of historical PDMs, the historical PDMs comprising respective stators and rotors, the database comprising (1) PDM metadata comprising stator metadata, (2) stator dimension data based on sets of mechanical stator minor inside diameter (SMID) measurements and radial laser profilometric (RLP) scans taken at or near a plurality of spaced axial PDM measurement locations in the respective stators of the historical PDMs, and (3) PDM performance data;
(b) training a stator profile machine learning (SPML) model with a stator training dataset comprising the stator metadata and the stator dimension data in the database to learn stator profiles from the stator dimension data;
(c) training a motor performance ML (MPML) model with a PDM training dataset comprising the PDM metadata and the PDM performance data from the database, and the learned stator profiles from step (b), to learn PDM performance characteristics;
(d) receiving input data for a subject PDM, the input data comprising input PDM metadata and input mechanical stator minor inside dimension (SMID) measurements taken at or near a plurality of spaced axial PDM measurement locations in the stator of the subject PDM;
(e) deploying the SPML model on the input mechanical SMID measurements to generate synthetic stator dimension data for the subject PDM; and
(f) deploying the MPML model on the synthetic stator dimension data generated in step (d) to predict PDM performance for the subject PDM.

21. A computer-implemented method for predicting performance characteristics of a positive displacement motor (PDM), comprising the steps of:
(a) providing a database of historical PDMs, the historical PDMs comprising respective stators and rotors, the database comprising (1) PDM metadata, (2) stator dimension data comprising radial laser profilometric (RLP) data based on sets of RLP scans taken at or near a plurality of spaced axial PDM measurement locations in the respective stators of the historical PDMs, and (3) PDM performance data;
(b) processing the RLP scans for feature alignment and statistical profilometric data extraction to obtain the RLP data for the stator dimension data;
(c) training a motor performance ML (MPML) model with a PDM training dataset comprising the PDM metadata and the PDM performance data in the database and the stator dimension data from step (b), to learn PDM performance characteristics;
(d) receiving input data for a subject PDM, the input data comprising input PDM metadata and input stator dimension data comprising input RLP scans taken at or near a plurality of spaced axial PDM measurement locations in the stator of the subject PDM;
(e) processing the input RLP scans for feature alignment and statistical profilometric data extraction; and
(f) deploying the MPML model on the processed input RLP scans from step (e) to predict PDM performance for the subject PDM.

22. The method of embodiment 21, wherein the stator dimension data in step (a) further comprises stator minor inside diameter (SMID) data based on sets of mechanical SMID measurement data taken at or near the plurality of spaced axial PDM measurement locations in the respective stators of the historical PDMs, wherein the SMID data comprises the mechanical SMID measurement data, statistical SMID data extracted from the mechanical SMID measurement data, or a combination thereof; wherein the method further comprises:
(g) training a stator profile machine learning (SPML) model with a stator training dataset comprising stator metadata from the PDM metadata in the database and the stator dimension data to learn stator profiles from the stator dimension data, wherein the PDM training dataset in step (c) comprises the learned stator profiles from the SPML model.

23. A computer-implemented method for predicting performance characteristics of a positive displacement motor (PDM), comprising the steps of:
(a) providing a database of historical PDMs, the historical PDMs comprising respective stators and rotors, the database comprising (1) PDM metadata comprising stator metadata, (2) stator dimension data based on sets of mechanical stator minor inside diameter (SMID) measurements and radial laser profilometric (RLP) scans taken at or near a plurality of spaced axial PDM measurement locations in the respective stators of the historical PDMs, and (3) PDM performance data;
(b) training a stator profile machine learning (SPML) model with a stator training dataset comprising the stator metadata and the stator dimension data in the database to learn stator profiles from the stator dimension data;
(c) training a motor performance ML (MPML) model with a PDM training dataset comprising the PDM metadata and the PDM performance data in the database, and the learned stator profiles from step (b), to learn PDM performance characteristics;
(d) receiving input data for a subject PDM, the input data comprising input PDM metadata and input stator dimension data selected from (1) input mechanical stator minor inside dimension (SMID) measurements taken at or near a plurality of spaced axial PDM measurement locations in the stator of the subject PDM, and (2) input radial laser profilometric (RLP) scans taken at or near the plurality of spaced axial PDM measurement locations in the stator of the subject PDM;

(e) where the input stator dimension data in step (d) comprise the input mechanical SMID measurements, deploying the SPML model on the input mechanical SMID measurements to generate synthetic stator dimension data for the subject PDM;

(f) where the input stator dimension data in step (d) comprise the input RLP scans, processing the input RLP scans for feature alignment and statistical profilometric data extraction; and (g) deploying the MPML model on the synthetic stator dimension data generated in step (e) or the processed input RLP scans from step (f) to predict PDM performance for the subject PDM.

24. A machine learning (ML) method for predicting one or more attributes of a positive displacement motor (PDM) comprising a stator and a rotor, wherein the stator comprises an inner surface having a number s of stator lobes helically configured and arranged in one or more stages defining stator peaks at a stator major inside diameter (ID), stator valleys at a stator minor ID (SMID), and stator flanks between the stator peaks and stator valleys, and wherein the rotor comprises an outer surface having a number r of rotor lobes helically arranged in one or more stages defining rotor peaks at a rotor major outside diameter, rotor valleys at a rotor minor outside diameter, and rotor flanks between the rotor peaks and rotor valleys, wherein s=r+1, comprising:

(a) taking sets of radial laser profilometric (RLP) scans of the respective stators of historical PDMs to obtain measurements of the peaks, valleys, and flanks in the respective stators at or near n axial measurement locations that are spaced apart, where n ranges from 2 to about 20 (preferably 4-10, more preferably 5-8, and especially 6);

(b) preprocessing the RLP scans from step (a) for feature alignment in each set to obtain preprocessed sets of the RLP scans for the respective stators comprising commonly aligned peaks, valleys, and flanks;

(c) populating a first training dataset with PDM metadata for the historical PDMs comprising stator metadata and stator dimension data comprising the preprocessed sets of the RLP scans for the respective stators of the historical PDMs;

(d) training a machine learning (ML) model with the first training dataset from step (c) to learn the one or more attributes of the PDMs.

25. The method of embodiment 24, further comprising:
(e) extracting RLP statistical data from the preprocessed sets of the RLP scans, wherein the extracted RLP statistical data from each of the preprocessed sets of RLP scans comprise (1) one or more of local maximum, minimum, mean and/or deviation magnitude values from the respective RLP scans separately, and (2) one or more of overall maximum, minimum, mean and/or deviation magnitude values from the respective set of the RLP scans collectively; and (f) populating the stator dimension data in step (c) with the extracted RLP statistical data from step (e).

26. The method of embodiment 25, further comprising:
(g) mechanically measuring the SMIDs of the respective stators at or near the n axial measurement locations;

(h) processing the mechanically measured SMIDs to obtain sets of mechanical SMID data for the respective stators;

(i) populating the stator dimension data in step (c) with the sets of the mechanical SMID data from step (h); and (j) training the ML model in step (d), wherein the ML model is a stator profile machine learning (SPML) model, wherein the first training dataset comprises the stator dimension data and the stator metadata, and the one or more learned attributes comprise stator profiles learned from the sets of the mechanical SMID data.

27. The method of any one of embodiments 24-26 wherein the learned stator profiles from step (j) comprise a learned set of profilometric statistical data comprising (1) one or more of local maximum, minimum, mean and/or deviation magnitude values for a plurality n of spaced axial learning locations separately, (2) one or more of overall maximum, minimum, mean and/or deviation magnitude values for the plurality of n axial learning locations collectively, and preferably (3) one or more wobble values for the n axial learning locations separately, one or more wander values for the n axial learning locations collectively, one or more mean absolute deviation wobble values for the n axial learning locations collectively, or a combination thereof.

28. The method of any one of embodiments 24-27 further comprising:
(k) receiving input data for a subject PDM, the input data comprising input stator data comprising input stator metadata and input mechanical SMID measurements taken at or near a plurality of spaced axial PDM measurement locations in the stator of the subject PDM; and (1) deploying the SPML model on the input mechanical SMID measurements to generate synthetic stator dimension data for the subject PDM.

29. The method of embodiment 26 or any one of embodiments 24-28 wherein the SPML model training in step (j) comprises:
(1) processing the first training dataset in an ML framework comprising a two-layer encoding architecture comprising an input layer receiving the first training dataset, and a proposal neural network layer;
(2) generating a latent space of proposal data vectors in the proposal neural network layer embedding the stator dimension data;
(3) generating estimated data from the proposal data vectors in a two-layer decoding architecture of the ML framework comprising the proposal neural network layer and an estimated neural network layer; and
(4) iterating steps (1) to (3) to minimize an estimated neural network layer loss function.

30. The method of embodiment 29 wherein the ML framework comprises a conditional variational autoencoder (VAE) learning framework comprising one or more VAE encoders in the two-layer encoding architecture and one or more VAE decoders in the two-layer decoding architecture.

31. The method of embodiment 29 or 30 wherein the SPML model training in step (j) further comprises:
(5) convoluting static variables from the stator metadata to create a supporting neural network, preferably comprising one or more VAE support layers;
(6) adjusting the proposal data vectors with the supporting neural network; and
(7) iterating steps (5) to (6) to minimize a reconstruction loss function and obtain an output SPML model.

32. The method of embodiment 31 wherein the static variables are convoluted in step (5) using a two-layer transformer learning framework, an LSTM learning framework, or a combination thereof.

33. The method of embodiment 27 or any one of embodiments 24-32 further comprising:
(m) populating a second training dataset with the PDM metadata and PDM performance data for the historical PDMs and the learned stator profiles from step (j); and
(n) training a motor performance ML (MPML) model with the second training dataset to learn PDM performance characteristics.

34. The method of embodiment 33 further comprising:
(o) receiving input data, the input data comprising input PDM metadata and input stator dimension data for a subject PDM; and
(p) deploying the MPML model on an input dataset based on the input data to predict PDM performance for the subject PDM.

35. The method of embodiment 34 wherein the input stator dimension data comprises an input set of input RLP scans taken at or near a plurality of spaced axial PDM measurement locations in the stator of the subject PDM, the method further comprising:
(q) preprocessing the input RLP scans for feature alignment to obtain a preprocessed set of the input RLP scans comprising commonly aligned peaks, valleys, and flanks;
wherein the input dataset in step (p) comprises the preprocessed set of the input RLP scans from step (q).

36. The method of embodiment 34 or 35 wherein the input stator dimension data comprise input mechanical SMID measurements taken at or near a plurality of spaced axial PDM measurement locations in the stator of the subject PDM, and wherein the method further comprises:
(r) deploying the SPML model trained in step (j) on the input mechanical SMID measurements to generate synthetic stator dimension data for the subject PDM;
wherein the input dataset in step (p) comprises the synthetic stator dimension data from step (r).

37. The method of embodiment 36 wherein the synthetic stator dimension data comprise synthetic SMID value(s), synthetic stator profilometric data, synthetic stator statistical profilometric data, a latent space vector embedding the synthetic stator profilometric data and/or the synthetic stator statistical profilometric data, or a combination thereof.

38. The method of embodiment 29 or any one of embodiments 24-37 further comprising: (s) populating a second training dataset with the PDM metadata and PDM performance data for the historical PDMs and the latent space of proposal data vectors in the proposal neural network layer embedding the stator dimension data from step (2); and
(t) training a motor performance ML (MPML) model with the second training dataset to learn PDM performance characteristics.

39. The method of embodiment 38 further comprising:
(u) receiving input data, the input data comprising input PDM metadata and input stator dimension data for a subject PDM; and
(v) deploying the MPML model on an input dataset based on the input data to predict PDM performance for the subject PDM.

40. The method of embodiment 39 wherein the input stator dimension data for the subject PDM in step (u) comprises one of:
(A) an input set of input RLP scans taken at or near a plurality of spaced axial PDM measurement locations in the stator of the subject PDM, wherein the input dataset in step (v) comprises (i) a preprocessed set of the input RLP scans comprising commonly aligned peaks, valleys, and flanks, and/or (ii) RLP statistical data extracted from the preprocessed set of the input RLP scans, preferably wherein the extracted RLP statistical data from the preprocessed set of the input RLP scans comprise: (1) one or more of local maximum, minimum, mean and/or deviation magnitude values extracted from the preprocessed input RLP scans separately, (2) one or more of overall maximum, minimum, mean and/or deviation magnitude values extracted from the preprocessed input RLP scans in the preprocessed set collectively; and/or (3) wobble and/or wander values extracted from the preprocessed set of the input RLP scans;
(B) input mechanical SMID measurements taken at or near a plurality of spaced axial PDM measurement locations in the stator of the subject PDM, wherein the input dataset in step (v) comprises synthetic stator dimension data for the subject PDM generated by deploying the SPML model on the input mechanical SMID measurements, preferably wherein the synthetic stator dimension data comprise synthetic stator statistical profilometric data for the subject PDM comprising (A) one or more of local maximum, minimum, mean and/or deviation magnitude values of peaks and valleys at each one of the plurality of the spaced axial PDM measurement locations for the subject PDM separately, (B) one or more of overall maximum, minimum, mean and/or deviation magnitude values of peaks and valleys for the plurality of the spaced PDM axial measurement locations for the subject PDM collectively, and optionally (C) one or more wobble values, one or more wander values, or a combination thereof.

41. The method of any preceding embodiment wherein the database of historical PDMs comprises PDM performance data, wherein the input data comprise subject PDM metadata, and wherein the method further comprises:
(I) training a motor performance ML (MPML) model with a PDM training dataset comprising the PDM metadata and the PDM performance data from the database, and the latent space of proposal data vectors embedding the stator dimension data from step (2), to learn PDM performance characteristics;
(II) deploying the MPML model on the input data and the synthetic stator dimension data generated in step (d) to predict PDM performance for the subject PDM.

42. A computer-implemented system for generating synthetic stator profile data for a positive displacement motor (PDM), the system including a processor operating in conjunction with computer memory, the system comprising:
(a) a database of historical PDMs comprising respective stators and rotors, the database comprising PDM metadata comprising stator metadata, and stator dimension data based on mechanical stator minor inside diameter (SMID) measurements and radial laser profilometric (RLP) scans taken at or near a plurality of spaced axial PDM measurement locations in the respective stators of the historical PDMs;

(b) a data receiver for receiving input data for a subject PDM, the input data comprising input stator data comprising input stator metadata and input mechanical SMID measurements taken at or near a plurality of subject spaced axial PDM measurement locations in the stator of the subject PDM;
(c) wherein the processor is configured for providing a machine learning (ML) framework for:
  (1) training a SPML model with a stator training dataset comprising the stator metadata and the stator dimension data in the database to learn stator profiles from the stator dimension data; and
  (2) deploying the SPML model on the input stator data to generate synthetic stator dimension data for the subject PDM.

43. A non-transitory computer-readable medium storing machine-interpretable instructions, which when executed cause a processor to perform a computer-implemented method of generating synthetic stator profile data for a positive displacement motor (PDM), comprising:
(a) training a first machine learning (ML) model with a stator training dataset from a database of historical PDMs comprising respective stators and rotors, the stator training dataset comprising stator metadata and stator dimension data based on mechanical stator minor inside diameter (SMID) measurements and radial laser profilometric (RLP) scans taken at or near a plurality of spaced axial PDM measurement locations in the respective stators of the historical PDMs, to learn stator profiles from the stator dimension data;
(b) receiving input data for a subject PDM, the input data comprising input stator data comprising input mechanical SMID measurements taken at or near a plurality of subject spaced axial PDM measurement locations in the stator of the subject PDM; and
(c) deploying the SPML model on the input mechanical SMID measurements to generate synthetic stator profile data.

44. The system of embodiment 42 wherein the processor is further configured for preprocessing the RIP scans for feature alignment and extracting profilometric statistical data from the preprocessed RIP scans, wherein the preprocessing comprises:
(1) applying a digital filter to smooth granular noise in the RIP scans;
(2) identifying extrema features in the RIP scans based on magnitudes of distance from an axis of the stator to datapoints in the respective extrema features;
(3) identifying extrema points in the RLP scans based on respective intersections of bidirectional moving averages; and
(4) indexing the RLP scans according to their respective set of the RLP scans to assign the respective identified extrema points in the RP scans to a common alignment angle, wherein the respective sets of the RP scans comprise aligned peaks, valleys, and flanks; and wherein the profilometric statistical data comprise (A) one or more of local maximum, minimum, mean and/or deviation magnitude values for each of the plurality of the spaced axial stator measurement locations separately, (B) one or more of overall maximum, minimum, mean and/or deviation magnitude values for the plurality of the spaced axial stator measurement locations collectively, and/or (C) one or more wobble values, one or more wander values, or a combination thereof.

45. The system of embodiment 42 or 44 wherein the ML framework is configured for:
(3) training a second ML model to learn PDM performance characteristics based on the stator profiles of the first ML model and a PDM training dataset comprising PDM operating data and PDM metadata from the database;
(4) deploying the second ML model to predict PDM performance data for the subject PDM based on the input data and the synthetic stator profile data generated in step (c) (2).

46. The system of any of embodiments 42, 44-45 wherein the ML framework comprises a conditional variational autoencoder (VAE) learning framework for training the first ML model and an ensemble tree learning framework for training the second ML model, wherein the ML framework is further configured for:
(1) processing the stator dimension data using one or more encoders of the VAE learning framework in a two-layer encoding architecture to generate a latent space of proposal data vectors embedding the stator dimensional data;
(2) generating estimated data from the proposal data using one or more decoders of the VAE learning framework in a two-layer decoding architecture;
(3) convoluting static stator metadata variables into a neural network layer to create one or more VAE support layers to adjust the proposal data;
(4) iterating steps (1) to (3) to minimize a loss function to obtain an output model to predict the stator profiles in step (b); and
(5) training of the second ML model based on the latent space generated in step (1).

47. A non-transitory computer-readable medium storing machine-interpretable instructions, which when executed cause a processor to perform a computer-implemented method of generating synthetic stator profile data for a positive displacement motor (PDM), comprising:
(a) training a first machine learning (ML) model with a stator training dataset from a database of historical PDMs comprising respective stators and rotors, the stator training dataset comprising stator metadata and stator dimension data based on mechanical stator minor inside diameter (SMID) measurements and stator radial imaging (RI) scans taken at or near a plurality of spaced axial measurement locations, to learn stator profiles from the stator dimension data;
(b) receiving input data for a subject PDM, the input data comprising input stator data comprising mechanical SMID measurements taken at or near the plurality of spaced axial measurement locations for the subject PDM; and
(c) deploying the first ML model on the input stator data to generate synthetic stator profile data.

48. The non-transitory computer readable medium of embodiment 47 wherein the method further comprises preprocessing the RLP scans and extracting profilometric statistical data from the preprocessed SI scans, wherein the preprocessing comprises:
(1) applying a digital filter to smooth granular noise in the radial imaging scans;
(2) identifying extrema features in the radial imaging scans based on magnitudes of distance from an axis of the stator to datapoints in the respective extrema features;

(3) identifying extrema points [max peak or min valley] in the radial imaging scans based on respective intersections of bidirectional moving averages; and (4) indexing the RLP scans according to their respective set of the RLP scans to assign the respective identified extrema points in the RLP scans to a common alignment angle, wherein the respective sets of the RLP scans comprise aligned peaks, valleys, and flanks; and wherein the profilometric statistical data comprise (A) one or more of local maximum, minimum, mean and/or deviation magnitude values for each of the plurality of the spaced axial stator measurement locations separately, (B) one or more of overall maximum, minimum, mean and/or deviation magnitude values for the plurality of the spaced axial stator measurement locations collectively, and/or (C) one or more wobble values, one or more wander values, or a combination thereof.

49. The non-transitory computer readable medium of embodiment 47 or 48 wherein the method further comprises:

(d) training a second ML model to learn PDM performance characteristics based on the stator profiles of the first ML model and a PDM training dataset comprising PDM operating data and PDM metadata from the database;

(e) deploying the second ML model to predict PDM performance data for the subject PDM based on the input data and the synthetic stator profile data generated in step (c).

50. The non-transitory computer readable medium of embodiments 47-49 wherein the method further comprises:

(1) processing the stator dimension data using one or more encoders of a conditional variational autoencoder (VAE) learning framework in a two-layer encoding architecture to generate a latent space of proposal data vectors embedding the stator dimensional data;

(2) generating estimated data from the proposal data using one or more decoders of the VAE learning framework in a two-layer decoding architecture;

(3) convoluting static stator metadata variables into a neural network layer to create one or more VAE support layers;

(4) generating a comparative attributes dataset of differences between the stator measurement data and the proposed dimensional model;

(5) providing the comparative attributes dataset to the one or more VAE encoders to adjust the proposal data; and (6) iterating steps (1) to (5) to minimize a loss function to obtain an output model to predict the stator profiles.

50. The non-transitory computer readable medium of embodiment 49 wherein the method further comprises:

(d) training a second ML model to learn PDM performance characteristics based on the stator dimensional data embedded in the latent space from step (1), and a PDM training dataset comprising PDM operating data and PDM metadata from the database;

(e) deploying the second ML model to predict PDM performance data for the subject PDM based on the input data and the synthetic stator profile data generated in step (c).

51. A computer-implemented method of predicting positive displacement motor (PDM) performance, comprising:

(a) providing a database (904) of historical PDMs comprising respective stators and rotors, the database comprising stator dimension data (912), PDM operating data (_), and PDM metadata comprising stator metadata, the stator dimension data comprising both data that are based on mechanical SMID measurements (916) and data that are that based on the stator RP scans 918 based on mechanical stator minor inside diameter (SMID) measurements and radial imaging (RI) scans taken at or near a plurality of spaced axial measurement locations;

(b) training a first machine learning (ML) model with a stator training dataset comprising the stator dimension data from the database to learn stator profiles in relation to SMID measurements;

(c) training a second ML model based on the stator profiles of the first ML model and a PDM training dataset comprising the PDM operating data and the PDM metadata from the database to learn PDM performance characteristics in relation to the stator profiles;

(d) receiving input data for a subject PDM, the input data comprising input stator data and PDM metadata; and (e) deploying the second ML model to predict PDM performance data for the subject PDM based on the input data.

52. The method of embodiment 51 further comprising preprocessing the RP scans in step (b) for feature alignment.

53. The method of embodiment 52 wherein the preprocessing comprises:

(1) applying a digital filter to smooth granular noise in the RP scans;

(2) identifying extrema features in the RP scans based on magnitudes of distance from an axis of the stator to datapoints in the respective extrema features;

(3) identifying extrema points in the RP scans based on respective intersections of bidirectional moving averages; and (4) indexing the RP scans according to their respective set of the RP scans to assign the respective identified extrema points in the RP scans to a common alignment angle, wherein the respective sets of the RP scans comprise aligned peaks, valleys, and flanks.

54. The embodiment of claim 53 wherein the stator dimension data comprises profilometric statistical data extracted from the RLP scans, the profilometric statistical data comprising (A) one or more of local maximum, minimum, mean and/or deviation magnitude values for each of the plurality of the spaced axial stator measurement locations separately, (B) one or more of overall maximum, minimum, mean and/or deviation magnitude values for the plurality of the spaced axial stator measurement locations collectively, and/or (C) one or more wobble values, one or more wander values, or a combination thereof.

55. The method of any of embodiments 51-54 wherein the input stator data in step (d) comprises a subject set of RP scans taken at or near the plurality of spaced axial measurement locations, the method further comprising preprocessing the subject set of RP scans for feature alignment and extracting profilometric statistical data from the RP scans in the subject set.

56. The method of embodiment 55 wherein the preprocessing comprises:

(1) applying a digital filter to smooth granular noise of the RP scans in the subject set;

(2) identifying extrema features of the RP scans in the subject set based on magnitudes of distance from an axis of the stator to datapoints in the respective extrema features;
(3) identifying extrema points of the RP scans in the subject set based on respective intersections of bidirectional moving averages; and
(4) indexing the RP scans in the subject set to assign the respective identified extrema points to a common alignment angle, wherein the respective sets of the RP scans comprise aligned peaks, valleys, and flanks; and wherein the profilometric statistical data extracted from the subject set of the RP scans comprises:
(A) one or more of local maximum, minimum, mean and/or deviation magnitude values for each of the plurality of the spaced axial stator measurement locations separately;
(B) one or more of overall maximum, minimum, mean and/or deviation magnitude values for the plurality of the spaced axial stator measurement locations collectively; and/or
(C) one or more wobble values, one or more wander values, or a combination thereof.
57. The method of any of embodiments 51-56 wherein the input stator data in step (d) comprise a set of mechanical SMID measurements taken at or near the plurality of spaced axial stator measurement locations for the subject PDM, the method further comprising deploying the first ML model on the input stator data to generate synthetic stator profile data, wherein the synthetic stator profile data are used in the second ML model in step (e) to predict the PDM performance data for the subject PDM.
58. The method of embodiment 57 wherein the synthetic stator data comprise synthetic profilometric statistical data comprising (A) one or more of local maximum, minimum, mean and/or deviation magnitude values for each of the plurality of the spaced axial stator measurement locations separately, (B) one or more of overall maximum, minimum, mean and/or deviation magnitude values for the plurality of the spaced axial stator measurement locations collectively, and/or (C) one or more wobble values, one or more wander values, or a combination thereof.
59. The method of any of embodiments 51-58 wherein the first ML model is trained in a variational autoencoder (VAE) learning framework, wherein training the first ML model comprises:
(1) processing the stator dimension data using one or more encoders of the VAE learning framework in a two-layer encoding architecture to generate a latent space of proposal data vectors embedding the stator profile data;
(2) generating estimated data from the proposal data using one or more decoders of the VAE learning framework in a two-layer decoding architecture.
60. The method of embodiment 59 wherein training the first ML model further comprises:
(3) convoluting static stator metadata variables into a neural network layer to create one or more VAE support layers;
(4) generating a comparative attributes dataset of differences between the stator measurement data and the proposed dimensional model;
(5) providing the comparative attributes dataset to the one or more VAE encoders to adjust the proposal data; and
(6) iterating steps (1) to (5) to minimize a loss function to obtain an output model to predict the stator profiles in step (b).
61. The method of any of embodiments 59-60 wherein the second ML model is trained in an ensemble tree learning framework using the latent space generated in step (1) comprising the proposal data vectors embedding the stator dimensional data.
62. The method of any of embodiments 51-61 further comprising building a training database for historical PDMs, wherein building the training database comprises:
taking the mechanical SMID measurements and the RP scans for the historical PDMs at or near the plurality of spaced axial measurement locations;
taking rotor outside diameter (OD) measurements for the historical PDMs at or near the plurality of spaced axial measurement locations;
operating the historical PDMs to obtain the PDM operating data;
obtaining the PDM metadata for the historical PDMs; and
populating the database with the mechanical SMID measurements, the RP scans, the rotor OD measurements, the PDM operating data, and the PDM metadata for the historical PDMs.

EXAMPLES

Example 1—Historical Dataset. The historical PDM data were acquired by measuring the stators and rotors of thousands of mud motors ranging in size mostly from 4.75 in. to 9.625 in., from six different mud motor manufacturers and even more stator manufacturers, and input to a computerized database. The stators were measured with both vector gauges and commercially available laser gauges. The rotors were measured with calipers.

Vector gauge/caliper data: The power sections were disassembled for separate measurement of the stators and rotors, the rotors and stators were measured at or near the same locations, i.e., near the ends and about 3 ft and 6 ft from each end, and the data recorded along with temperature at time of measurement. The mean rotor major OD, taken as an average of the six individual rotor OD measurements with calipers, and the difference between the maximum (largest) and minimum (smallest) rotor OD measurements, were recorded. The mean stator minor ID, taken as an average of the individual stator ID measurements with a vector gauge at each axial measurement location, and the difference between the maximum (largest) and minimum (smallest) stator ID measurements, were also recorded for each stator.

Laser stator data: Laser gauges were calibrated according to manufacturer's recommendations and had accuracy of ±0.002 in. Profilometric statistical data were extracted from the laser scans as described herein, including local and collective maximum, minimum, mean, deviation, wobble, and wander magnitude values for the peaks, valleys, and/or flanks.

PDM classification characteristics: In addition, the motor, stator and rotor manufacturers and models, number of stator/rotor lobes, stages, motor size, rubber type, and OEM operating parameters and specifications were recorded for use in the motor prediction models.

Motor performance evaluation data: The motors were reassembled and then evaluated on a dynamometer with water as the hydraulic fluid. The evaluation data included no load and full load RPM, no load and full load RPG, no load and full load differential pressure, no load and full load torque, and peak power.

Figure 6B:
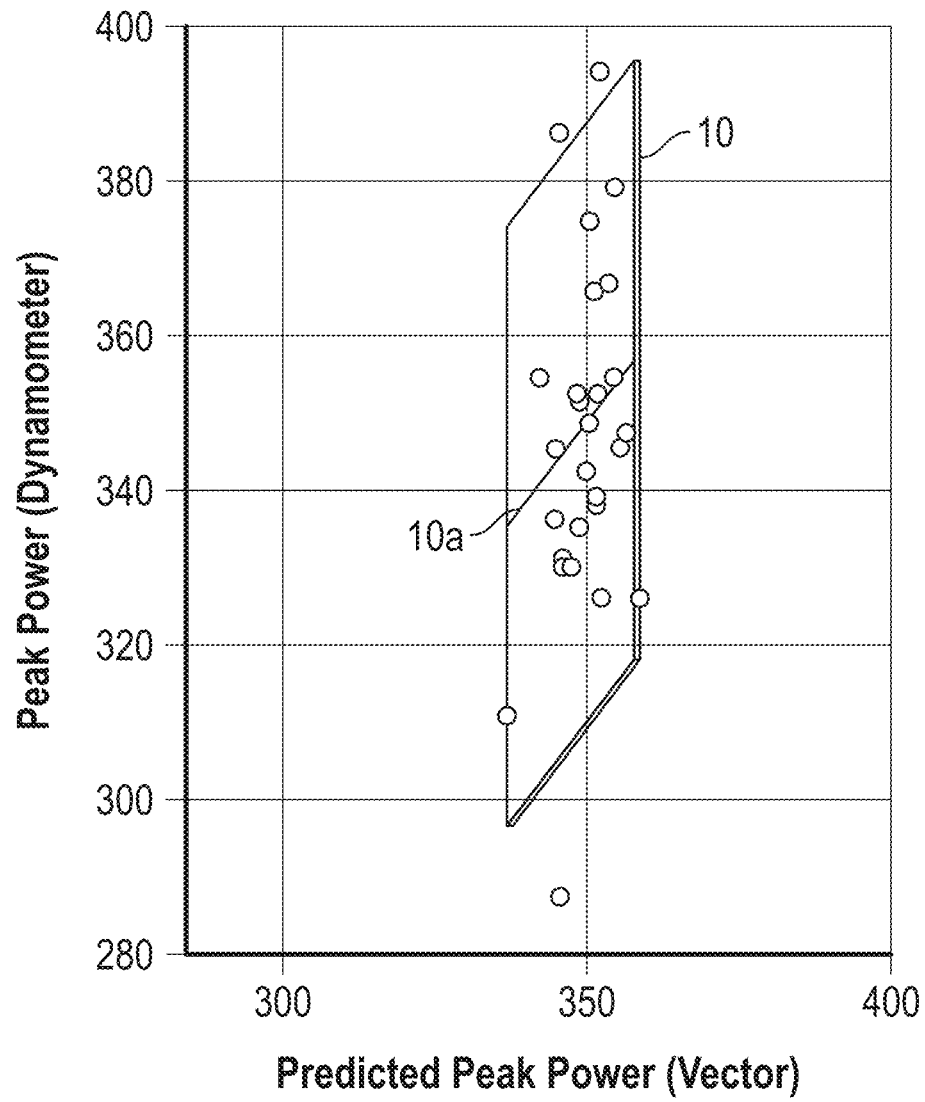
FIG. 6B is a scatterplot of measured and predicted peak power for a series of PDMs with a 6-lobe rotor and a 7-lobe stator using vector gauge measurements of the stator in a PDM performance model according to the prior art.
Figure 7:
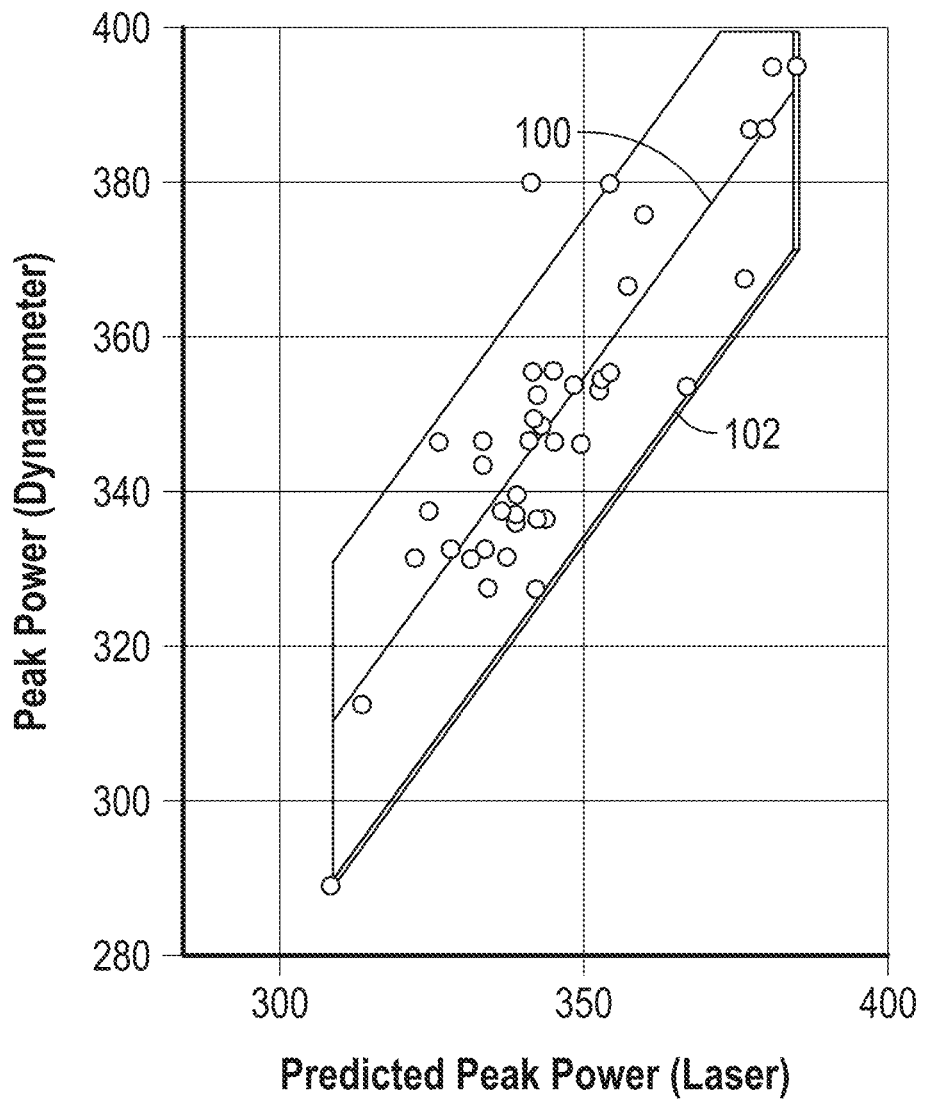
FIG. 7 is a scatterplot of measured and predicted peak power for a series of PDMs with a 6-lobe rotor and a 7-lobe stator using laser scan data for the stators in a PDM performance model according to embodiments of the disclosure herein.

Example 2—Training Model for PDM Performance Evaluation. The stator laser data, the rotor OD data, the PDM classification data, and the motor performance data from Example 1 were used to train a supervised ML module to predict motor performance with the procedure of FIG. 11. A scatterplot of predicted peak power versus measured peak power for a series of PDMs is shown in FIG. 7. It is seen that when the feature vector data with the stator laser statistical data as in Example 1 was input to the PDM performance model, appropriately adapted for the larger number of laser data feature vector attributes, the result was a much tighter range of performance data in a broader extent of peak power ranges for similar PDMs, as seen in FIG. 7, with error box 102 spanning across the equal plot line 100 of predicted versus dynamometer-measured peak power output. The error rate was much smaller than the vector data of FIG. 6 and the predicted peak power output was useful quantitatively for operation of the PDMs in actual use conditions.

Similarly, a large data set of PDMs, where the peak power output was measured on a dynamometer and separately predicted by ML using RLP data according to the present disclosure and vector measurements as in the prior art, was used to determine the residuals between the predicted peak power and the dynamometer measurements. The peak power residuals 3000 are plotted in FIG. 30. The relative incidence of error rates obtained using the laser data according to embodiments herein are shown as the solid line 3002 over the unshaded area plots, and the relative incidence of error rates obtained using vector data according to the prior art are shown as the line 3004 over the hatched area plots. The x axis is the scale of errors. The population of vector gauge prediction errors 3004 was very spread out with wide ranging error and a large negative mode, while the RLP error population 3002 was very narrow with a mean of about 0 and a comparatively small error rate.

Figure 31:
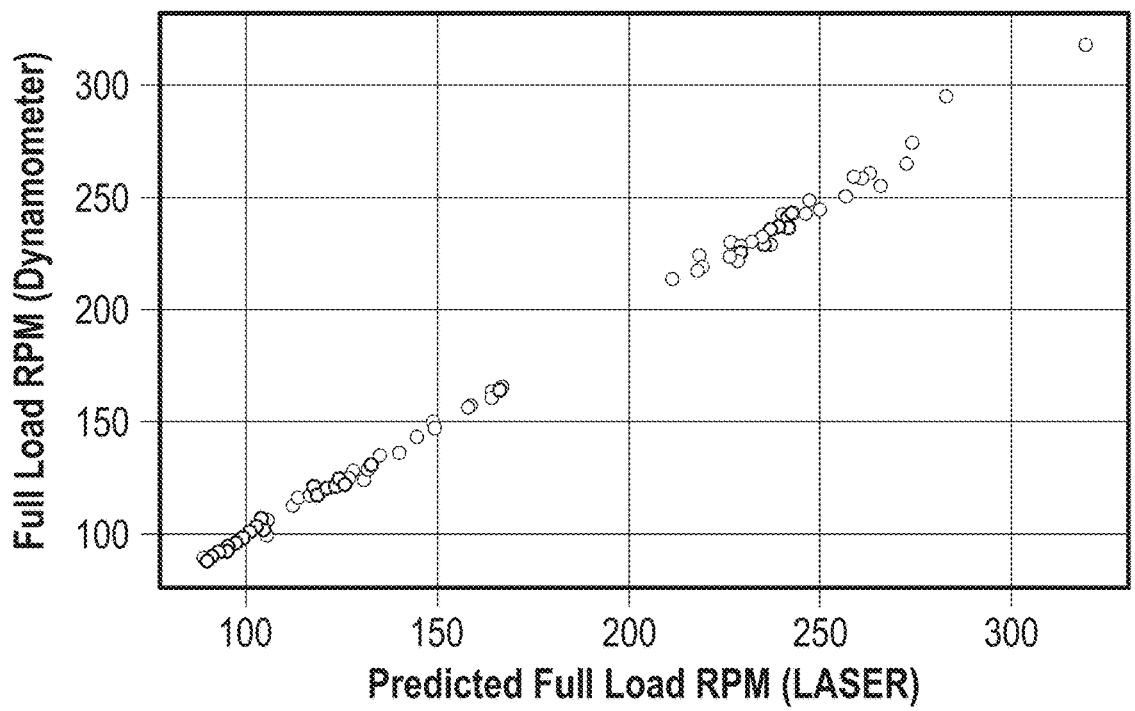
FIG. 31 is a scatterplot of full load RPM predicted with a PDM performance model using laser data according to embodiments of the disclosure herein versus measured RPM with a dynamometer for a series of PDMs.
Figure 32:
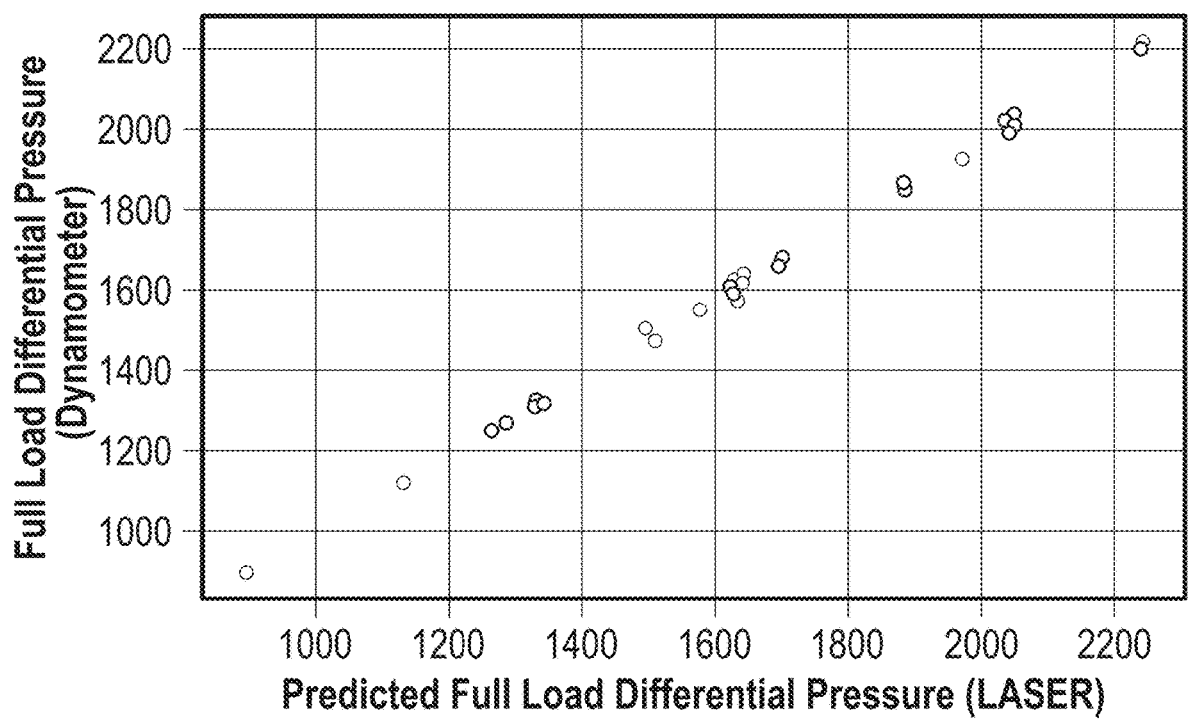
FIG. 32 is a scatterplot of full load differential pressure predicted with a PDM performance model using laser data according to embodiments of the disclosure herein versus measured full load differential pressure with a dynamometer for a series of PDMs.
Figure 33:
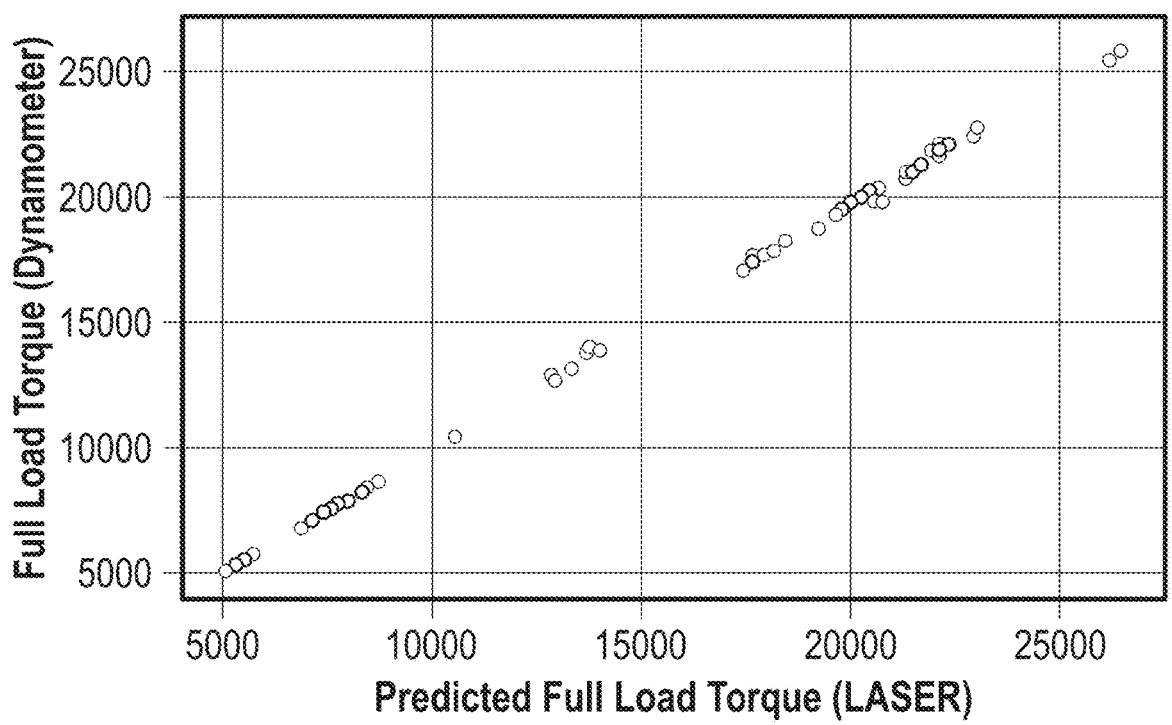
FIG. 33 is a scatterplot of full load torque predicted with a PDM performance model using laser data according to embodiments of the disclosure herein versus measured full load torque on a dynamometer for a series of PDMs.

Scatterplots of predicted full load RPM versus measured RPM, predicted full load differential pressure versus measured differential pressure, and predicted full load torque versus measure full load torque, with the values predicted by using the RLP scan data to train the motor performance ML module according to the present invention, and measured on a dynamometer, are shown in FIGS. 31-33. These showed excellent correlation between the predicted parameters and the measured parameters over a very broad range of parameters.

Example 3—Training Model for Simulated Laser Dimensions. The historic database of PDM data, including both the vector gauge and stator RLP scan data was used to investigate the predictive ability of the stator dimension ML model described herein, when deployed solely on mechanical stator minor ID (SMID) measurements with vector gauge 20, to obtain synthetic laser SMID data with the precision of laser-quality measurement data is if measured by laser gauge 25. The supervised stator dimension ML algorithms incorporated METALEARNERS in a configuration resembling a generalized linear model integrated with elastic net regularization. Open-source AUTOGLUON was utilized in the orchestration of stacking ensembles on AWS such as support vectors, learning trees, and an assortment of models including deep learning architectures, gradient boosted trees, distributed random forests, generalized additive models, and stack ensembles, primarily utilizing the open-source H2O platform. This facilitated the intricate feature engineering and alignment as disclosed herein and a complementary supervisory mechanism facilitated the determination of optimal hyperparameters. The ML components were refined initially on a validation subset and subsequently through cross-validation to ensure peak model performance.

Figure 34:
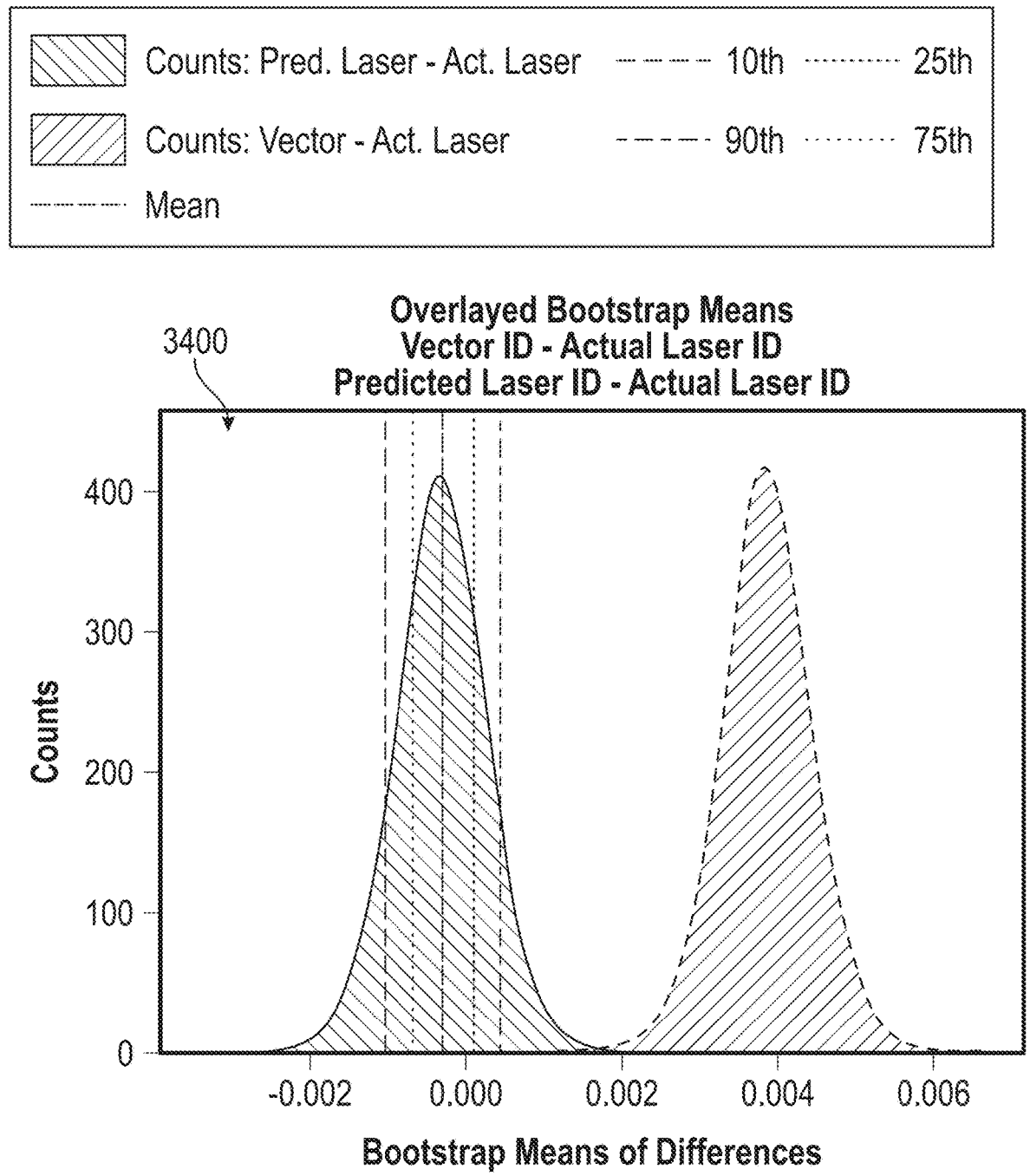
FIG. 34 is a diagram of overlaid synthetic laser and vector gauge SMID error distributions by bootstrap sampling of the residuals for SMID predicted using synthetic laser modeling according to the present disclosure, and SMID obtained from vector gauge measurements according to the prior art, compared to actual laser gauge SMID measurements.

The stator dimension model was trained with a dataset from Example 1 comprising the stator RLP scan data measured by laser gauge 25, the stator mechanical data measured by vector gauge 20, and OEM stator classification data including rubber type and number of lobes and stages, for thousands of stators, according to the disclosure herein. Since the vector gauge measurement only provides SMID data, the target vector included the RLP statistical data described herein including the mean stator minor ID (SMID) corresponding to the mean of the minimum magnitude valley datapoints in each valley/lobe for all scan locations, for comparison with the mechanical and laser SMID measurements. The errors were calculated as the differences between either the mechanically measured vector gauge mean SMID or the synthetic laser mean SMID obtained from the model, less the actual laser-measured mean SMID from the RLP scans. Bootstrap sampling results 3300 plotted as an overlay in FIG. 34 showed the synthetic laser residuals 3402 had a mean about 0.0004 in. (10 μm) while the mechanical vector gauge residuals 3404 had a mean was a full order of magnitude greater at 0.004 in. (100 μm).

The foregoing illustrates that vector gauge measurement of the ID of a stator can now be used in dimension modeling with AI to obtain a more accurate synthetic laser measurement for the mean minor ID, as well as other synthetic laser dimension data not captured by mechanical minor ID measurement with a vector gauge.

Example 4—Data Validation of Laser Measurements. The data from Example 3 were also validated by obtaining the synthetic laser data from caliper measurements and comparing it to the actual laser measurement of a stator. A comparison of typical values for three stators is seen in the following table:

| Measurement feature | Stator 1 Error (Synlaser-Laser, in.) | Stator 2 Error (Synlaser-Laser, in.) | Stator 3 Error (Synlaser-Laser, in.) |
|---|---|---|---|
| Max_peak_n | 0.002 | 0.002 | 0.003 |
| Mad_peak_n | 0.00001 | 0.0002 | 0.00065 |
| Min_valley_n | 0.0002 | 0.003 | 0.00006 |
| Mad_valley_n | 0.000006 | 0.0004 | 0.0004 |
| Mean_peak | 0.002 | 0.002 | 0.003 |
| Mean_valley | 0.002 | 0.0001 | 0.002 |
| Mad_flank_n | 0.00006 | 0.000035 | 0.0004 |
| Mad_flank_mean | 0.00008 | 0.0009 | 0.00007 |
| Laser Stator SMID (n) | 0.004 | 0.003 | 0.006 |
| Laser Stator SMID mean | 0.004 | 0.0003 | 0.0007 |

Although only a few example embodiments have been described in detail above, those skilled in the art will readily appreciate that many modifications are possible in the example embodiments without materially departing from this invention. Accordingly, all such modifications are intended to be included within the scope of this invention as defined in the following claims. It is the express intention of the applicant not to invoke 35 U.S.C. § 112 (f) for any limitations of any of the claims herein, except for those in which the claim expressly uses the words 'means for' together with an associated function and without any recitation of structure. The priority document is incorporated herein by reference.

What is claimed is:

1. A computer-implemented method for generating synthetic stator profilometric data for a positive displacement motor (PDM), comprising the steps of:
   (a) providing a database of historical PDMs, wherein the historical PDMs comprise respective stators and rotors, the database comprising PDM metadata comprising stator metadata, and stator dimension data based on sets of mechanical stator minor inside diameter (SMID) measurements and radial laser profilometric (RLP) scans taken at or near a plurality of spaced axial PDM measurement locations in the respective stators of the historical PDMs;
   (b) training a stator profile machine learning (SPML) model with a stator training dataset comprising the stator metadata and the stator dimension data in the database to learn stator profiles from the stator dimension data;
   (c) receiving input data for a subject PDM, wherein the input data comprise input stator data, wherein the input stator data comprise input stator metadata and input mechanical SMID measurements taken at or near a plurality of spaced axial PDM measurement locations in the stator of the subject PDM in real time; and
   (d) deploying the SPML model on the input mechanical SMID measurements to generate synthetic stator dimension data for the subject PDM in real time,
   wherein the synthetic stator dimension data comprise:
   (i) synthetic SMID values for the subject PDM selected from a vector of synthetic SMID values corresponding to the plurality of spaced axial PDM measurement locations, a mean synthetic SMID value, and a combination thereof; or
   (ii) synthetic stator profilometric data, wherein the synthetic stator statistical profilometric data for the subject PDM comprise (A) one or more of local maximum, minimum, mean and/or deviation magnitude values of peaks and valleys at each one of the plurality of the spaced axial measurement locations separately, (B) one or more of overall maximum, minimum, mean and/or deviation magnitude values of peaks and valleys for the plurality of the spaced axial measurement locations collectively, and optionally (C) one or more wobble values, one or more wander values, or a combination thereof.

2. The method of claim 1 further comprising building the database of historical PDMs comprising the stator training dataset, wherein building the database comprises:
   taking the mechanical SMID measurements and the RLP scans of the stators of the historical PDMs at or near the plurality of spaced axial PDM measurement locations;
   processing the mechanical SMID measurements and the RLP scans to obtain the stator dimension data;
   obtaining the stator metadata for the historical PDMs; and
   populating the database with the stator dimension data and the stator metadata.

3. The method of claim 1 further comprising:
   (e) preprocessing the RLP scans from step (a) for feature alignment in each set to obtain preprocessed sets of the RLP scans for the respective stators comprising commonly aligned peaks, valleys, and flanks.

4. The method of claim 3 wherein the preprocessing comprises, for the sets of RLP scans from the respective stators of the historical PDMs:
   (1) applying a digital filter to smooth granular noise in the RLP scans of each set;
   (2) identifying extrema features in each RLP scan in the respective set based on magnitudes of distance from an axis of the stator to datapoints in the respective extrema features;
   (3) identifying extrema points in each RLP scan of the respective set based on respective intersections of bidirectional moving averages; and
   (4) indexing the RLP scans in each respective set to assign the respective identified extrema points to a common alignment angle to obtain the preprocessed sets of the RLP scans.

5. The method of claim 3 further comprising:
   (f) extracting RLP statistical data from the preprocessed sets of the RLP scans; and
   (g) populating the stator dimension data in the stator training dataset with the extracted RLP statistical data;
   wherein the extracted profilometric statistical data from each of the preprocessed sets of RLP scans comprise (i) one or more of local maximum, minimum, mean and/or deviation magnitude values from each of the respective RLP scans separately, and (ii) one or more of overall maximum, minimum, mean and/or deviation magnitude values from the respective set of the RLP scans collectively.

6. The method of claim 5, wherein the extracted RLP statistical data further comprise (iii) one or more wobble values from the respective RLP scans, one or more wander values from the respective set of the RLP scans, one or more mean absolute deviation wobble values from the respective set of the RLP scans collectively, or a combination thereof.

7. The method of claim 5 wherein the extraction of the stator profilometric statistical data in step (f) comprises:
   (f-1) for each RLP scan in the respective set, classifying datapoints into peak, valley, and flank region datapoints;
   (f-2) extracting from each RLP scan in the respective set a scan vector comprising (1) the maximum peak magnitude in the respective scan, (2) the minimum valley magnitude in the respective scan, and (3) one or more mean absolute deviation values in the respective scan (A) for the peak region datapoints with respect to the maximum peak magnitude, (B) for the valley region datapoints with respect to the minimum valley magnitude, and/or (C) for the flank region datapoints with respect to an average flank magnitude of the flank region datapoints, to obtain a scan vector set comprising scan vectors corresponding to each of the spaced axial PDM measurement locations; and
   (f-3) extracting from each respective set of RLP scans collective values comprising (1) an overall maximum peak magnitude, a collective mean peak magnitude value of the peak region datapoints, and a collective mean absolute peak deviation value with respect to the collective mean peak magnitude value of the peak region datapoints, for all of the peak region datapoints in the RLP scans in the set, (2) an overall minimum valley magnitude, a collective mean valley magnitude value of the valley region datapoints, and a collective mean absolute valley deviation value with respect to the collective mean valley magnitude value of the valley region datapoints, for all of the valley region datapoints in the RLP scans in the set, and (3) a collective mean flank magnitude value of the flank region datapoints, for all of the flank region datapoints in the RLP scans in the set.

8. The method of claim 7 wherein the stator profilometric statistical data extracted in step (f) further comprises, for each respective set of the RLP scans:
  scan wobble values of the peak and valley region datapoints for the respective RLP scans of the set;
  wander values for the peak and valley region datapoints in the RLP scans in the set; and
  mean absolute deviation wobble values for the peak regions, the valley regions, and all regions overall in the RLP scans for each respective set.

9. The method of claim 5 wherein the SPML model training in step (b) comprises:
  (1) processing the stator training dataset from step (g) in an ML framework comprising a two-layer encoding architecture comprising an input layer receiving the stator training dataset, and a proposal neural network layer;
  (2) generating a latent space of proposal data vectors in the proposal neural network layer embedding the stator dimension data;
  (3) generating estimated data from the proposal data vectors in a two-layer decoding architecture of the ML framework comprising the proposal neural network layer and an estimated neural network layer; and
  (4) iterating steps (1) to (3) to minimize an estimated neural network layer loss function.

10. The method of claim 9 wherein the ML framework comprises a conditional variational autoencoder (VAE) learning framework comprising one or more VAE encoders in the two-layer encoding architecture and one or more VAE decoders in the two-layer decoding architecture.

11. The method of claim 9 wherein the SPML model training in step (b) further comprises:
  (5) convoluting static variables from the stator metadata to create a supporting neural network, wherein the supporting neural network comprises one or more VAE support layers;
  (6) adjusting the proposal data vectors with the supporting neural network; and
  (7) iterating steps (5) to (6) to minimize a reconstruction loss function and obtain an output model for the deployment as the SPML model in step (d).

12. The method of claim 11 wherein the static variables are convoluted in step (5) using a two-layer transformer learning framework, an LSTM learning framework, or a combination thereof.

13. The method of claim 9 wherein the database of historical PDMs comprises PDM performance data, wherein the input data comprise subject PDM metadata, and wherein the method further comprises:
  (I) training a motor performance ML (MPML) model with a PDM training dataset comprising the PDM metadata and the PDM performance data from the database, and the latent space of proposal data vectors embedding the stator dimension data from step (2), to learn PDM performance characteristics;
  (II) deploying the MPML model on the input data and the synthetic stator dimension data generated in step (d) to predict PDM performance for the subject PDM.

14. The method of claim 1 wherein the synthetic stator dimension data comprise the synthetic SMID value(s).

15. The method of claim 1 wherein the synthetic stator dimension data comprise the synthetic stator profilometric data.

16. The method of claim 15 further comprising embedding the synthetic stator profilometric data in a corresponding synthetic stator data vector in a latent space of stator data vectors embedding the learned stator profiles from step (b).

17. The method of claim 1 wherein the database of historical PDMs comprises PDM performance data, wherein the input data comprise subject PDM metadata, and wherein the method further comprises:
  (I) training a motor performance ML (MPML) model with a PDM training dataset comprising the PDM metadata and the PDM performance data from the database, and the learned stator profiles from step (b), to learn PDM performance characteristics; and
  (II) deploying the MPML model on the subject PDM metadata and the synthetic stator dimension data generated in step (d) to predict PDM performance for the subject PDM.

18. The method of claim 17 wherein the synthetic stator dimension data comprise synthetic SMID value(s), synthetic stator profilometric data, synthetic stator statistical profilometric data, a latent space vector embedding the synthetic stator profilometric data and/or the synthetic stator statistical profilometric data, or a combination thereof.

19. The method of claim 17 wherein the database of historical PDMs comprises rotor dimension data, and wherein the input data comprise input rotor dimension data.

20. A computer-implemented method for predicting performance characteristics of a positive displacement motor (PDM), comprising the steps of:
  (a) providing a database of historical PDMs, wherein the historical PDMs comprise respective stators and rotors, and wherein the database comprises (1) PDM metadata, (2) stator dimension data comprising radial laser profilometric (RLP) data based on sets of RLP scans taken at or near a plurality of spaced axial PDM measurement locations in the respective stators of the historical PDMs, and (3) PDM performance data;
  (b) processing the RLP scans for feature alignment and statistical profilometric data extraction to obtain the RLP data for the stator dimension data;
  (c) training a stator profile machine learning (SPML) model with a stator training dataset to learn stator profiles, wherein the stator training dataset comprises stator metadata from the database and the RLP data from step (b);
  (d) training a motor performance ML (MPML) model with a PDM training dataset, wherein the PDM training dataset comprises the PDM metadata and the PDM performance data in the database and the stator profiles learned from the SPML model in step (c), to learn PDM performance characteristics;
  (e) receiving input data for a subject PDM, the input data comprising input PDM metadata and input stator dimension data, wherein the input stator dimension data comprises input RLP scans taken at or near a plurality of spaced axial PDM measurement locations in the stator of the subject PDM in real time;
  (f) processing the input RLP scans for feature alignment and statistical profilometric data extraction in real time; and
  (g) deploying the MPML model on the processed input RLP scans from step (f) to predict PDM performance for the subject PDM in real time.

21. The method of claim 20, wherein the stator dimension data in step (a) further comprises stator minor inside diameter (SMID) data based on sets of mechanical SMID measurement data taken at or near the plurality of spaced axial PDM measurement locations in the respective stators of the historical PDMs, wherein the SMID data comprises the mechanical SMID measurement data, statistical SMID data extracted from the mechanical SMID measurement data, or a combination thereof;

wherein the stator training dataset in step (c) comprises the SMID data.

22. The method of claim 21 wherein the SPML model training in step (c) comprises:
(1) processing the stator training dataset in an ML framework comprising a two-layer encoding architecture comprising an input layer receiving the first training dataset, and a proposal neural network layer;
(2) generating a latent space of proposal data vectors in the proposal neural network layer embedding the stator dimension data;
(3) generating estimated data from the proposal data vectors in a two-layer decoding architecture of the ML framework the proposal neural network layer and an estimated neural network layer; and
(4) iterating steps (1) to (3) to minimize an estimated neural network layer loss function.

23. The method of claim 22 wherein the ML framework comprises a conditional variational autoencoder (VAE) learning framework comprising one or more VAE encoders in the two-layer encoding architecture and one or more VAE decoders in the two-layer decoding architecture.

24. A computer-implemented method for predicting performance characteristics of a positive displacement motor (PDM), comprising the steps of:
(a) providing a database of historical PDMs, wherein the historical PDMs comprise respective stators and rotors, wherein the database comprises (1) PDM metadata comprising stator metadata, (2) stator dimension data based on sets of mechanical stator minor inside diameter (SMID) measurements and radial laser profilometric (RLP) scans taken at or near a plurality of spaced axial PDM measurement locations in the respective stators of the historical PDMs, wherein the RLP scans are processed for feature alignment and statistical profilometric data extraction, and (3) PDM performance data;
(b) training a stator profile machine learning (SPML) model with a stator training dataset, wherein the stator training dataset comprises the stator metadata and the stator dimension data in the database to learn stator profiles from the stator dimension data;
(c) training a motor performance ML (MPML) model with a PDM training dataset, wherein the PDM training dataset comprises the PDM metadata and the PDM performance data in the database, and the learned stator profiles from step (b), to learn PDM performance characteristics;
(d) receiving input data for a subject PDM, wherein the input data comprise input PDM metadata and input stator dimension data selected from (1) input mechanical stator minor inside dimension (SMID) measurements taken at or near a plurality of spaced axial PDM measurement locations in the stator of the subject PDM, and (2) input radial laser profilometric (RLP) scans taken at or near the plurality of spaced axial PDM measurement locations in the stator of the subject PDM;
(e) when the input mechanical SMID measurements are received as the input data in step (d) deploying the SPML model on the input mechanical SMID measurements to generate synthetic stator dimension data for the subject PDM in real time;
(f) when the input RLP scans are received as the input data in step (d), processing the input RLP scans for feature alignment and statistical profilometric data extraction in real time; and
(g) deploying the MPML model on the input PDM metadata and the synthetic stator dimension data generated in step (e) or the processed input RLP scans from step (f) to predict PDM performance for the subject PDM in real time.

25. The method of claim 24 wherein the synthetic stator dimension data generated in step (e) comprise synthetic stator statistical profilometric data for the subject PDM comprising (A) one or more of local maximum, minimum, mean and/or deviation magnitude values of peaks and valleys at each one of the plurality of the spaced axial measurement locations separately, (B) one or more of overall maximum, minimum, mean and/or deviation magnitude values of peaks and valleys for the plurality of the spaced axial measurement locations collectively, and optionally (C) one or more wobble values, one or more wander values, or a combination thereof.

26. A machine learning (ML) method for predicting one or more attributes of a positive displacement motor (PDM) comprising a stator and a rotor, wherein the stator comprises an inner surface having a number s of stator lobes helically configured and arranged in one or more stages defining stator peaks at a stator major inside diameter (ID), stator valleys at a stator minor ID (SMID), and stator flanks between the stator peaks and stator valleys, and wherein the rotor comprises an outer surface having a number r of rotor lobes helically arranged in one or more stages defining rotor peaks at a rotor major outside diameter, rotor valleys at a rotor minor outside diameter, and rotor flanks between the rotor peaks and rotor valleys, wherein s=r+1, wherein the one or more attributes comprise PDM performance characteristics, the steps of:
(a) taking sets of radial laser profilometric (RLP) scans of the respective stators of historical PDMs to obtain measurements of the peaks, valleys, and flanks in the respective stators at or near n axial measurement locations that are spaced apart, where n ranges from 2 to 20;
(b) preprocessing the RLP scans from step (a) for feature alignment in each set to obtain preprocessed sets of the RLP scans for the respective stators comprising commonly aligned peaks, valleys, and flanks;
(c) processing the RLP scans from step (b) for statistical profilometric data extraction;
(d) populating a PDM performance training dataset with PDM performance data and PDM metadata for the historical PDMs, and the processed RLP scans for the respective stators of the historical PDMs from step (c), wherein the PDM metadata comprise stator metadata;
(e) training a motor performance machine learning (MPML) model with the motor performance training dataset from step (d) to learn PDM performance characteristics;
(f) receiving input data for a subject PDM, wherein the input data comprise input PDM metadata and input stator dimension data, wherein the input stator dimension data comprise a set of input RLP scans taken at or near the n axial measurement locations in the stator of the subject PDM;
(g) preprocessing and processing of the input RLP scans for feature alignment and statistical profilometric data extraction in real time; and (h) deploying the MPML model on the input PDM metadata and the processed input RLP scans from step (g) to predict PDM performance for the subject PDM in real time;

wherein the preprocessing in steps (b) and (g) comprises:
(1) applying a digital filter to smooth granular noise in the RLP scans of each set;
(2) identifying extrema features in each RLP scan in the respective set based on magnitudes of distance from an axis of the stator to datapoints in the respective extrema features;
(3) identifying extrema points in each RLP scan of the respective set based on respective intersections of bidirectional moving averages; and
(4) indexing the RLP scans in each respective set to assign the respective identified extrema points to a common alignment angle to obtain the preprocessed sets of the RLP scans; and wherein the extracted statistical profilometric data in steps (c) and (g) comprise (1) local maximum, minimum, mean and/or deviation magnitude values for the peaks, valleys and/or flanks from the respective RLP scans separately, and (2) overall maximum, minimum, mean and/or deviation magnitude values for the peaks, valleys and/or flanks from the respective set of the RLP scans collectively.

27. The method of claim 26, further comprising:
(i) mechanically measuring the SMIDs of the respective stators at or near the n axial measurement locations;
(j) processing the mechanically measured SMIDs to obtain sets of mechanical SMID data for the respective stators;
(k) populating the stator dimension data in step (d) with the sets of the mechanical SMID data from step (j); and
(l) training a stator profile machine learning (SPML) model with a stator profile training dataset to learn stator profiles, wherein the stator profile training set comprises the stator dimension data and the stator metadata, wherein the stator dimension data comprise the sets of mechanical SMID data and the processed RLP scans from step (c);

wherein the motor performance training dataset used to train the MPML model in step (e) comprises the stator profiles learned from the SPML model of step (l).

28. The method of claim 27 wherein the learned stator profiles from the SPML model of step (l) comprise a learned set of profilometric statistical data comprising (1) one or more of local maximum, minimum, mean and/or deviation magnitude values for the peaks, valleys and/or flanks for a plurality n of spaced axial learning locations separately, and (2) one or more of overall maximum, minimum, mean and/or deviation magnitude values for the peaks, valleys and/or flanks+for the plurality of n axial learning locations collectively, and optionally (3) one or more wobble values for the n axial learning locations separately, one or more wander values for the n axial learning locations collectively, one or more mean absolute deviation wobble values for the n axial learning locations collectively, or a combination thereof.

29. The method of claim 27 wherein the SPML model training in step (l) comprises:
(1) processing the stator training dataset in an ML framework comprising a two-layer encoding architecture comprising an input layer receiving the first training dataset, and a proposal neural network layer;
(2) generating a latent space of proposal data vectors in the proposal neural network layer embedding the stator dimension data;
(3) generating estimated data from the proposal data vectors in a two-layer decoding architecture of the ML framework the proposal neural network layer and an estimated neural network layer; and
(4) iterating steps (1) to (3) to minimize an estimated neural network layer loss function.

30. The method of claim 29 wherein the ML framework comprises a conditional variational autoencoder (VAE) learning framework comprising one or more VAE encoders in the two-layer encoding architecture and one or more VAE decoders in the two-layer decoding architecture.

* * * * *